US007970733B2

(12) United States Patent
Christiaens et al.

(10) Patent No.: US 7,970,733 B2
(45) Date of Patent: Jun. 28, 2011

(54) METHOD FOR COMMUNICATING DATA IN XDSL USING DATA RETRANSMISSION

(75) Inventors: Benoit Christiaens, Brussels (BE); Miguel Peeters, Woluwe St. Lambert (BE); Raphael Cassiers, Waterloo (BE)

(73) Assignee: Broadcom Corporation, Irvine, CA (US)

( * ) Notice: Subject to any disclaimer, the term of this patent is extended or adjusted under 35 U.S.C. 154(b) by 412 days.

(21) Appl. No.: 12/081,706

(22) Filed: Apr. 18, 2008

(65) Prior Publication Data

US 2009/0138775 A1 May 28, 2009

Related U.S. Application Data

(63) Continuation-in-part of application No. 11/853,532, filed on Sep. 11, 2007.

(60) Provisional application No. 60/907,833, filed on Apr. 18, 2007, provisional application No. 60/825,542, filed on Sep. 13, 2006.

(51) Int. Cl.
*G06F 17/30* (2006.01)

(52) U.S. Cl. ........ 707/602; 707/610; 707/688; 707/697; 707/703; 707/828

(58) Field of Classification Search ........... 707/600–831
See application file for complete search history.

(56) References Cited

U.S. PATENT DOCUMENTS

| 5,434,847 | A * | 7/1995 | Kou ............................. 370/252 |
|---|---|---|---|
| 6,694,470 | B1 | 2/2004 | Palm |
| 7,120,429 | B2 | 10/2006 | Minear et al. |
| 2002/0167949 | A1 * | 11/2002 | Bremer et al. ............. 370/395.1 |
| 2005/0094667 | A1 * | 5/2005 | Dahlman et al. ............... 370/473 |
| 2005/0135412 | A1 | 6/2005 | Fan |
| 2006/0029101 | A1 | 2/2006 | Williams |
| 2007/0071177 | A1 | 3/2007 | Macdonald et al. |
| 2008/0062872 | A1 * | 3/2008 | Christiaens et al. .......... 370/231 |

(Continued)

FOREIGN PATENT DOCUMENTS

CN 1318245 A 10/2001

(Continued)

OTHER PUBLICATIONS

Stephen B. Wicker, "High-Reliability Data Transfer Over the Land Mobile Radio Channel Using Interleaved Hybrid-ARQ Error Control," IEEE Transactions on Vehicular Technology, vol. 39, No. 1, Feb. 1990, pp. 48-55.

(Continued)

*Primary Examiner* — Isaac M Woo
(74) *Attorney, Agent, or Firm* — Sterne, Kessler, Goldstein & Fox, P.L.L.C.

(57) ABSTRACT

A method for transmitting data in an xDSL system is disclosed. In an exemplary embodiment, the method includes defining a data transmission unit (DTU) to be sent in an xDSL data stream, defining a retransmit container as a time slot that corresponds to a sent DTU, maintaining a copy of the sent DTUs and an index of corresponding retransmit containers in retransmission buffer, transmitting the DTUs in the xDSL data stream, determining whether a transmitted DTU should be retransmitted, identifying each corrupted DTU by its corresponding retransmit container, and retransmitting an uncorrupted copy of the DTU as identified by the corresponding retransmit container. The retransmission is deferred until the DTU is at a predefined position in the retransmission buffer.

16 Claims, 27 Drawing Sheets

U.S. PATENT DOCUMENTS

| | | |
|---|---|---|
| 2008/0063007 A1 | 3/2008 | Christiaens et al. |
| 2010/0031108 A1 | 2/2010 | Peeters |

FOREIGN PATENT DOCUMENTS

| | | |
|---|---|---|
| KR | 10-2002-0000650 | 1/2002 |

OTHER PUBLICATIONS

Isaac Sofair, "Probability of Miscorrection for Reed-Solomon Codes," Proceedings, International Conference on Information Technology: Coding and Computing, 2000, pp. 398-401.

G.gen: A Hybrid PCTCM-ARQ Error Correction Scheme, ITU Telecommunication Standardization Sector, Temporary Document HC-52, Study Group 15, Canada, 2000, pp. 1-6.

English-language Abstract of KR 20020000650, published Jan. 5, 2002, 1 page, printed from http://v3.espacenet.com/publicationDetails/biblio?adjacent=true&KC=A&date=20020105...

Final office action mailed on Dec. 1, 2010 for U.S. Appl. No. 11/853,532, filed Sep. 11, 2007.

* cited by examiner

METHOD FOR COMMUNICATING DATA IN XDSL USING DATA RETRANSMISSION

CROSS-REFERENCE TO RELATED APPLICATIONS

This application is a continuation-in-part of U.S. patent application Ser. No. 11/853,532 which claims the benefit of U.S. Provisional Application No. 60/907,833, filed Apr. 18, 2007, and U.S. Provisional Application No. 60/825,542, filed Sep. 13, 2006, all of which are incorporated by reference herein in their entirety.

FIELD OF THE INVENTION

Certain embodiments of the present invention relate to data communication. More specifically, certain embodiments of the invention relate to a method and system for communicating data in xDSL using data retransmission.

BACKGROUND OF THE INVENTION

As early as the first ADSL1 standard, recovery of transmission errors in xDSL relied upon using error correction codes such as, for example, Reed Solomon (RS), together with interleaving. In addition to providing impulse noise correction, the use of RS code provided extra coding gain, therefore improving the achievable data rate of the DSL system.

The evolution to ADSL2+ and VDSL2 standards did not question this strategy to fight impulse noise. However, the high data rate achieved together with extended impulse noise requirements forces the use of very small RS code words having many RS parity bytes. Accordingly, the RS net coding gain becomes highly negative, causing degradation in achievable bit rate.

Current DSL systems provide Impulse Noise Protection (INP) by means of Reed Solomon FEC associated with interleaving techniques. When a high INP is requested together with a small delay constraint (or limited available interleaving memory) this technique has some drawbacks such as the RS code words introducing a lot of overhead and consequently, the high INP protection is provided at a cost reduced bit rate (RS coding gain becomes negative), and if the system cannot correct the error, a lot of user data is impacted. Further, at low noise margins, the RS decoder capability is already stressed to correct residual stationary errors, thereby preventing the RS decoder from being fully available to correct impulse noise. It can be shown that with typical xDSL and RS decoder and interleaver settings, the impulse noise correction capability is practically nonexistent below approximately a 2 dB noise margin.

DETAILED DESCRIPTION OF THE INVENTION

Standard xDSL systems provide in their configuration management information base ("MIB") a parameter called minINP (minimum Impulse Noise Protection). MinINP defines the impulse noise length that the communication link should be able to sustain without error. The configuration MIB also defines a maximum transmission delay, maxDelay. Since a (N, R) Reed-Solomon (RS) code can correct up to R/2 errors, and since the interleaver spreads a codeword over at most maxDelay ms, standard xDSL systems can use an overhead rate equal to at least: $(R/2)/N >= minINP/maxDelay$, for example, with a typical value of minINP (500 us) and maxDelay (4 ms), R/N>25%.

A system that can achieve the requested minINP and maxDelay constraints while achieving a rate close to what it can achieve without impulse noise protection, i.e., without paying the associated high Reed-Solomon overhead rate cost, may use something other than RS code to achieve its impulse noise immunity. In accordance with the following disclosure, providing an error-free communication link in presence of an impulse noise of length almost equal to the maximum link delay may be achievable using the disclosed data retransmission scheme. While using retransmission may introduce jitter, an embodiment of the present invention may limit the introduced jitter in retransmission.

The following disclosure describes a method for handling data retransmission in an xDSL system. The method uses data retransmission while limiting as much as possible the modifications needed on existing systems. The method may be implemented, for instance, on existing xDSL CO (central office) and CPE (Customer Premises Equipment) chipset. The main principles of data retransmission are enabled when the CO keeps a copy of all data blocks it sends downstream, typically for period of 5 to 8 milliseconds. When the CPE detects a corrupted data block, it asks the CO to retransmit the concerned block.

In an embodiment, retransmission may provide an INP of at least 8 symbols, and it may allow the CPE to maximize the coding gain it can get from the usage of trellis combined with RS forward error correction (FEC). This is because RS overhead does not need to provide the INP, but can be solely selected to maximize the coding gain. Therefore, a minimal interleaving may be used to scatter the trellis errors prior to RS correction.

Figure 1A:
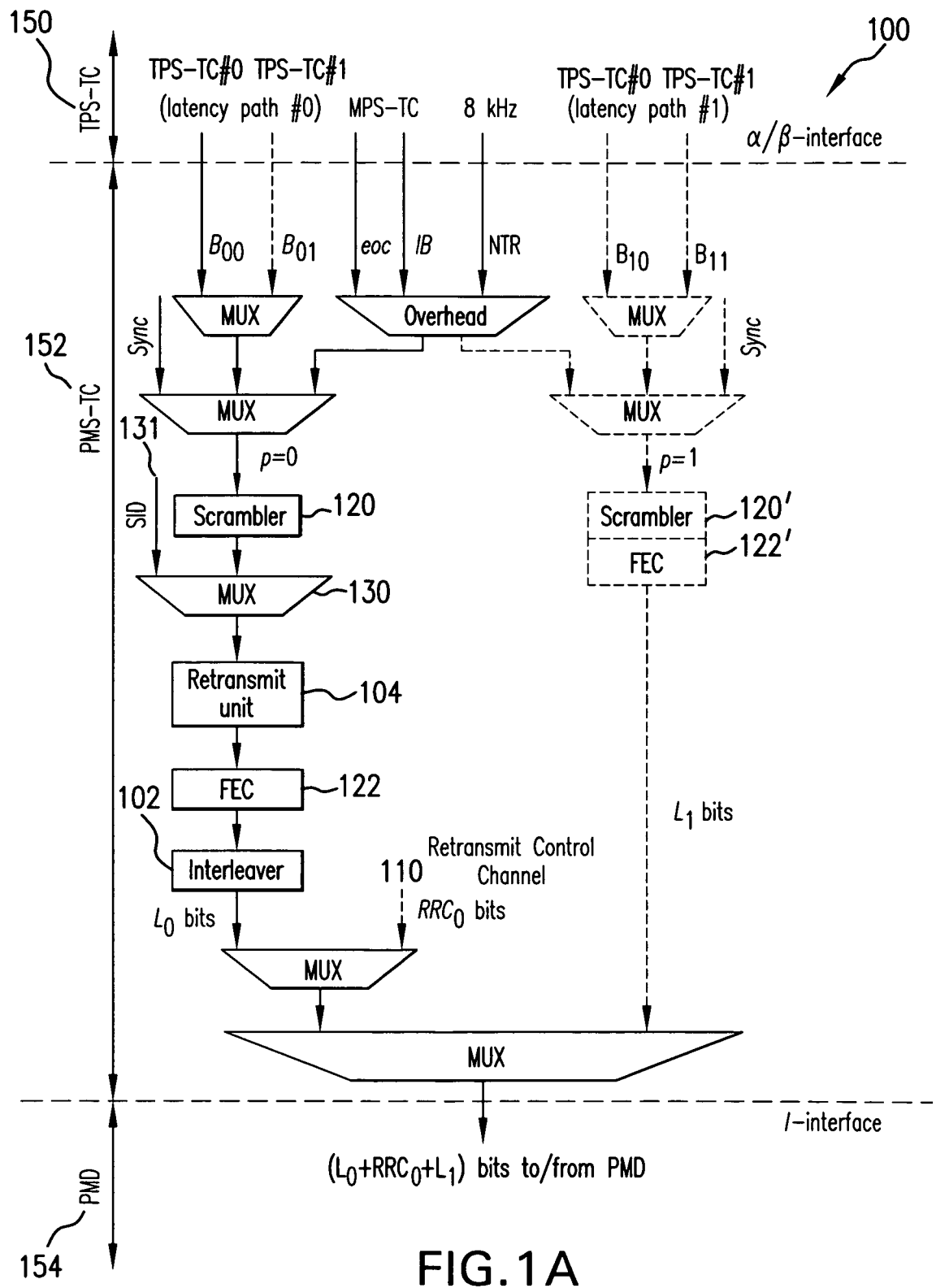
FIGS. 1A-C are block diagrams of an exemplary transmitter.

FIG. 1A is a block diagram of a portion of an exemplary transmitter 100. Three separate sublayers are illustrated as they may appear in an xDSL modem. The first sublayer 150 is the Transport Protocol Specific—Transmission Convergence ("TPS-TC") layer, the second sublayer 152 is the Physical Media Specific—Transmission Convergence ("PMS-TC") sublayer, and the third layer 154 is the Physical Media Dependent ("PMD") sublayer. One skilled in the art of xDSL communications will recognize the basic functions of these three sublayers and determine where they fit in a typical OSI-based communication stack. Further, xDSL transmitters and receivers having such sublayers for both CO and CPE applications are known in the art. Such examples include Broadcom Corporation's BCM6410/6420 BladeRunner™ ADSL2+ Central Office Chipset and BCM6348 Single-Chip ADSL2+ Customer Premise Equipment Chip.

In the configuration illustrated in FIG. 1A, the data retransmission system and method described herein may be implemented in the PMS-TC layer 152 as a new functional unit—i.e., as retransmit unit 104. One advantage to this approach is its implementation simplicity. Placing the retransmit unit 104 in the PMS-TC layer puts it closer to the PMD layer, which is where most errors take place. Further, such placement offers greater transparency with respect to existing performance monitoring functions. This specific embodiment is described in more detail herein.

Figure 1B:
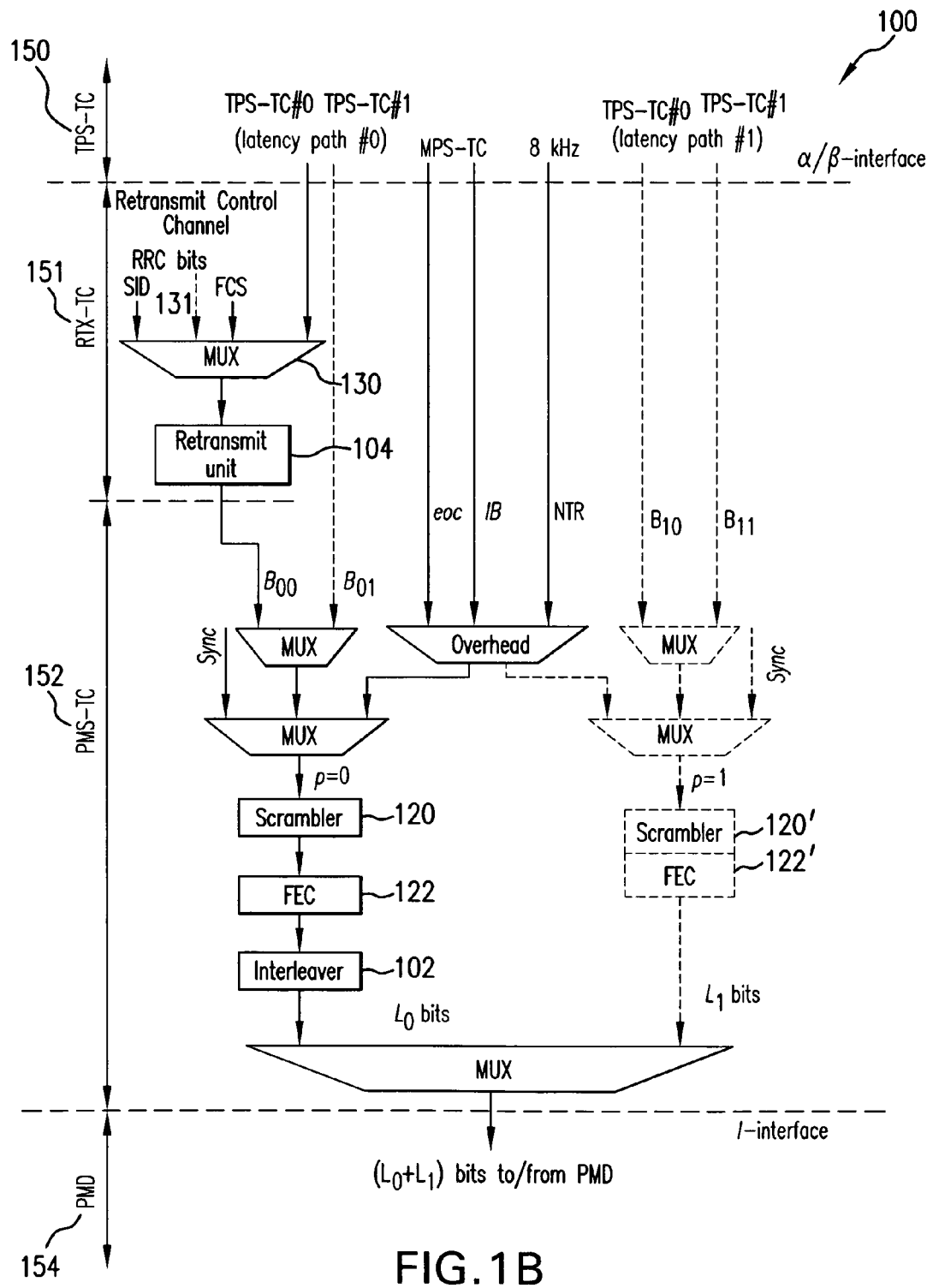
Figure 1C:
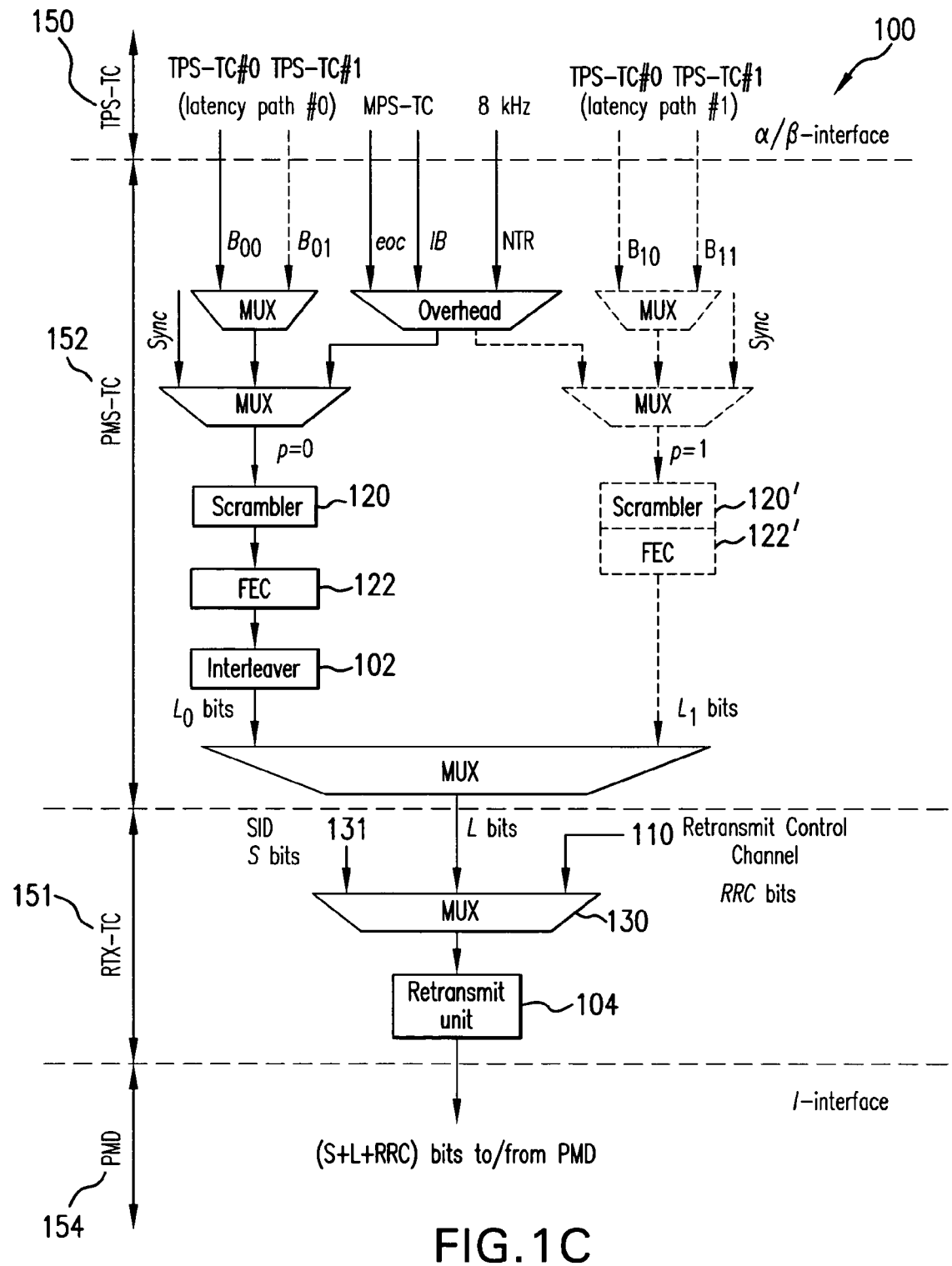

In alternate configurations illustrated in FIGS. 1B-C, a system and method could be defined that is compatible with placement of the retransmission unit 104 in different location. For instance, as illustrated in FIG. 1B, a retransmission transmission convergence (RTX-TC) layer 151 could be defined between the TPS-TC 150 and PMS-TC 152 sublayers without departing from the scope of the present disclosure. One advantage of this approach is that it leaves the existing frame structure unchanged. In yet another configuration illustrated in FIG. 1C, a system and method could be defined that is compatible with placement of the RTX-TC sublayer 151 between the PMS-TC 152 and PMD 154 sublayers. Most principles described herein are valid and applicable for these alternate solutions, and one of skill in the art would be able to modify the principles described herein accordingly.

According to the disclosed retransmission principles, a data block or data transmission unit (DTU) is defined. The previously transmitted DTUs may be temporarily stored at the CO. When it is determined that a DTU was corrupted during transmission, it may be retransmitted. One skilled in the art will recognize that the current xDSL standards define at least three types of TPS-TC (Transport Protocol Specific Transmission Convergence) functions: synchronous transfer mode (STM), asynchronous transfer mode (ATM), which is typically used on ADSL systems, and packet transfer mode (PTM), which is an ethernet and generic packet interface, which is typically used on VDSL systems. A data block or DTU may thus be defined as one or several RS code words, or something different such as a block of ATM cells, PTM cells or fragments, or 65 byte packets, for example.

The CO keeps a copy of all DTUs that it sends in downstream for a period of time. In an exemplary embodiment, the DTUs are kept for 5 milliseconds. The period of time should be sufficient to determine whether any of the sent DTUs were corrupted during transmission, and to request retransmission thereof. If the CPE detects a corrupted data block, it may send a signal to the CO requesting a retransmission of the corrupted data block.

The size of the data block or DTU may be defined as n=1/S code words, where the value of 1/S may be an integer. This causes the data block or DTU to exactly match the size of one discrete multi-tone (DMT) symbol. In case of a single corrupted DMT symbol, for example, this scheme may have the benefit of corrupting only one data block. However, this simplification is optional. If this simplification is adopted, the repeated data block may become a repeated DMT symbol. To overcome the possibility of having the same crest factor as a result of the repeated DMT symbol, a new scrambler or some other type of data randomization scheme may be utilized, for example.

Figure 2:
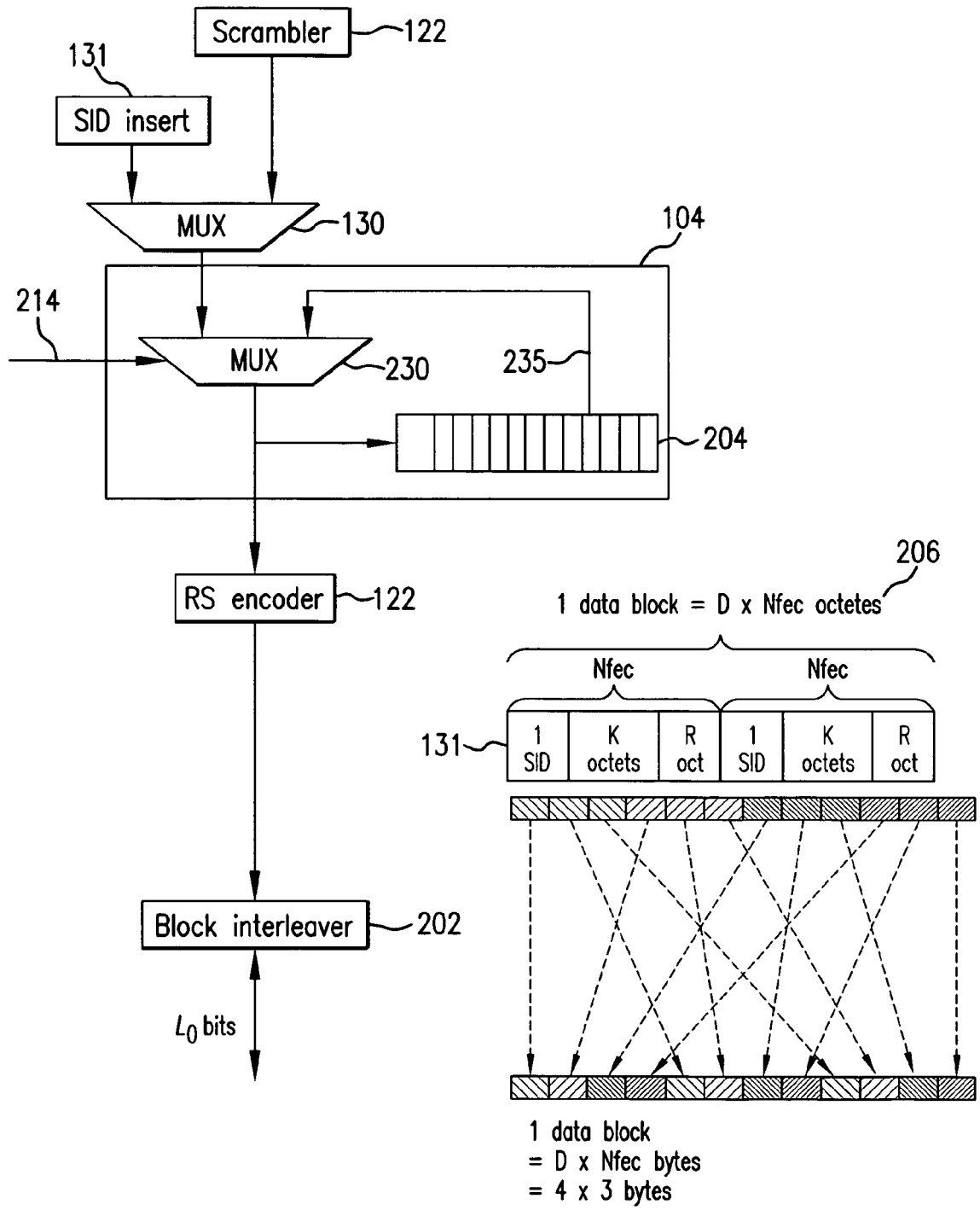
FIG. 2 is a block diagram of an exemplary retransmit unit and block interleaver operation.

Further simplification may be achieved by replacing the convolutional interleaver 102 by a block interleaver 202 (as illustrated in FIG. 2) over D symbols, i.e. an intra codeword interleaving scheme that may not cost any interleaving memory and does not introduce any extra transmission delay.

A retransmit container may be further defined to identify which corrupted DTUs need to be retransmitted, irrespective of the manner or degree to which the DUT was corrupted. In the disclosed retransmission scheme, the retransmit container is defined as a "data slot" or a "time slot" corresponding to a DTU. The retransmission container may be maintained at both the transmitter (Tx) and receiver (Rx) sides of the xDSL system. As long as the xDSL data rate is substantially identical at the Tx and Rx sides, the retransmit container index will be correct and synchronous at both sides. This is true even in presence of massive transmission errors.

The retransmit container index may thus be used to reliably identify the data blocks or DTUs that needs to be retransmitted. The data blocks or DTUs corresponding to the retransmit container may comprise n RS codewords. The parameter n may be nominally chosen close to, but lower than or equal to 1/S such that the corruption of one discrete multi-tone (DMT) symbol may only call for retransmission of 1 or 2 DTUs. Two consecutive containers may not contain two consecutive data blocks, such as in the case of retransmission where a container will contain a data block which has already been transmitted.

Every data block may also be uniquely identified by a sequence identification number (SID) 131. The SID 131 information may be repeated over n bytes, 1 byte being inserted inside each codeword, as the first byte of each codeword. The SIDs 131 may increment sequentially modulo a max count, significantly larger than the depth of the retransmission queue. A multiplexer 130 may be incorporated into PMS-TC layer 152 to handle addition of a SID 131 to the data blocks. The SID 131 may be added after the scrambler block 120, but before the forward error correction (FEC) block 122, as illustrated in FIG. 1. The data block or DTU may comprise a set of data bytes grouped together and identified by the SID. An exemplary data block or DTU 206 is illustrated in FIG. 2. The SID 131 increases with each new data block generated and is used to identify a new data block from a retransmitted one.

Referring again to FIG. 1, transmitter 100 may also comprise a convolutional interleaver 102. Interleaver 102 receives as input one (or several fractions of one) RS codeword and produces L0 bits per symbol. In a standard transmitter, at each symbol, the interleaver expects L0 bits from coming out of the forward error correction (FEC) block 122. FEC 122 could be, for example, a Reed-Solomon (RS) encoder.

A retransmission unit 104 handles the retransmission request. The retransmit unit 104 may also store and manage retransmit containers and the retransmit container index, which are used to identify transmitted and stored DTUs. It should be clear to one of skill in the art that retransmit unit 104 could alternatively be placed after the FEC 122, e.g., after a RS encoder. This functionally equivalent embodiment (not illustrated) highlights the fact that the retransmit queue 204 (illustrated in FIG. 2) could also store RS parity bytes. Such an embodiment could increase memory constraints but reduce computational load. Operation of retransmit unit 104 is described more fully below.

FIG. 2 is a block diagram of an exemplary retransmit unit 104. Retransmit unit 104 includes a multiplexer for receiving incoming data from multiplexer 130 and a retransmission request 214. Further, multiplexer 230 receives the data block or DTU to be retransmitted 235 from a retransmission buffer 204. As noted above, the DTU to be retransmitted 235 is identified by its retransmission container.

FIG. 2 also illustrates the operation of block interleaver 202. When operating in an exemplary block repetition mode, certain settings may be applied to the frame structure of exemplary data blocks 206. One setting may be to group D RS codewords together to form data block 206. Supported values for D may be, for example, 1, 2, 4 and 8 or more. The values Nfec and D may be selected by a receiver (not illustrated) such that the data block size is lower or equal to the discrete multi-tone (DMT) symbol size (L/8 bytes). These ranges are exemplary and not restrictive.

Another setting may be to include an overhead byte, the SID byte 131, in each RS codewords, prior to the first data byte. The SID byte 131 may provide the data block sequence ID, and may be, for example, an 8-bit wrap around counter starting at 0 and incremented each time a new data block 206 is generated. The same SID byte 131 may be included in each RS codeword part of the same data block.

Another setting may be to store the data block or DTU inside a retransmit unit. The retransmit unit output is a retransmit container (described above) that contains either the last data block it has received, or one of the previous data blocks it had stored. The output data block may be cyclically rotated inside the retransmit container by a byte offset equal to the retransmit container counter modulo 256. The retransmit container counter is incremented each time a new retransmit container is sent. Such cyclic rotation is optional, and may occur when the DTU size matches exactly the DMT symbol size.

Another setting may be replacing the convolutional interleaver 102 by a block interleaver 202, acting over one DTU or data block. The interleaving depth D may be set equal to the number of RS CW inside a DTU. Byte Bj with j=0 . . . Nfec*D−1 may be output by the interleaver at index k=mod (j,Nfec)*D+floor(j/Nfec).

Yet another setting may be to use a "retransmit control channel" 110 to send and receive retransmit requests. The retransmit control channel 110 may be, for example, a fixed rate channel of 3 bytes/symbols, for example, multiplexed at the gamma interface as an implicit extra latency path $LP_{i+1}=LP_{RCC}$ with $L_{RCC}=24$, pre-pended before the L1+L0 bytes of the data paths. The retransmit control channel 110 may be present in one direction if the block retransmission mode is enabled in the reverse direction, as illustrated in FIG. 1. In one embodiment using ADSL, a channel of two bytes per symbol may be used. In another embodiment using VDSL, three bytes may be used.

The number of FEC parity bytes R and codeword length N may be selected such as to insure a reliable detection of uncorrectable codewords by the RS decoder. For instance, with R=16 and N<=232 it can be computed that uncorrectable codewords will go undetected with a probability lower than $10^{-5}$. This effectively may be translated to 1 error out of $10^5$ could go undetected and assuming 10 errors per seconds, this is one undetected error every 2 hours. Lower residual undetected uncorrected codeword rate may be achieved by either increasing R, lowering N, or by only allowing the RS decoder to correct less than R/2 errors. The parameters R and D may be selected such that a trellis decoder error burst can be corrected. Since such a burst may typically span 10 tones, a correction capability larger than (typically) 10*12 bits/tone=15 bytes may be utilized. For example, with D=4, R>=8. Alternatively, the RS code may be selected such as to only provide error detection. In this case, which may be of interest at a low bit rate, R=2 or 4 may be selected.

Based on the information received from the customer premise equipment (CPE), the retransmit unit 104 may decide whether it should take a new data block from the RS encoder or whether it should retransmit a data block from its own retransmission buffer 204. Note that if retransmission is applied in the downstream direction, as described here, the receiver is associated with the CPE and the transmitter with the central office (CO). The reverse convention would be used if retransmission is applied in the upstream direction.

For retransmission in the downstream direction, retransmit unit 104 keeps track of which data block 206 has been sent in which retransmit container using a retransmit index. A request to retransmit a given container may be accepted once by the transmitter 100. However a same data block or DTU may be retransmitted several times inside different retransmission containers. The transmitter 100 keeps track of the time at which it has sent a given DTU or data block for the first time, and will not accept retransmission of a retransmission container that contains a data block that is older than a given threshold. This threshold may be configured as being equal to the MIB maximum delay parameter.

At the receiving end, a receiver may de-interleave the transmitted data, and verify and correct the RS codewords present in the data block transported by the retransmit container. The receiver may also verify the correctness of the SID present in the retransmit container. At that point, the receiver may have information regarding whether one of the codewords may be uncorrectable and whether the SID may have been corrupted during the transmission. Based on these two indications, the receiver may decide what to do with the received RS codeword. Some possible actions that the receiver may take are: drop the data block; send a retransmit request to the CO for the container just received; replace a data block already present in the receive buffer FIFO 304 (see FIGS. 3A and 3B), by a newly arrived one; and push the data block in the receive buffer FIFO 304 and simultaneously take a data block out of the receive buffer FIFO 304 and continue the normal deframing processing with the RS codewords present in that data block.

The receive buffer FIFO 304 may be a FIFO of m received data blocks, and should be long enough to allow reception of a retransmission before the data block leaves the FIFO. For each data block or DTU present in the receive buffer FIFO 304, the FIFO may be capable of determining whether it contains errors or not. At initialization time, the receive buffer FIFO may be full of correct dummy data blocks. The deframer (not shown) may therefore not use the first m data blocks that go out of the receive buffer FIFO 304.

Retransmit Request

Any retransmission scheme relies on a feedback from a receiver. This feedback must be highly reliable. In an embodiment, the transmitter receives a retransmission request 214 from the receiver. Retransmission requests 214 could have different characteristics. For example, it is desirable to have redundancy in the request. As such, notice that a DTU has to be retransmitted is preferably contained in multiple requests such that if some requests get lost, there is still a possibility to receive the retransmission notice. Further, the retransmission request 214 preferably requires as small a bitrate as possible in order to minimize overhead (e.g., 2 or 3 bytes per symbol in various embodiments). Therefore, the format should be dense and the request should contain as much information as possible. In other words, best use should be made of available overhead. Still further, the information contained in retransmission request 214 should be understandable and meaningful independently of the history. In other words, the retransmission request is preferably self meaningful and not dependent on any previously transmitted request. Finally, the retransmission request 214 should be protected by some kind of error check, such as a check sum, so that the receiver can discriminate between correct and erroneous requests with a high reliability.

When sending a retransmission request 214, the retransmission signal may indicate the retransmit container ID, the last container ID to be retransmitted, and the number of containers to be retransmitted after that container. The signal may also comprise the last received container ID, and a bitmap indicating which container need to be retransmitted. For example, if the last container ID is Cid, bit I of the bitmap then is set to 1 if Cid-I needs to be retransmitted.

Exemplary data structures for an uncompressed retransmission request format could include {FCS, statusBitmap, lastContainerIdx}. For example:

lastContainerIdx: this provides the 'time stamp' of the receiver. Using this field the transmitter knows what range of its retransmit FIFO queue has already been received and is concerned by the statusBitmap. In an embodiment, the lastContainerIdx only contains the few LSB's of the index. Indeed, the MSB can easily be reconstructed by the transmitter, knowing that the roundtrip delay is approximately constant.

statusBitmap: one bit for each of the last n received container. LSB carry the status of the container lastContainerIdx, bit i carry the status of container lastContainerIdx-i. Alternatively, instead of carrying 1 bit per container, the information can be compressed in several different ways. One way is to count the trailing zeros of the uncompressed status, i.e. sent the number of consecutive wrong containers received, starting from lastContainerIdx and counting backward.

FCS: checksum to validate the correctness of the request

Upon receiving data, the DTU or data block may be checked for errors and different actions may be taken based on whether or not errors are present in the data block. If there is an unrecoverable error in one of the RS codeword or in the received SID, the data block may be pushed as being the next expected data block (tail of the FIFO), and the data block may be marked in the queue as being erroneous. If the receive buffer FIFO 304 contains at least one correct data block, a retransmit request may be sent to the CO. If, however, the receive buffer FIFO 304 only contains wrong data blocks, there may be high chance that a retransmission may not occur on time, and consequently, the retransmission may be disabled until the receive buffer FIFO 304 is again partially filled with correct DTUs. Upon examining the data, it may be determined that there are no residual errors in DTU. In this case, the SID is equal the next expected SID. Consequently, the data block may be pushed in the receive buffer FIFO 304 and marked as being correct.

In another situation, upon examining the data, it may be determined that the SID may not be the expected one and retransmission may be needed. If the SID does not match an index in the receive buffer FIFO 304, the DTU may be dropped if there is no correct data block in the FIFO. This may effectively result in recovering a potentially lost synchronization in case of long period with errors. The received codeword may be dropped until synchronization is achieved again. When repetition is handled at the TPS-TC level, resynchronization may not be needed and the received data block may be immediately pushed inside the receive buffer FIFO 304. However, if there are some correct data blocks in the FIFO, the received data block may be pushed at the beginning of the queue, and marked as being wrong, without asking for retransmit.

Alternatively, if it is determined that the SID is not be the expected one and retransmission may be needed. If a correct data block is already present in the FIFO at the location corresponding the to the received data block, it may be concluded that a data block for which retransmission was not requested may have been received. This data block may be pushed at the beginning of the FIFO and marked as being wrong. Still further, if it is determined that the SID may not be the expected one and retransmission may be needed, if the data block present in the FIFO at the location corresponding to the received data block is marked as being wrong, it may be replaced and marked as correct.

In embodiments, support for the retransmission scheme in addition to the standard interleaving mode may be negotiated during handshake in the communication system. Once established, in the CLR and CL messages, the CPE and CO may respectively announce support for this mode in the Rx direction, support for this mode in the Tx direction, their own worst case half-way roundtrip delay, and the maximum size of the repetition FIFO at the transmitter side.

The Retransmission Control Channel 110 illustrated in FIG. 1 may carry one retransmission request every symbol. The format of the retransmission request may be as follows: a portion of the most recent retransmit container index that has been received (for example the 4 LSBs); the number of containers without errors received since the last container without errors; the number of retransmit containers that must be repeated; and a message checksum.

Figure 3A:
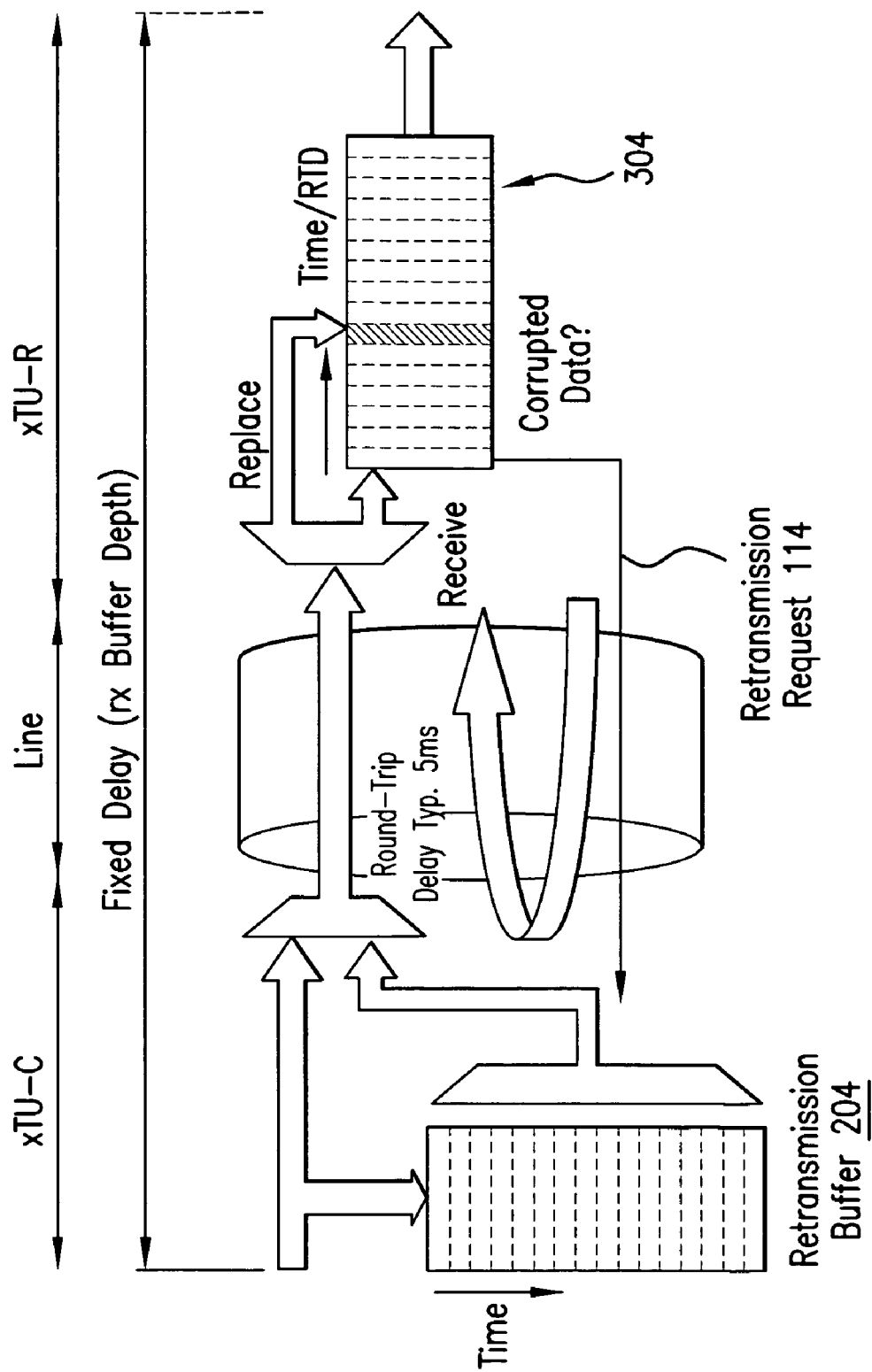
FIGS. 3A and 3B are block diagrams of an exemplary retransmission schemes.
Figure 3B:
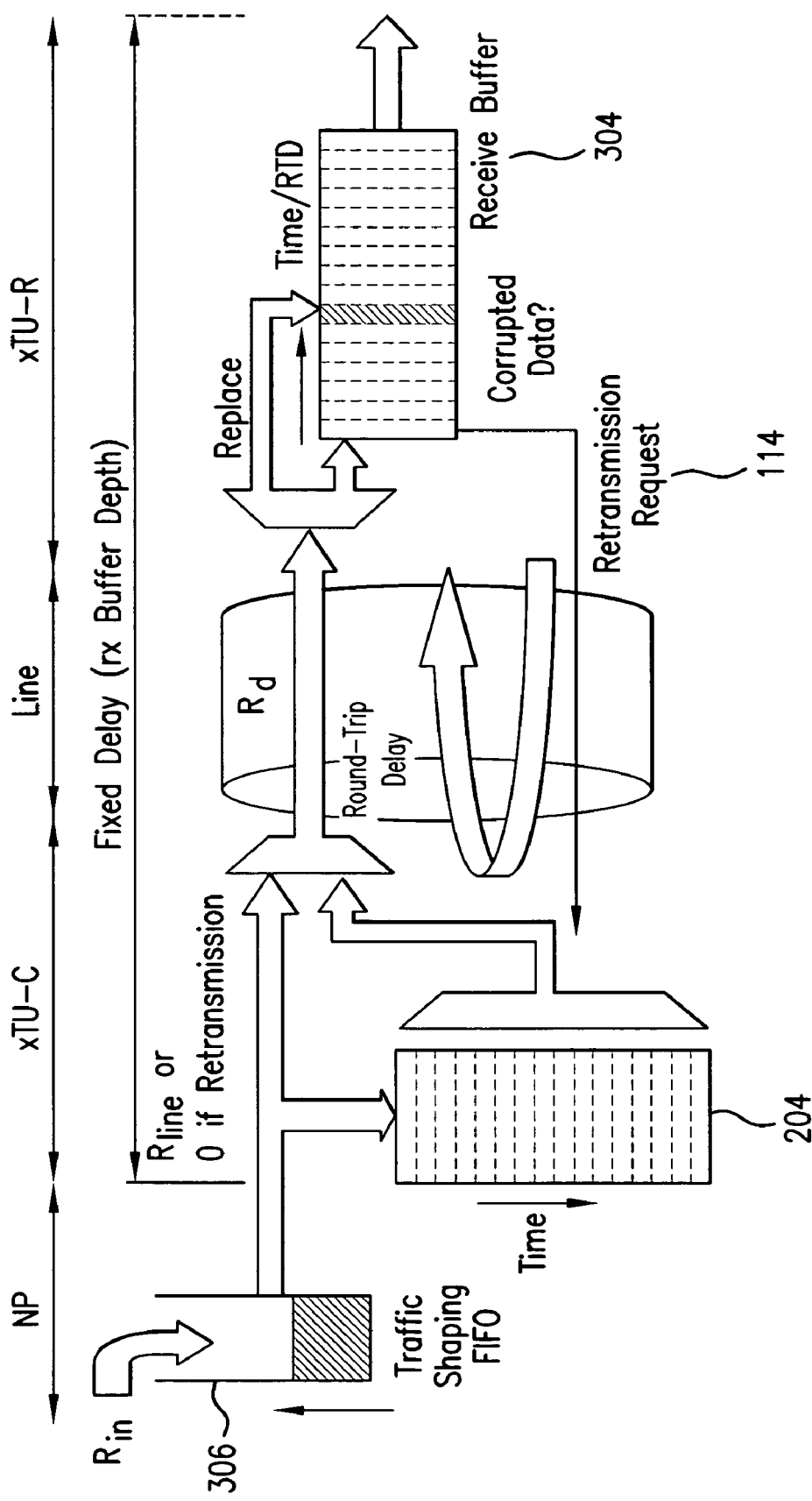

Further embodiments and principles of the above described transmission scheme are be further illustrated in the diagrams of FIGS. 3A and 3B. The general principle for an end-to-end retransmission scheme is depicted in FIG. 3A. All the transmitted DTUs are stored in a retransmission buffer 204 at the transmitter side. Upon reception of a DTU, its frame check sequence (FCS) is checked and a retransmission request is immediately launched if it is found corrupted. Even if corrupted, the DTU is pushed in the receive buffer 304. If the retransmitted DTU arrives while the corrupted one is still present in the receive buffer 304, the corrupted one is replaced. If the retransmitted data unit doesn't arrive on time, the corrupted data will be further processed by the receiver data path.

In more detail, the basic transmit mechanism is as follows ($W_{ret}$ denotes the retransmission window size in DTU). If no retransmission is pending, new data bytes are stored in a new DTU, and the DTU is transmitted over line as well as stored in the retransmission buffer 204. If, however, a retransmission is requested, two cases are possible. In one case, the first transmission of the requested DTU took place less than $W_{ret}*T_{DTU}$ second before the current time. In that case, the DTU is retransmitted. In a second case, the first transmission of the requested DTU took place more than $W_{ret}*T_{DTU}$ second before the current time. In that case, the request is discarded and a new DTU is transmitted.

Figure 4:
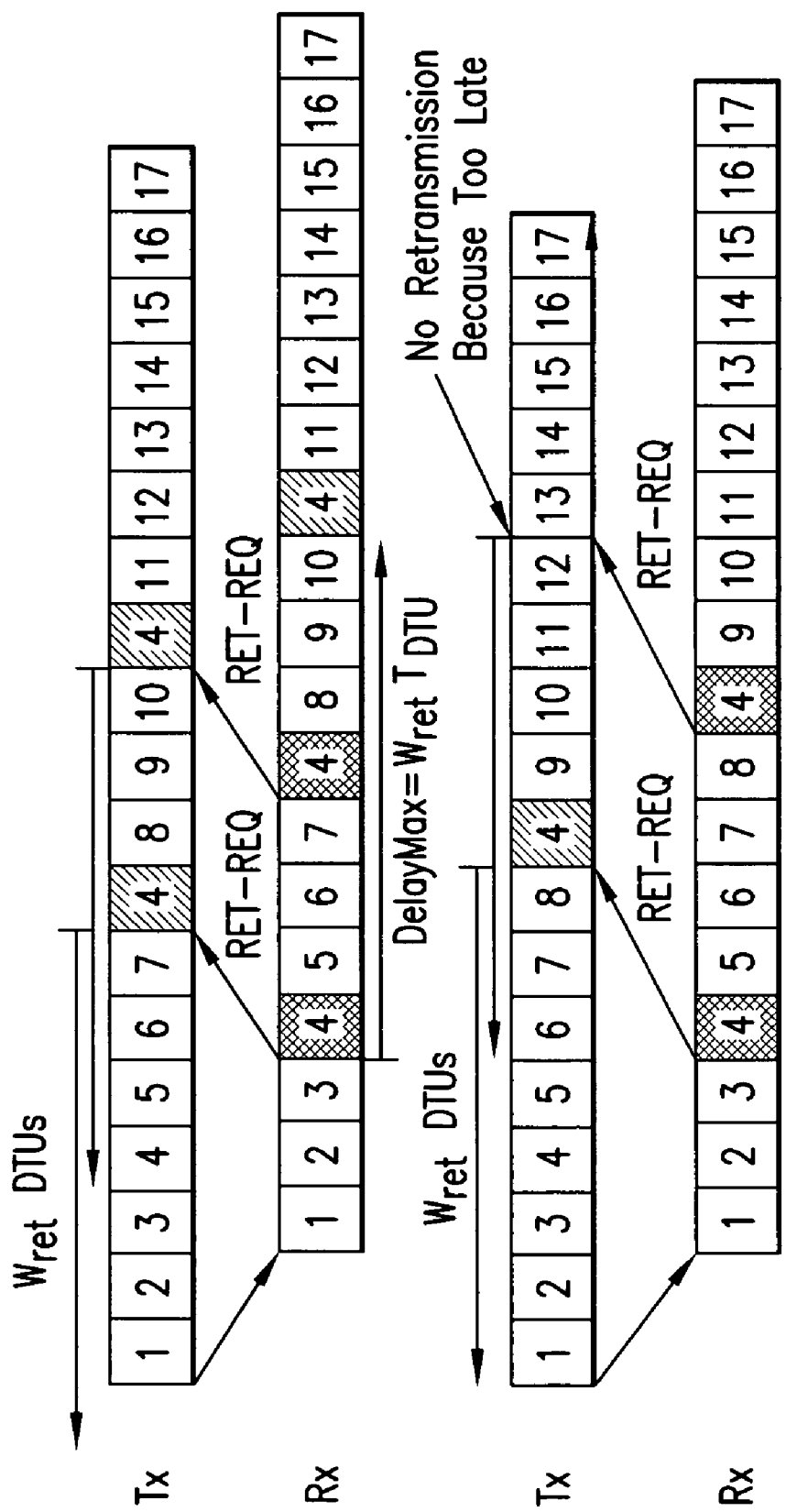
FIG. 4 illustrates a basic transmit mechanism.

Two examples of this mechanism are depicted in FIG. 4. In both cases $W_{ret}$ is equal to 8 DTUS. In the upper example, the round trip delay is equal to 4 $T_{DTU}$. The DTU #4 is corrupted a first time, and a retransmit is requested. As the first retransmit is requested 4 $T_{DTU}$ after the first transmission, the retransmission occurs. The same DTU #4 is again corrupted and a second request is sent back. The second request is received less (or equal) than 8 DTUs before the first request, so a second retransmit occurs and the DTU #4 is received with a delay of 8 DTUS.

In the lower example of FIG. 4, also two transmissions of DTU #4 are corrupted but this time the round trip delay is 5.$T_{DTU}$. As the second request arrives more than 8 DTUs after the first transmission, the request is discarded and the DTU #4 is never transmitted, i.e. an error happens on the line. As the receiver knows that after 8 DTU, there is no chance to receive the DTU #4, the DTU #5 will be blocked in the rescheduling queue no more than 8 $T_{DTU}$.

An alternate end-to-end retransmission scheme is described in FIG. 3B. Therein a rate adaptation FIFO 306 has been added to model the network processor at the input of the digital subscriber line physical layer. Assuming that the transmission rate of the DTU (equivalent to the net bearer rate) is $R_d$ and the rate of the guaranteed service is $R_{in}$, the exemplary principle is as follows: every transmission of a new DTU, $R_{in}.T_{DTU}$ bits enter the rate adaptation FIFO 306 and at most $R_d.T_{DTU}$ bits leave the rate adaptation FIFO 306. If the rate adaptation FIFO 306 contains less than $R_d.T_{DTU}$ bits, the missing bits, as the DTU always contains $R_d.T_{DTU}$ bits, are added by the rate adaptation process of the TPS-TC, through idle cell insertion in ATM or idle bytes insertion in PTM. Note that this process is statistical and follows the rate adaptation rules of the ATM or PTM TPS-TC. In the described embodiment, every retransmit of a DTU, $R_{in}.T_{DTU}$ bits enter the rate adaptation FIFO and no bits leave the rate adaptation FIFO 306.

As noted above, in some embodiments, the retransmission may be controlled between TPS-TC and PMS-TC. As a new 'retransmission layer,' the data block may be defined as a group of ATM cells, PTM cells or fragments, or 65 bytes packet, for example. This approach leaves the existing frame structure unchanged. Additionally, using this approach may call for providing a new protection scheme on the data blocks, i.e., new CRC.

Exemplary Methods

Figure 5:
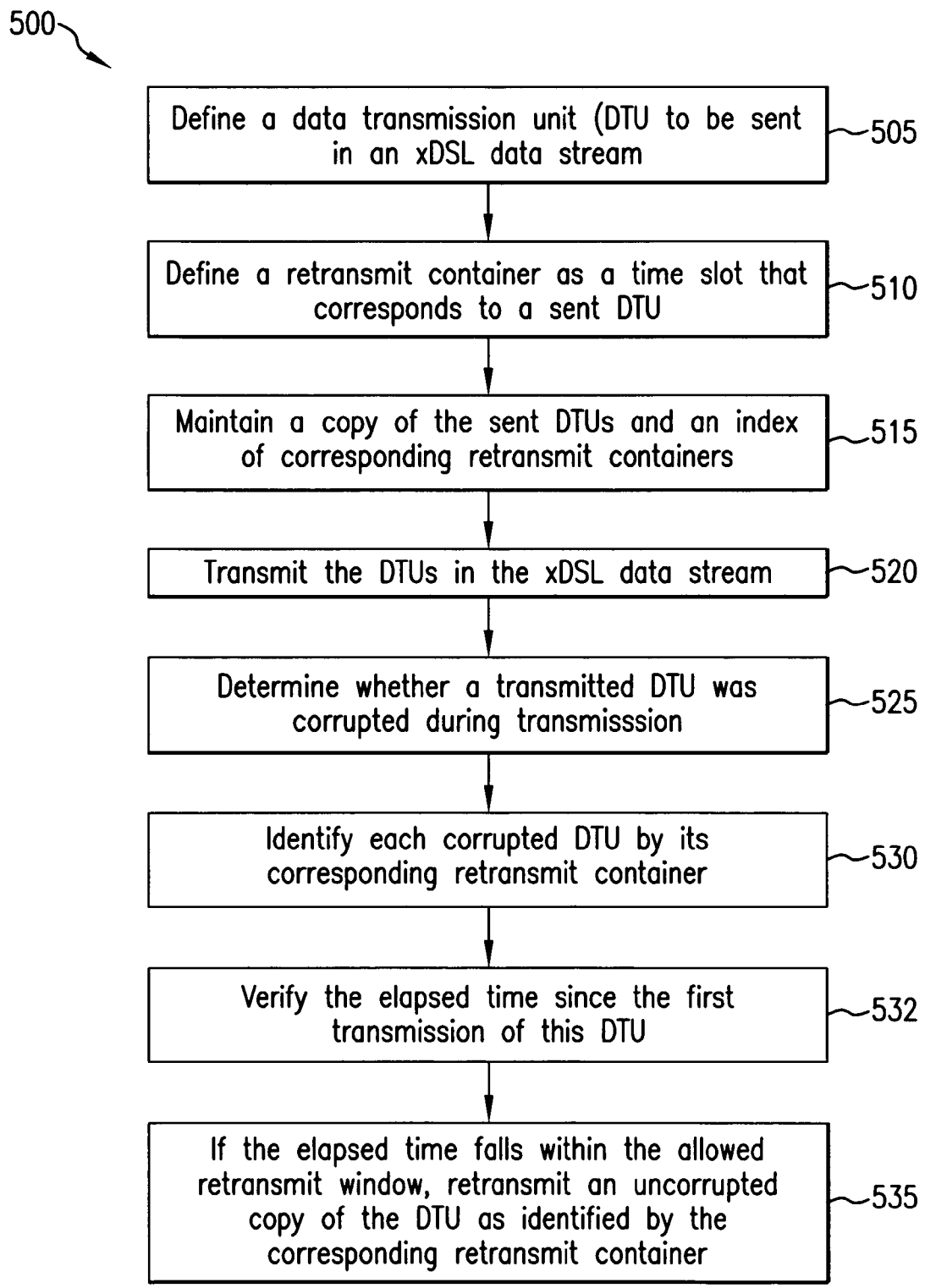
FIG. 5 is a flow chart illustrating an exemplary transmitter method.

A method for communicating data 500 is described in FIG. 5. The method 500 illustrated in FIG. 5 is performed from the standpoint of the transmitter, which could be located, for example, at a central office facility. According to step 505, a data transmission unit (DTU) is defined. In an embodiment, the DTU is sent in an xDSL data stream. As described above, a data block or DTU may defined as one or several RS code words, or something different such as a block of ATM cells, PTM cells or fragments, or 65 bytes packets, for example.

According to step 510, retransmit container is further defined as a time slot or data slot that corresponds to one sent DTU. Retransmission containers may be identified using an always-increasing index, starting from 0 at initialization time. As illustrated in step 515, the retransmission container index is maintained at the transmitter along with corresponding copies of the sent DTUs and possibly with a time stamp identifying the moment of the first transmission of that DTU. As long as the xDSL data rate is substantially identical at the Tx and Rx sides, the retransmit container index will be correct and synchronous at both sides. This is true even in presence of massive transmission errors. The retransmit container index may thus be used to reliably identify the data block or DTU that needs to be retransmitted.

According to step 520, the DTUs are transmitted in an xDSL data stream. The transmitter then determines, according to step 525, whether a transmitted DTU was corrupted during transmission. There are at least two ways by which a transmitter may determine whether a DTU was corrupted during transmission. In one embodiment, a retransmission request may be received requesting retransmission of an uncorrupted copy of the corrupted DTU. In such an embodiment, according to step 530, the uncorrupted copy of the DTU is identified in the retransmission request by its corresponding retransmit container. The retransmission request may be received in the reverse direction over a retransmit control channel, and the uncorrupted copy of the DTU may be returned instead of a new one in the downstream (in case of a CO transmitter) direction.

In an alternate embodiment, an acknowledgement may be expected for each validly transmitted DTU. If an acknowledgement is not received, it may be assumed that the DTU was not validly received and may have been corrupted. In that case, the transmitter may generate its own retransmission request. Again, according to step 530, the retransmission request may identify the unacknowledged DTU by its corresponding retransmit container. In yet another embodiment, both methods may be used together to enhance reliability that a corrupted DTU will be identified such that it may be retransmitted, and to optimize the delay before which the retransmission takes place.

Once the retransmission request is processed, and the corresponding DTU has been identified by its retransmit container, the elapsed time since the first transmission of this DTU is verified according to step 532. In an embodiment, if the elapsed time falls within the allowed retransmit window, an uncorrupted copy of the DTU is retransmitted according to step 535.

Figure 6:
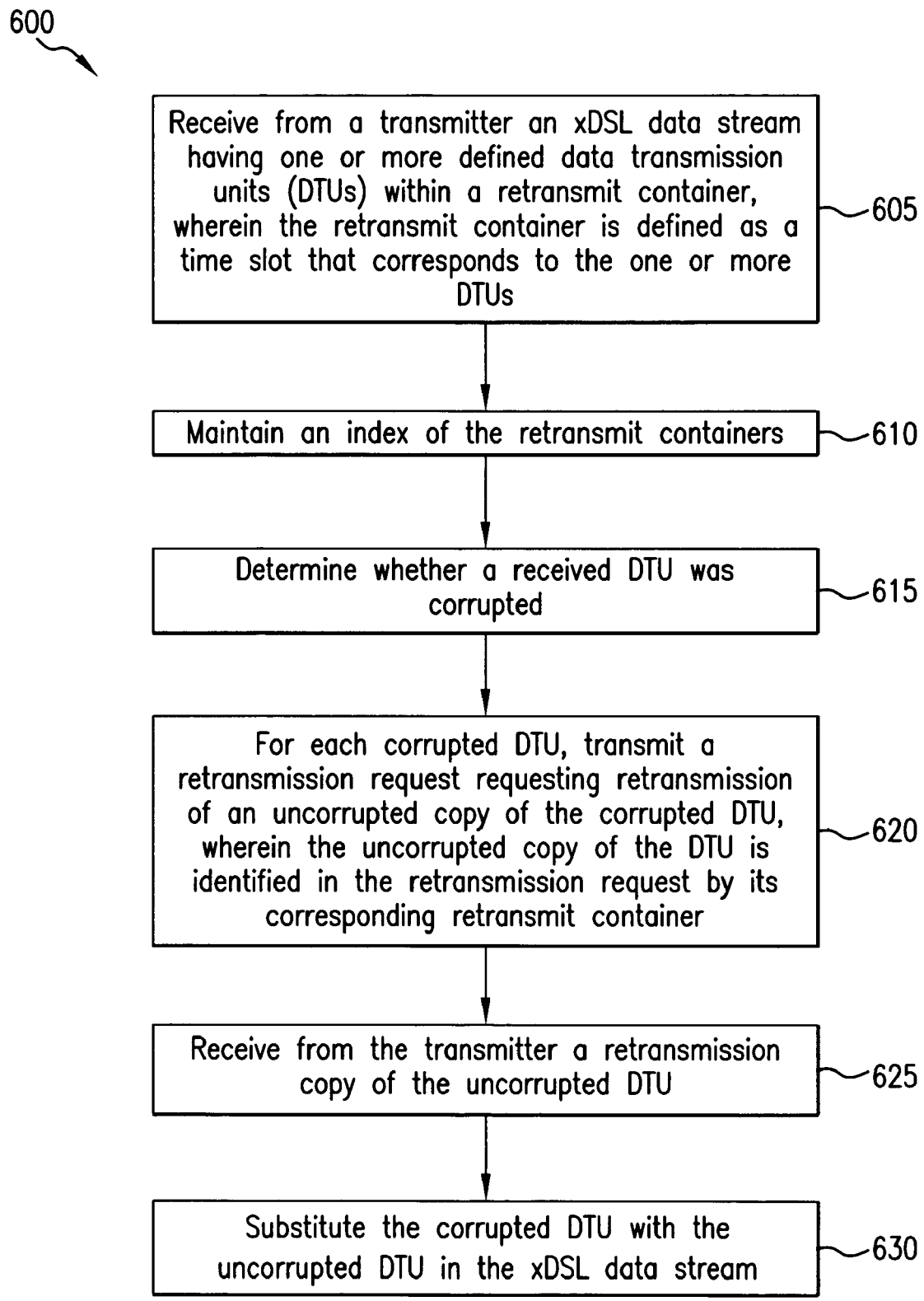
FIG. 6 is a flow chart illustrating an exemplary receiver method.

A method for communicating data 600 is described in FIG. 6. The method 600 illustrated in FIG. 6 is performed from the standpoint of the receiver, which could be located, for example, at the customer premise equipment (CPE). According to step 605, an xDSL data stream having defined data transmission units (DTUs) are received from a transmitter within retransmit containers. The retransmit container is defined as a time slot that corresponds to one received DTU. According to step 610, an index of the retransmit containers is maintained.

Next, according to step 615, the receiver determines whether a received DTU was corrupted. Various error checking schemes are well known in the art. According to step 620, for each corrupted DTU, a retransmission request is transmitted that requests retransmission of an uncorrupted copy of the corrupted DTU, or alternatively for each received DTU, a positive or negative acknowledgement is transmitted that lets the transmitter know which DTU needs to be retransmitted. The uncorrupted copy of the DTU is identified in the retransmission request by its corresponding retransmit container The retransmission request will be processed at the corresponding transmitter, and the receiver will then receive from the transmitter a retransmitted copy of the uncorrupted DTU, according to step 625. As a final step 630, the corrupted DTU substituted with the uncorrupted DTU in the xDSL data stream. As described above, a retransmission buffer is used for this purpose.

Control Parameters

Based on the retransmission model with rate adaptation queue, we can derive three high level parameters:

The delay in ms equal to $(N_{ret}+W_{ret}) \cdot T_{DTU}$. Note that the delay may be split in the delay due to the resequencing of the retransmissions, $W_{ret} \cdot T_{DTU}$ and the delay due to the retransmissions of the DTU, $N_{ret} \cdot T_{DTU}$.

The impulse noise protection (INP) equal to $N_{ret} \cdot T_{DTU}/T_s$ in DMT symbol with $T_s$ the symbol duration (e.g. 250 us).

The supported minimum interarrival (IA) between two worst case impulses, $(N_{ret}+N_{int}) \cdot T_{DTU}$.

Bounds on these parameters, i.e. DelayMax, INPmin, and IAmin, provides full control of the retransmission scheme by the operator. In an embodiment, DelayMax provides a bound on the delay as for the interleaver. Note that the delayMax configured should be greater than the round trip delay. INPmin provides a bound on the impulse noise protection. IAmin provides the minimum guaranteed rate, $R_{in}$=(IAmin−INPmin.$T_s$)/IAmin.$R_d$.

The particular end-to-end data transfer behavior in presence of retransmission needs new control parameters to provide guaranteed and predictable performances, both in term of available user data rate and jitter. In an exemplary embodiment, the following parameters may be used to this end and they are typically configurable independently per line and per direction:

maxDelay (expressed in ms)—This parameter (already used in case of normal interleaving) defines the maximum allowed nominal delay. It is used by the modem to set an upper bound on the allowed receiver retransmission queue size. Since it must be at least equal to the roundtrip delay, retransmission cannot be activated if the maxDelay configured is lower than 4 ms.

minimumRate (expressed in kb/s)—This parameter (already used in case of normal interleaving) defines the minimum guaranteed user data rate. The available bandwidth for retransmission is equal to the difference between the current data rate on the line and the minimum rate configured.

INPmin (expressed in 10th of symbol)—This parameter (already used in case of normal interleaving) defines the minimal guaranteed impulse noise protection, provided that the available data bandwidth allowed for retransmissions is not exceeded.

INPmax (expressed in 10th of symbol)—This parameter defines the maximum number of consecutive retransmissions that may take place and therefore bounds the maximal jitter due to retransmissions. A default value of zero doesn't bound the number of consecutive retransmissions (that will however never exceed maxDelay*4 symbols).

minRtxRatio (expressed in 1/256th, relative to the minimum data rate)—This parameter allows to provision a minimal guaranteed retransmission bandwidth, on top of the minimum rate. In case of repetitive impulses of known maximal length and periodicity, this parameter can be used to guarantee that the repetitive impulse noise can be corrected. A default value of zero doesn't force any extra guaranteed data bandwidth for retransmissions.

minRSoverhead (expressed in 1/256th)—This new parameter allows to forces a minimum amount of RS overhead (R/N). This can be used to guarantee a given amount of steady state error correction capability. A default value of zero doesn't force the use of RS overhead.

In an embodiment using VDSL2, when the standard interleaving scheme is used, a common interleaving memory is dynamically split between an upstream (US) and (DS) directions. In a similar way, when the retransmission scheme is enabled, the retransmission memory is split between US and DS direction. In both cases, this split is performed in such way that the ratio of US and DS rate matches a given ratio configured independently for each line.

Performance for a Specific Embodiment

Based on the previous model, the performances of an interleaver and a repetition scheme in a typical VDSL2 configuration were compared. A VDSL2 system with a symbol duration $T_s$=250 us, a roundtrip delay of 5 ms, an interleaver memory of 65536 bytes or a retransmission queue of 32768 bytes (assuming that the interleaver memory may be reused for retransmission) and a DTU duration $T_{DTU}$=260 us was used.

The minimal number of consecutive retransmissions to achieve the INPmin is equal to $$N_{ret} = \left\lceil \frac{INP_{min} \cdot T_s}{T_{DTU}} \right\rceil$$

The minimal number of DTU in the retransmission queue to handle both the roundtrip delay and the number of consecutive retransmissions is equal to:

$$W_{ret} = \text{MAX}\left(\left\lceil \frac{roundtrip}{T_{DTU}} \right\rceil, N_{ret}\right)$$

The maximal transmission rate of the DTU (equivalent to the bearer rate) is equal to:

$$R_d = \frac{RetFIFOSize}{W_{ret} \cdot T_{TDU}}$$

The ratio between the guaranteed transmission rate and the maximal transmission rate of the DTU $$\frac{R_{in}}{R_d} = \frac{N_{int}}{N_{int}+N_{ret}} = 1 - \frac{N_{ret}}{\lceil IA_{min}/T_{TDU}\rceil}$$

Based on these formulae, the maximal transmission rate of the DTUs, the total delay, and the split between the delay incurred in the rate adaptation FIFO and the retransmission rescheduling queue, are derived for different INPmin in the table 1. The ratio between the guaranteed rate and the net rate is reported in table 2. As a comparison with an interleaver scheme, the maximal rate with the standard parameters of the profile 8a was derived for equivalent INPmin and MaxDelay. The results are illustrated, including the overhead of the Reed-Solomon in the table 3.

TABLE 1

Maximum bearer rate for different INPmin

| INPmin | $N_{ret}$ | $W_{ret}$ | Delay Resequencing (ms) | Delay rate-adaptation FIFO (ms) | Total Delay (ms) | Max $R_d$ (Mbps) |
|---|---|---|---|---|---|---|
| 1 | 1 | 20 | 5.2 | 0.26 | 5.46 | 50.4123 |
| 2 | 2 | 20 | 5.2 | 0.52 | 5.72 | 50.413 |
| 4 | 4 | 20 | 5.2 | 1.04 | 6.24 | 50.413 |
| 8 | 8 | 20 | 5.2 | 2.08 | 7.28 | 50.413 |
| 16 | 16 | 20 | 5.2 | 4.16 | 9.36 | 50.413 |

TABLE 2

Ratio guaranteed rate over net rate for different interarrival time and INP.

|  | | minimum interarrival (ms) | | | | |
|---|---|---|---|---|---|---|
| ratio $R_{in}/R_d$ | | 8 | 16 | 32 | 64 | 128 |
| | 1 | 0.97 | 0.98 | 0.99 | 1.00 | 1.00 |
| INPmin | 2 | 0.93 | 0.97 | 0.98 | 0.99 | 1.00 |
| (DMT) | 4 | 0.87 | 0.93 | 0.97 | 0.98 | 0.99 |
| | 8 | 0.73 | 0.87 | 0.93 | 0.97 | 0.98 |
| | 16 | 0.47 | 0.74 | 0.87 | 0.93 | 0.97 |

NOTE:
$R_d$ is the net data rate without retransmission and
$R_{in}$ is the guaranteed net data rate if impulse event of length INPmin DMT symbols arrives every inter-arrival time.

TABLE 3

Maximum net rate of an interleaver scheme with various MaxDelay and INPmin.

| INPmin | MaxDelay (ms) | Max Net rate (Mbps) | RS overhead (R/N) |
|---|---|---|---|
| 1 | 6 | 101.22 | 10.8% |
| 2 | 6 | 64.44 | 16.7% |
| 4 | 7 | 30.72 | 28.6% |
| 8 | 8 | 12.28 | 50% |
| 16 | 10 | No solution | No solution |

By comparing these tables, it can be determined that, with equivalent delay, the interleaver performs better than the retransmission in terms of maximal achievable rate for low INP requirements (e.g. 1 or 2 DMT symbols). In embodiments, the retransmission scheme could have better performance if the roundtrip delay were decreased. Nevertheless, the interleaver scheme may suffer of a high Reed-Solomon overhead. This high overhead leads in general to a low or negative coding gain. Moreover, it should be carried even when the line is not subject to impulses while the retransmission scheme automatically increases the net data rate in good line conditions.

Figure 7:
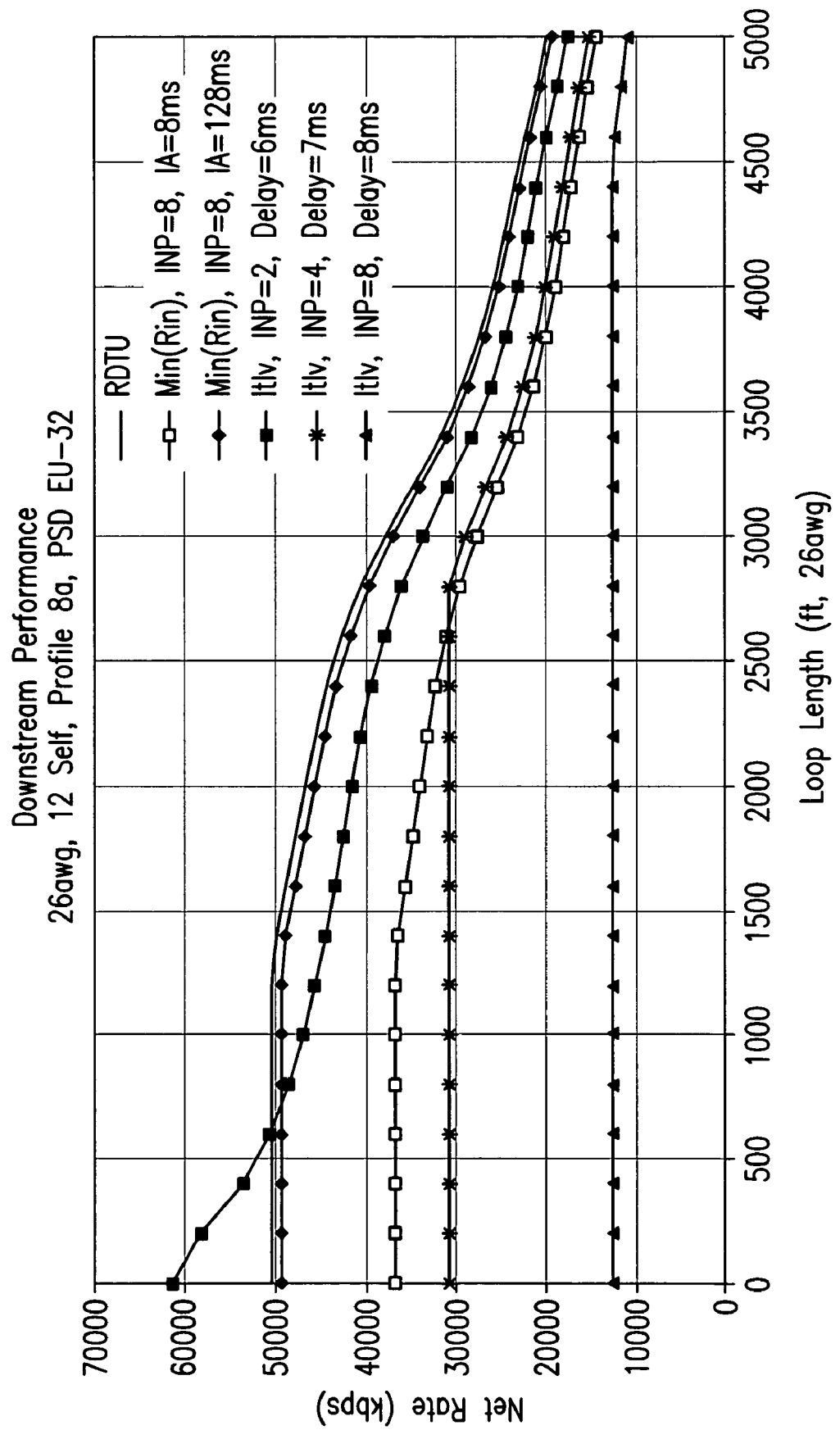
FIG. 7 illustrates the performances of an interleaver scheme.

In order to check the impact of low or negative coding gain, the performances of the interleaver scheme with the INPmin and DelayMax proposed in table 3 were compared with the performance of the retransmission mechanism where the reed-solomon overhead is near to optimum (e.g., RS(239, 255)). Performances are depicted in FIG. 7, which illustrates a comparison of interleaver and retransmission schemes on realistic loop and impulse noise.

The two curves shown with circles and squares show the respective performance of the proposed retransmission scheme with a maximal delay of 8 ms and an INPmin of 8 DMT symbols. In the first case, the inter-arrival time is set to 8 ms as it should be in case of REIN (REpetitive Impulse Noise) at 120 Hz. The performances of retransmission (square curve) outperform those obtained with the equivalent FEC scheme (triangle curve). In this embodiment, the retransmission provides around twice the INP than the FEC scheme for the same performance in case of REIN.

In the second case, the performances were computed with an inter-arrival time of 128 ms as it may be set in a SHINE (Single High Impulse Noise Event) environment. In this embodiment, the performance was almost equal to the maximal performance achievable with the best coding gain, $R_{DTU}$. This is an improvement than an FEC scheme where the amount of overhead is independent of the frequency of the worst case impulse.

Comparison Ideal Interleaver/Ideal Retransmission

The previous section compared the interleaver and retransmission schemes with the standard limitations but it is possible to compare both schemes in a more general way. The formulas of table 4 are used to make the comparison. They are derived by assuming no limitations, like memory size, Dmax, size of DTU, and a perfect granularity in the setting of the interleaver and the retransmission. They can be seen as a continuous extension of the formula for real implementations. In this table:

$R_{line}$ is the data rate at the output of the RS encoder expressed in kbit/s.
DelayMax is the maximum delay in ms.
INPmin is the minimal INP in DMT symbol of duration Ts.
R is the Reed-Solomon overhead and N is the Reed-Solomon codeword length.
Roundtrip is the roundtrip in ms.
IAmin is the minimum Interarrival Time in ms (as defined in section 4).

TABLE 4

Formula for ideal retransmission and interleaver

| | Interleaver | Retransmission |
|---|---|---|
| Delay (ms) | DelayMax | Roundtrip + INPMin × Ts |
| Reed-Solomon overhead (R/N) | $\max\left(\dfrac{\text{INPMin}}{2 \times \text{DelayMax}}, \dfrac{16}{255}\right)$ | $16/255$ |
| Guaranteed rate (kbps) | $\text{Rline} \cdot \left(1 - \dfrac{R}{N}\right)$ | $\text{Rline} \cdot \left(1 - \dfrac{R}{N}\right) \cdot \left(1 - \dfrac{\text{INPMin} \times T_s}{\text{IAMin}}\right)$ |
| Memory requirement (bits) | $\dfrac{\text{DelayMax} \times \text{Rline}}{2}$ | $\text{Roundtrip} \times \text{Rline} \times \left(1 - \dfrac{R}{N}\right)$ |

NOTE -
The overhead of the retransmission has been selected to provide the coding gain of the concatenation of trellis and RS.

From those equations, it is possible to compare the performance of the retransmission and interleaving scheme in terms of available guarantee data rate, delay, and memory usage for a given working point. A working point is defined by a set of MIB configuration of the INPmin, DelayMax, and IAmin; a certain loop and noise condition defined by Rline; and a roundtrip delay, Roundtrip. For all embodiments, the roundtrip delay was set to 5 ms.

Figure 8:
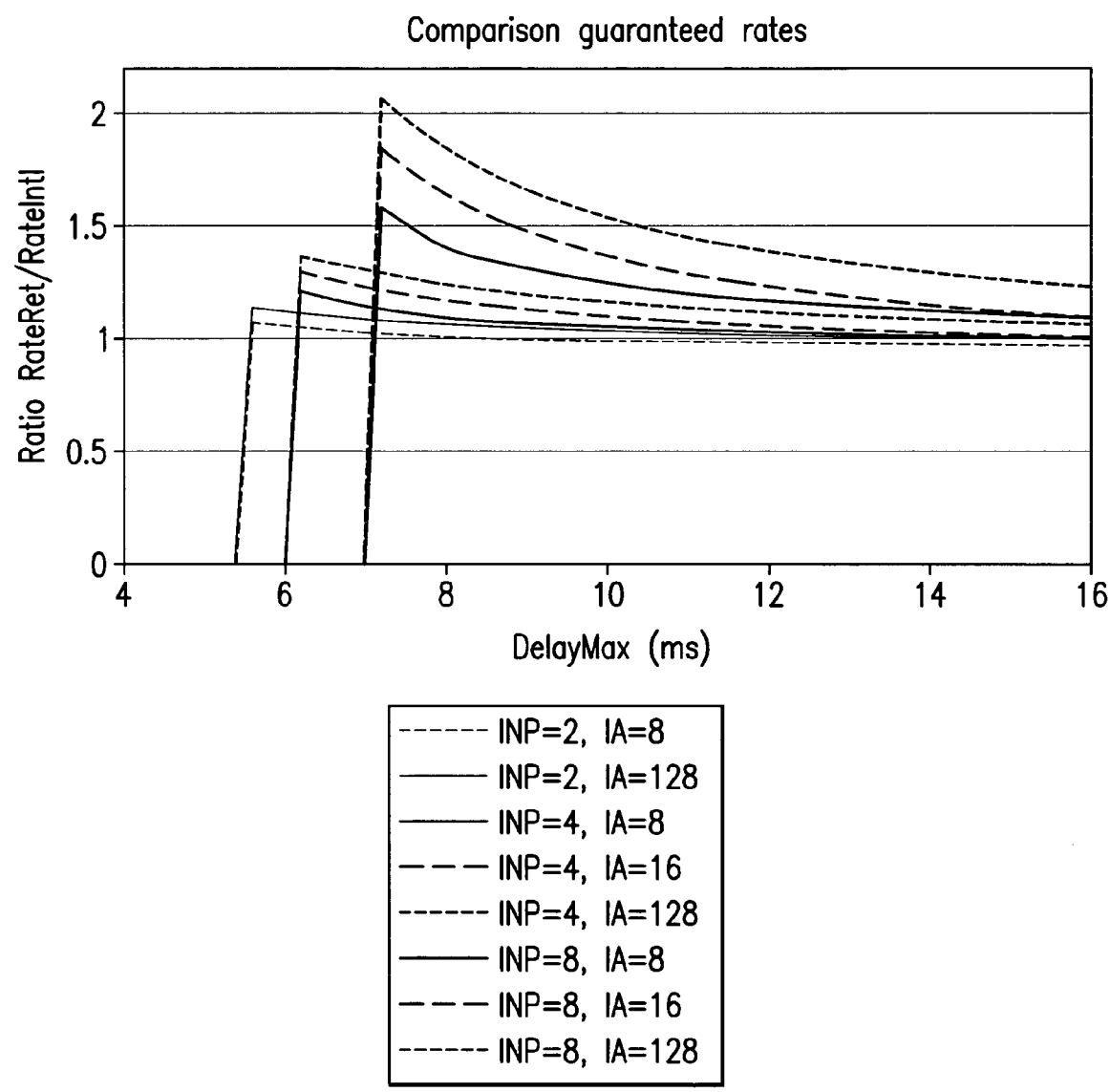
FIG. 8 is a comparison of guaranteed rate between retransmission and interleaver schemes.

FIG. 8 is a comparison of guaranteed rate between retransmission and interleaver schemes. FIG. 8 plots the ratio between the guaranteed rates for retransmission and for interleaving in function of the DelayMax for different INPmin and IAmin. As illustrated, the performance is usually better with a retransmission scheme than with an interleaver when the retransmission may be used, i.e. for a delayMax above (Roundtrip+INP$_{min}$.T$_s$) ms. Moreover, the advantage of the retransmission is increasing for higher INPmin value. These results are independent of R$_{line}$, so for a given loop and noise conditions, the retransmission will usually provide a better rate than the interleaver scheme. Note that IAmin=8 ms corresponds to a REIN-like configuration (IAmin is set equal to DelayMax when DelayMax is larger than IAmin).

Figure 9:
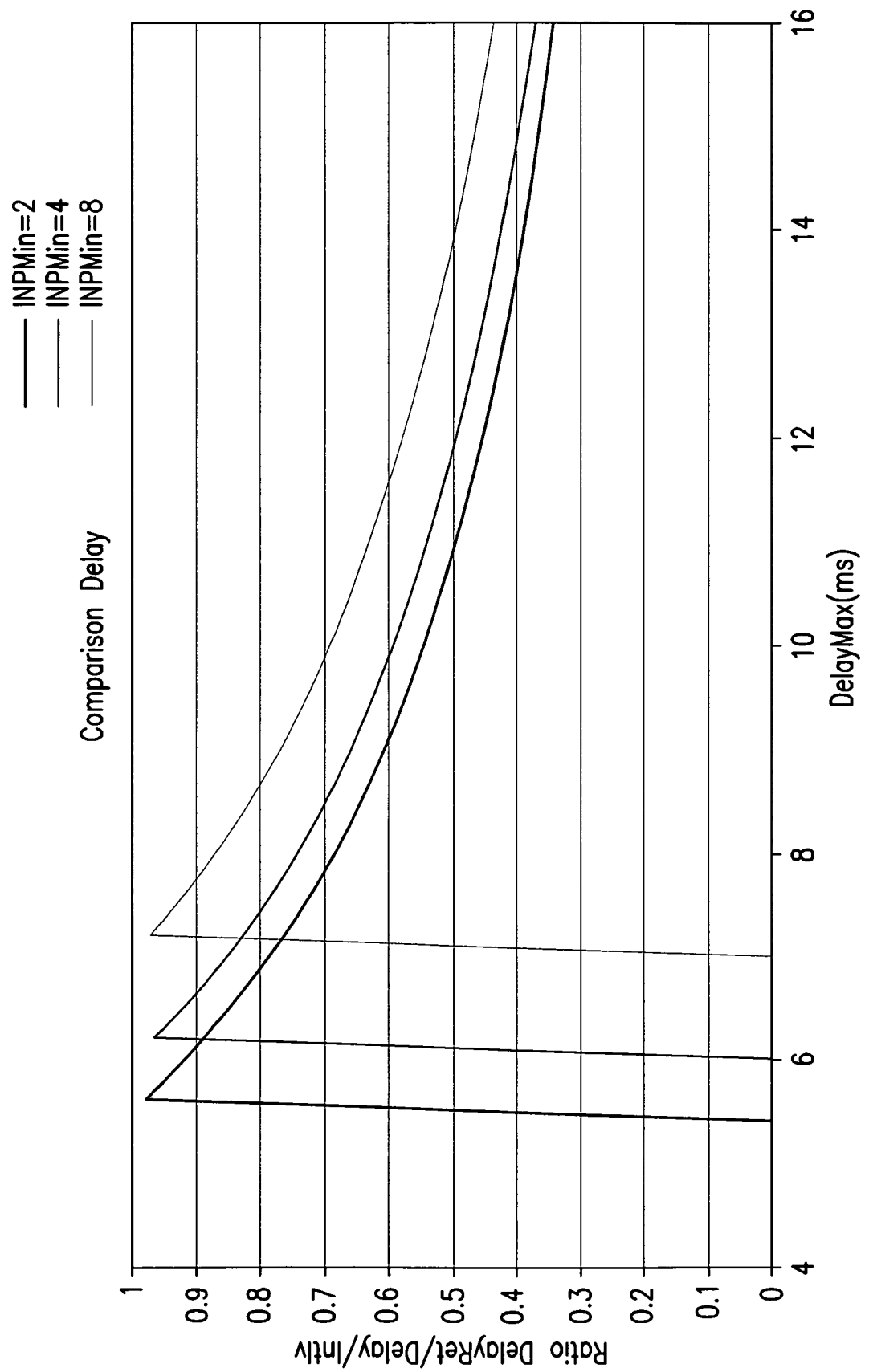
FIG. 9 illustrates the ratio between the delays for retransmission and for interleaving.

FIG. 9 illustrates the ratio between the delays for retransmission and for interleaving. This is independent of the IAmin. The retransmission has a total delay lower than the interleaver if the retransmission may be used. Moreover, as the delay of retransmission is independent of the maximum delay, the advantage of retransmission is increasing with an increase of DelayMax. These results are independent of R$_{line}$, so for a given loop and noise conditions, the retransmission will usually provide a lower delay than the interleaver scheme.

Figure 10:
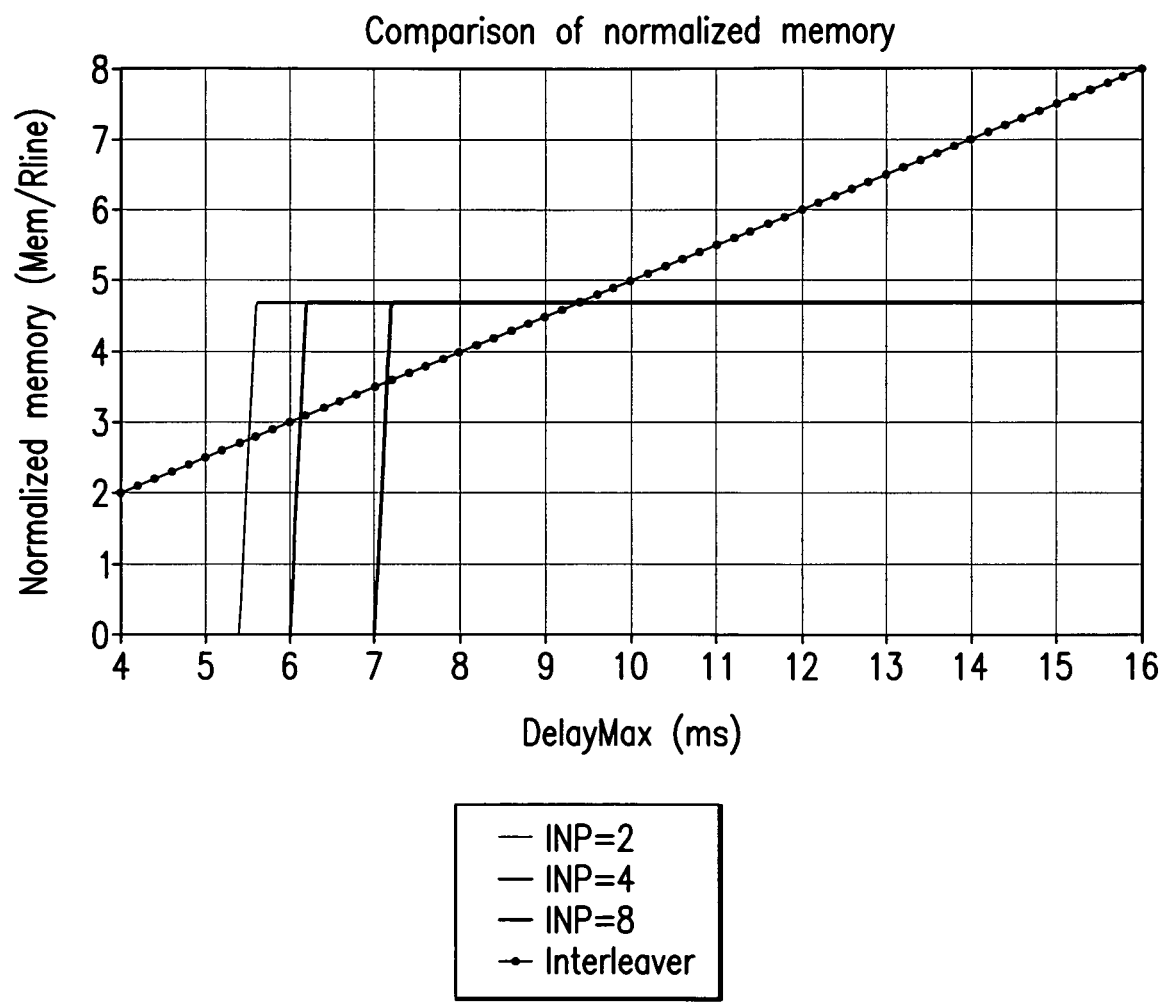
FIG. 10 illustrates the memory required for the interleaver and retransmission normalized by $R_{line}$.

FIG. 10 illustrates the memory required for the interleaver and retransmission normalized by R$_{line}$. This ratio is independent of the INPmin and IAmin. As illustrated, the retransmission used a fixed memory size while the interleaver memory increased with the delay. In fact above 9 ms of DelayMax, the retransmission used systematically less memory for an equal INPmin and R$_{line}$.

FIGS. 7-10 derived in very general conditions show that, for most usual cases, retransmission provides better performance in terms of efficiency and delay than an interleaver scheme when retransmission may be used, i.e. when delayMax is larger than the roundtrip delay. This advantage becomes compelling for INPmin above 2. Furthermore, the retransmission usually requires less memory than the interleaver when the delay is above 9 ms.

The embodiments described above may be adapted for use in existing systems using ADSL2 and VDSL2 standards, and may introduce retransmission in a transparent way. More specifically, certain embodiments may considerably limit the jitter introduced by a retransmission event; may be compatible with all type of data transported (ATM, PTM, or any type of encapsulation protocols); may minimize the modifications to existing systems; may be coupled to the physical link where the problem occurs; and may handle retransmission inside the constrains of a fixed data frame format that cannot cope with any data loss. In one variation, one may select the best place to insert the "retransmission layer" within an existing xDSL data flow.

Error Detection

In embodiments, a retransmission scheme makes use of some kind of error detector. This error detector can be implemented in different ways and the exact implementation is unimportant considering only the feasibility of a retransmission scheme. Retransmission techniques make use of retransmission of the corrupted receive data in order to achieve the target BER requirement. One important operation is the identification of the corrupted data. This error detector has to be reliable in order to make the scheme efficient. In xDSL system, there are different types and locations for this error detector, including:

A specific detector based on some overhead added to the transmitted data
Make use of the already present CRC checksum
Make use of the already present RS overhead Reed-Solomon FEC redundancy combines the advantages of short round trip delay and availability in xDSL systems.

RS Based Error Detection

In an embodiment, R bytes are used as Reed-Solomon overhead in a codeword of length N. The RS decoder can correct up to R/2 bytes in this codeword. Depending on the number of corrections made, one can compute the probability for a mis-correction, a correction which does do restore the original correct data. The probability is smaller as the number of corrections made to the codeword is smaller. For a given number of corrections, this probability is also smaller as the codeword length decreases.

For embodiments of the disclosed retransmission scheme, the two following characteristics are desirable. First, the error detector should have some correction capability. For instance, assume that 5% of the codeword data are corrupted for every symbols (5% of the carrying tones suddenly very noisy for a long period), if there is no correction capability, the scheme would ask a retransmission for all the symbols leading rapidly to a frozen transmission. Second, the error detector should be highly reliable. As retransmission techniques allow to get rid of the data correction techniques or at least allow to reduce their correction capability, it is important that any corrupted data is detected as such in order to be retransmitted. Otherwise the corrupted data goes through with no or only limited possibility of further correction.

The RS overhead is typically suited to cope with these two characteristics. Indeed, based on the chosen mis-correction probability p$_{mis-corr}$, the detector should correct the receive codeword if the mis-correction probability is smaller than p$_{mis-corr}$. In this case no retransmission is requested. Further, the detector should ask for a retransmission if the probability is larger than p$_{mis-corr}$. In this case, the received codeword will however be corrected in order to transfer the most likely codeword in case the retransmission does not arrive on time (before the codeword has to be transfer to upper layers).

Additional Exemplary Embodiments

Figure 11:
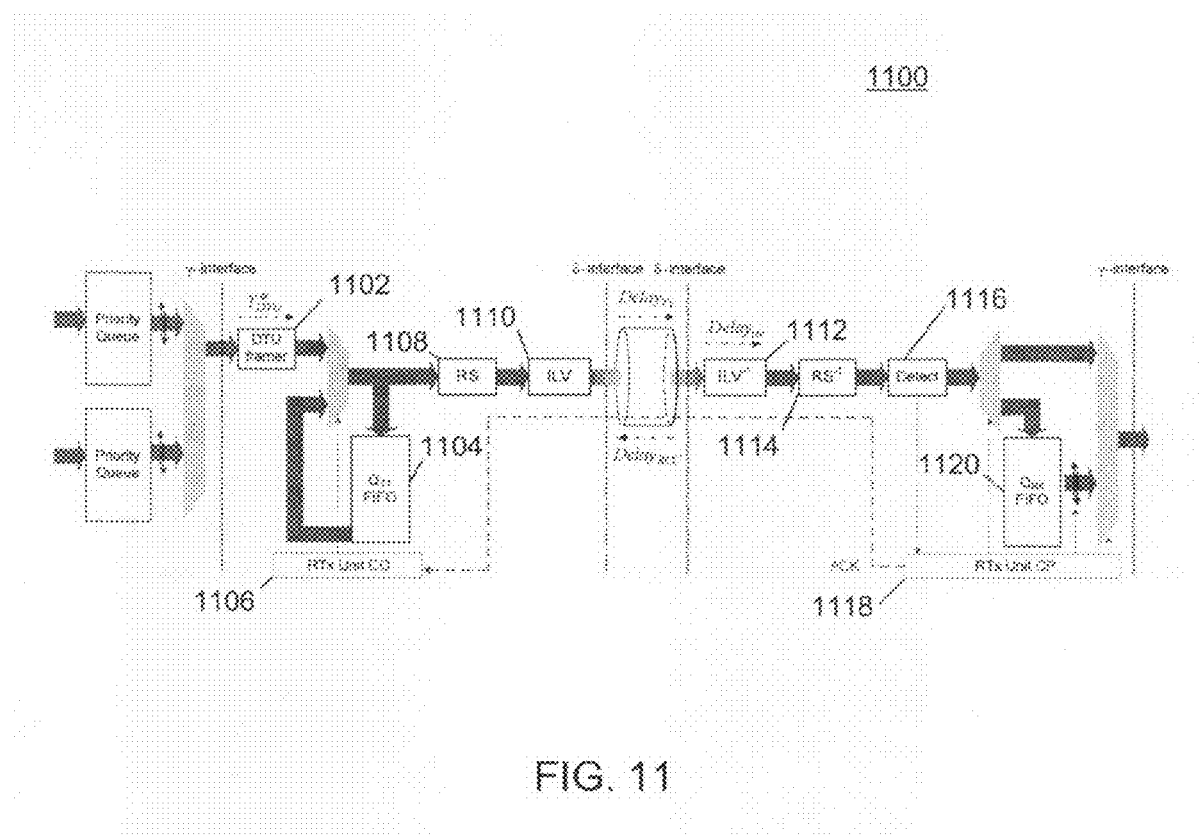
FIG. 11 illustrates a diagram of a system that provides for retransmission.

FIG. 11 shows a diagram of another exemplary system 1100 that provides for retransmission. For example, system 1100 may rely on a layer-α (i.e., the PMS-TC layer, as described above) retransmission scheme to provide protection against REIN and SHINE. System 1100 includes a DTU framer 1102, a retransmission 1104, an RTx Unit Co 1106, an RS encoder 1108, an interleaver 1110, a deinterleaver 1112, an RS decoder 1114, a detector 1116, an RTx Unit CP 1118, and a rescheduling queue 1120. In an embodiment, alpha DTUs include D blocks of K bytes. Each block being encoded by a RS(N, K) code. D RS codewords are interleaved together by a depth-D block interleaver synchronized with DTUs. The DTU size is noted as K$_{DTU}^{\alpha}$=K·D and the DTU duration (in sec) as $$T_{DTU}^{\alpha} = \frac{8 \cdot K_{DTU}^{\alpha}}{L} \cdot \frac{N}{K} \cdot T_s = \frac{8 \cdot N \cdot D}{L} \cdot T_s.$$

At the transmitter, retransmission queue 1104 can store up to Q$_{Tx}$ DTUs. At the receiver, the rescheduling queue can store up to Q$_{Rx}$ DTUs. A return control channel (RCC) is mapped on 3 bytes per DMT symbol provides information about correctly or wrongly received DTUs.

In an embodiment, autonomous retransmission is enabled in which all DTUs that are not explicitly acknowledged are retransmitted when they leave the retransmission queue and stored again in the transmission queue. In such an embodiment, only a "delayed" retransmission mode is used and autonomous retransmission can occur. Thus, autonomous retransmissions can occur when an explicit acknowledgement does not go through.

The sizes of the retransmission and rescheduling queues depend on the maximum number of DTUs to be retransmitted in a given particular impulse noise scenario. A conservative way of dimensioning the retransmission queue involves considering the worst-case impulse noise scenario. Thus, one can achieve a certain protection against any impulse event being less constraining than the worst-case impulse event. In a single noise (SHINE or REIN) environment with impulses of length $IL \leq INP_{max}$, a worst-case impulse event corresponds to $INP_{min}$ contiguous corrupted DMT symbols. $N_{rtx,GP}$ is noted as the maximum number of DTUs that are retransmitted due to such worst-case event. Assuming a "noise-proof" return channel, $N_{rtx,GP}$ can be expressed as $$N_{rtx,GP} = \left\lceil \frac{INP_{min} \cdot L}{8 \cdot N \cdot D} \right\rceil + 1.$$

In a mixed noise environment such as REIN+SHINE, the worst-case impulse event occurs when a SHINE impulse hits in between 2 REIN impulses, with no overlap. Then, $N_{rtx,GP}$ can be fairly approximated by $$N_{rxt,GP} = \underbrace{\left(\left\lceil \frac{INP_{min}^{shine} \cdot L}{8 \cdot N \cdot D} \right\rceil + 1\right)}_{N_{rtx,GP}^{shine}} + \underbrace{\left(\left\lceil \frac{INP_{min}^{rein} \cdot L}{8 \cdot N \cdot D} \right\rceil + 1\right)}_{N_{rtx,GP}^{rein}}.$$

Since, a random alignment between DTUs and DMT symbols exists, the average number $N_{rtx,avg}$ of DTUs that are retransmitted for achieving a protection against a noise impulse that is $INP_{min}$ long can also be defined. In a single noise environment, assuming a noise-proof return channel, $N_{rtx,avg}$ can be approximated by $$N_{rtx,avg} = \frac{INP_{min} \cdot L}{8 \cdot N \cdot D} + 1.$$

If the real impulse on the line has a length IL, expressed in seconds, that it is not corrupting always INPmin DMT symbols, the value of INPmin may be replaced by $(1+IL/Ts)$ above.

In a mixed noise environment $N_{rtx,avg}$ can be approximated by:

$$N_{rtx,avg} = \underbrace{\left(\frac{INP_{min}^{shine} \cdot L}{8 \cdot N \cdot D} + 1\right)}_{N_{rtx,avg}^{shine}} + \underbrace{\left(\frac{INP_{min}^{rein} \cdot L}{8 \cdot N \cdot D} + 1\right)}_{N_{rtx,avg}^{rein}}.$$

Expressing $N_{rtx,avg}$ as a function of $N_{rtx,avg}^{shine}$ and $N_{rtx,avg}^{rein}$ simplifies the throughput calculation. Moreover, most of the times only $N_{rtx,avg}^{rein}$ DTUs will be retransmitted, which is similar to assuming a pure REIN environment.

The return channel can be affected by the impulse noise (bi-directional impulse assumption). In such case, some requests cannot reach back to the transmitter. When not receiving the ACK, the transmitter will then unnecessarily retransmit some DTUs that were not corrupted by the impulse. Such retransmission is referred to as "autonomous" retransmission, and $N_{rtx,aut}$ is noted as the number of unnecessary retransmitted DTUs. As a consequence, under bi-directional impulse assumption, $N_{rtx,GP}$ and $N_{rtx,avg}$ is increased by $N_{rtx,aut}$.

In order to reduce the number of unnecessary retransmissions (i.e., $N_{rtx,aut}$), each retransmission request may contain the acknowledgements of several previous DTUs. In an embodiment, $N_{rtx,aut}$ is expressed as:

$$N_{rtx,aut} = \begin{cases} 0, & \text{if } Q_{Tx} \cdot T_{DTU}^{\alpha} > Delay_{Tx} + Delay_{ilv} + Delay_{RCC} + INP \cdot T_s \\ \dfrac{Delay_{ilv} + \min\left(\begin{array}{c} INP \cdot T_s + Delay_{Tx} + Delay_{RCC} - \\ Q_{Tx} \cdot T_{DTU}^{\alpha}; Roundtrip_{Rx} \end{array}\right)}{T_{DTU}^{\alpha}}, & \text{otherwise} \end{cases}.$$

Sizing the Retransmission Queue

A number of techniques exist for sizing the retransmission queue. A first technique of sizing retransmission queue 1104 involves minimizing the roundtrip delay and it incurs possible autonomous retransmissions so that:

$$Q_{Tx} \geq \left\lceil \frac{Delay_{Tx} + Delay_{ilv} + Delay_{RCC}}{T_{DTU}^{\alpha}} \right\rceil.$$

The second technique aims at reducing the number of autonomous retransmissions of correctly received DTUs by choosing, for a single IN environment (i.e., by nulling $N_{rtx,aut}$), so that:

$$Q_{Tx} \geq \left\lceil \frac{Delay_{Tx} + Delay_{ilv} + Delay_{RCC} + INP \cdot T_s}{T_{DTU}^{\alpha}} \right\rceil.$$

Or for a mixed REIN+SHINE environment by nulling the $N_{rtx,aut}$ due to REIN $$Q_{Tx} \geq \left\lceil \frac{Delay_{Tx} + Delay_{ilv} + Delay_{RCC} + INP_{min}^{rein} \cdot T_s}{T_{DTU}^{\alpha}} \right\rceil$$

In an embodiment, nulling $N_{rtx,aut}$ involves increasing the memory requirements, and hence will not necessarily yield the best rate. The trade-off between increasing latency (and hence memory) and reducing the number of autonomous retransmission can be evaluated for both above techniques.

Size of the Rescheduling Queue

The rescheduling queue 1120 is able to store DTUs so that the system is able do up to $$M = \lfloor Q_{Rx} / Q_{Tx} \rfloor$$

retransmissions of the same DTU, and therefore $Q_{Rx} = M \cdot Q_{Tx}$.

Throughput Rate

The average throughput rate for a guaranteed protection $INP_{min}$ under memory constraint is given by:

$$R_{in} = \frac{K-1}{K} \cdot \left(1 - \left(\frac{N_{rtx,avg}^{shine} + N_{rtx,aut}^{shine}}{IA_{min}^{shine}} + \frac{N_{rtx,avg}^{rein} + N_{rtx,aut}^{rein}}{IA_{min}^{rein}}\right) \cdot T_{DTU}^{\alpha}\right).$$

$$\min\left(\frac{K}{N} \cdot R_{line}, R_{d,max}\right), \text{ where } \frac{K-1}{K}$$

denotes the rate loss due to the overhead byte per RS codeword.

$N_{rtx,avg}^{rein}$ and $N_{rtx,aut}^{rein}$ are computed assuming a single REIN environment, $N_{rtx,avg}^{shine}$ and $N_{rtx,aut}^{shine}$ are computed assuming a mixed REIN+SHINE environment, and $R_{d,max}$ denotes the maximum RS encoder input rate under transmitter PHY memory constraint. $R_{d,max}$ is given by:

$$R_{d,max} = \frac{8 \cdot (Mem_{PHY,Tx} - N \cdot D)}{Q_{Tx} \cdot T_{DTU}^{\alpha}}.$$

The term $Mem_{PHY,Tx}$ is further defined below.

Size of the Rate Adaptation or Shaping Buffer

The rate adaptation (or shaping) buffer includes a FIFO memory that compensates for the traffic interruptions due to retransmissions. The shaping FIFO size is determined based on the capability of the system to correct a single impulse overlapping up to $INP_{max}$ DMT symbols. Thus, the maximum number $N_{rtx,max}$ of DTUs to store in the shaping buffer is given by:

$$N_{rtx,max} = \left\lceil \frac{INP_{max} \cdot T_s}{T_{DTU}^{\alpha}} \right\rceil + 1.$$

The value of $INP_{max}$ must be set such that $N_{rtx,max} = N_{rtx,GP}^{REIN} + N_{rtx,GP}^{SHINE}$, in case of compound IN but can be set to a higher value.

End-to-End Delay

The system end-to-end (e2e) delay is given by:

$$Delay_{e2e} = \underbrace{N_{rtx,max} \cdot T_{DTU}^{\alpha}}_{Delay_{shape}} + \underbrace{T_{DTU}^{\alpha} + Delay_{Tx} + \overbrace{\left\lceil \frac{8 \cdot N \cdot D}{L} \right\rceil \cdot T_s}^{Delay_{ilv}}}_{Delay_{PHY}} + \underbrace{Q_{Rx} \cdot T_{DTU}^{\alpha}}_{Delay_{resched}}.$$

where:

$Delay_{shape} = N_{rtx,max} \cdot T_{DTU}^{\alpha}$ is the jitter delay due to the rate adaptation (shaping) FIFO;

$Delay_{Tx}$ corresponds to the worst-case delay through the alpha/beta interface (does not take into account any delay due to FEC+ILV in the PMS-TC layer);

$T_{DTU}^{\alpha}$ denotes the delay due to DTU framing (i.e., block interleaving);

$$Delay_{ilv} = \left\lfloor \frac{8 \cdot N \cdot D}{L} \right\rfloor \cdot T_s$$

denotes the block deinterleaving (before RS decoding); and $Delay_{resched} = Q_{Rx} \cdot T_{DTU}^{\alpha}$ denotes the maximum delay due to rescheduling at the receiver. This delay can be either added to:

the PHY delay if using outlet shaper, i.e., DTUs are delayed at the receiver PHY by $Q_{Rx}$;

the jitter delay if no using outlet shaper, i.e., a correct DTU is forwarded to higher layer if no retransmissions are pending for older DTUs.

Memory Requirements

The transmitter Network Processing (NP) level includes the shaping FIFO that must be able to store $N_{rtx,max}$ DTUs. The total NP memory (in bytes) required on the CO side is then given by $Mem_{NP,Tx} = N_{rtx,max} \cdot K \cdot D$.

At the transmitter PHY layer, the modem stores:

$Q_{Tx}$ DTUs in the retransmission FIFO;

K·D bytes in the DTU framer prior to the retransmission FIFO; and

R·D bytes in to store the DTU redundancy after RS encoding and prior to block interleaving. In an embodiment, this memory is optional as it is needed for the encoding of the DMT symbols.

The total PHY memory (in bytes) required on the CO side is given by $Mem_{PHY,Tx} = (K \cdot Q_{Tx} + N) \cdot D$.

At the receiver PHY layer, the modem must be able to store:

$Q_{Rx} = M \cdot Q_{Tx}$ DTUs in the rescheduling queue, e.g., rescheduling queue 1120; and N·D bytes in the block deinterleaver before RS decoding. In an embodiment, this memory is optional, since it may well be already present to decode a DMT symbol.

The total PHY memory (in bytes) required on the CP side is given by $Mem_{PHY,Rx} = (K \cdot Q_{Rx} + N) \cdot D$.

Design Constraints and Optimization

In an embodiment, one design constraint is to maximize the throughput rate for each specific noise condition. An algorithm to derive the highest rate can be summarized as follows:

(1). Fix L, $D_{min}$, R, the maximal DTU duration $T_{DTU,max}^{\alpha}$, and the maximum available memory $Mem_{Tx,PHY,max}$ and $Mem_{Rx,PHY,max}$ at the PHY layer;

(2). For all N, compute D, $Q_{Tx}$, $Q_{Rx}$, M under the constraints listed in Table 5, below, and such that:

The DTU duration $T_{DTU}^{\alpha}$ is minimized; and

The rescheduling queue size $Q_{Rx}$ is minimized;

(3). Compute the throughput rate $R_{in}$ for each set of parameters computed in (2);

(4). If assuming bi-directional impulses, repeat the (2) and (3) by replacing the constraint (ii) with $$Q_{Tx} \geq \left\lceil \frac{Delay_{Tx} + Delay_{ilv} + Delay_{RCC} + INP \cdot T_s}{T_{DTU}^{\alpha}} \right\rceil \text{ or }$$

$$Q_{Tx} \geq \left\lceil \frac{Delay_{Tx} + Delay_{ilv} + Delay_{RCC} + INP_{min}^{rein} \cdot T_s}{T_{DTU}^{\alpha}} \right\rceil$$

depending on being in a case of REIN or SHINE only or REIN and SHINE, respectively;

(5). Select as a solution, the value of N and associate parameters maximizing the rate $R_{in}$;

(6). Check that no solution with a lower L gives a higher rate. If such solution exists, then select the solution with a lower L.

TABLE 5

Design Constraints in Single and Mixed IN Environments

| REIN or SHINE only | REIN + SHINE | |
|---|---|---|
| $125\ \mu s \leq T_{DTU}^\alpha \leq T_{DTU,max}^\alpha$ | | (i) |
| $Q_{Tx} \geq \left\lceil \dfrac{Delay_{Tx} + Delay_{ilv} + Delay_{RCC}}{T_{DTU}^\alpha} \right\rceil$ | | (ii) |
| $M = \max\left(\left\lfloor \dfrac{Q_{Rx}}{Q_{Tx}} \right\rfloor, 1\right)$ | $M = \max\left(\left\lfloor \dfrac{Q_{Rx}}{Q_{Tx}} \right\rfloor, 2\right)$ | (iii) |
| $Q_{Rx} = M \cdot Q_{Tx}$ | | (iv) |
| $Mem_{Rx,PHY} < Mem_{Rx,max}$ | | (v) |
| $Mem_{Tx,PHY} < Mem_{Tx,max}$ | | (vi) |
| $D \geq D_{min}$ | | (vii) |
| $(Q_{Rx} + N_{rtx,GP}) \cdot T_{DTU}^\alpha \leq \lfloor k \cdot IA \rfloor$ and $Q_{Rx} \geq \left\lceil \dfrac{(k-1)\cdot IA + INP \cdot T_s}{T_{DTU}^\alpha} \right\rceil + 1$ for one integer $k > 0$ | $(Q_{Rx} + N_{rtx,GP}^{rein}) \cdot T_{DTU} \leq \lfloor k \cdot IA_{rein} \rfloor$ and $Q_{Rx} \geq \left\lceil \dfrac{(k-1)\cdot IA_{rein} + INP_{rein} \cdot T_s}{T_{DTU}^\alpha} \right\rceil + 1$ for one integer $k > 0$ | (viii) |
| | $(Q_{Tx} + N_{rtx,GP}^{rein}) \cdot T_{DTU}^\alpha \leq \lfloor IA_{rein} \rfloor$ | (ix) |
| | $N_{rtx,GP}^{shine} \leq (M-1) \cdot Q_{Tx}$ | (x) |

Constraint (viii) imposes a constraint on the setting of IA and INP. Furthermore, IA>2*INP if $Q_{tx} > N_{rtx,GP}$ must also be satisfied. This is a limitation of the model.

Figure 12:
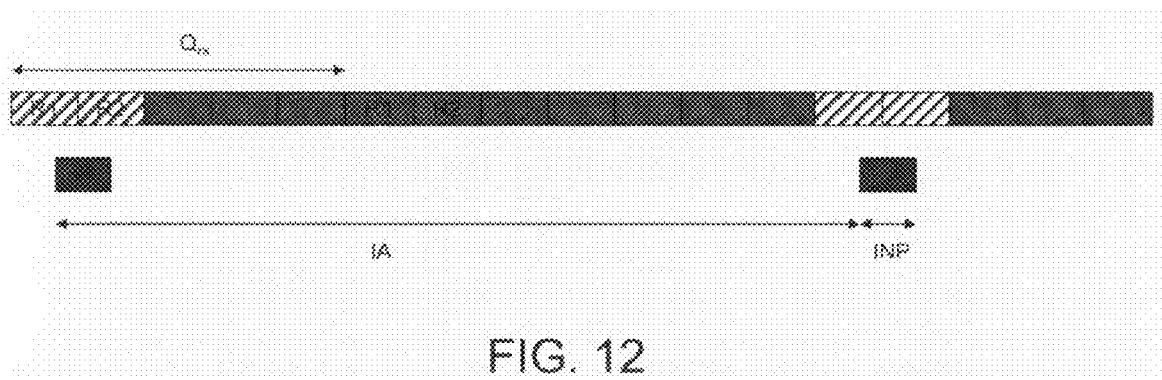
FIGS. 12-16 illustrate exemplary xDSL communication sessions.
Figure 13:
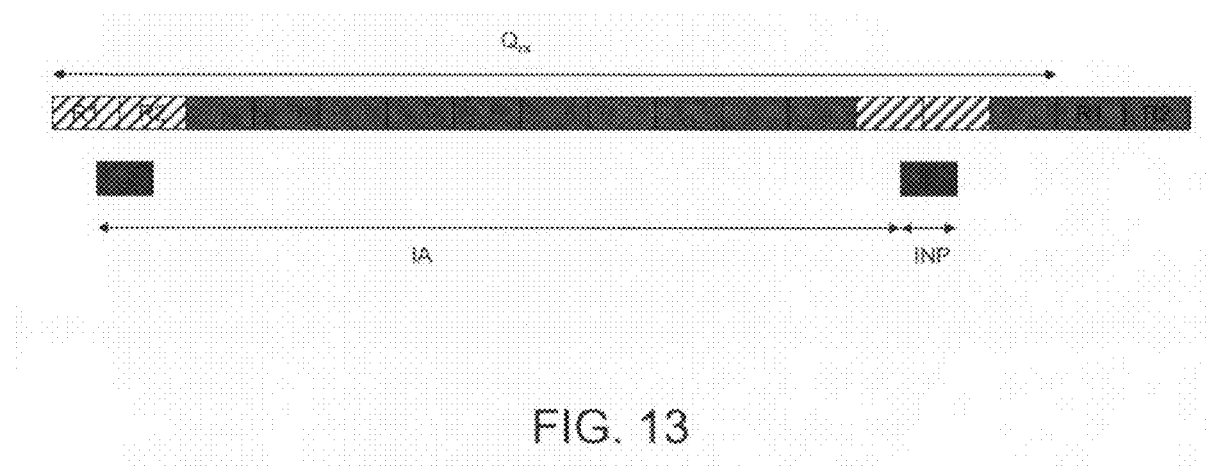

In the first column of Table 5, above, the constraint (viii) ensures that retransmissions of corrupted DTUs are not hit by the next error event. For REIN only, this constraint is usually easily met for k=1 as Roundtrip<$IA_{rein}$ (i.e., 32 symbols@120 Hz). For SHINE only, this condition is can be met as the inter-arrival time is much longer than the roundtrip delay. FIG. 12 shows an example of constraint (viii) with $(Q_{Rx}+N_{rtx,GP}) \cdot T_{DTU}^\alpha \leq \lfloor IA \rfloor$, where IA is the inter-arrival time between errors, to illustrate this concept. FIG. 13 shows an example of constraint (viii) with $$Q_{Rx} > \left\lceil \frac{IA + INP \cdot T_s}{T_{DTU}^\alpha} \right\rceil + 1.$$

Figure 14:
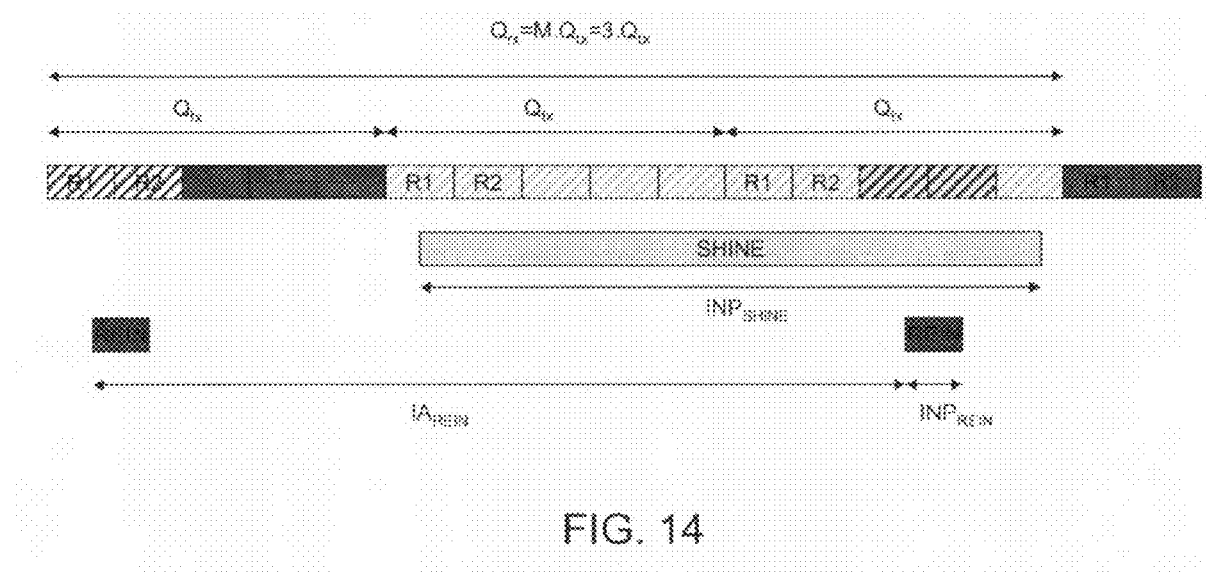
Figure 15:
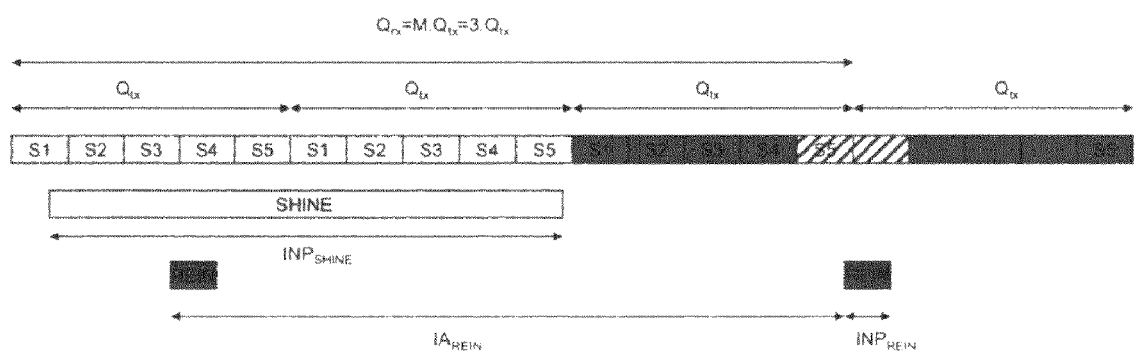

The second column of Table 5, above, is constructed by using the same constraints (i) to (viii) as the single IN case, where the IA and INP are those of the component REIN. Those constraints force that the $M^{th}$ retransmission of DTU corrupted by REIN is not hit by REIN again. Then, an extra constraint (ix) forces that the first retransmission of the DTU corrupted by REIN is not hit by REIN either. Therefore, there is a minimal distance of $(M-1) \cdot Q_{Tx}$ DTUs between two retransmissions of DTU corrupted by REIN. This is the maximal duration of a SHINE and explains the constraint (x). Therefore, a minimum of two retransmissions is needed to sustain REIN and SHINE if no DTU repetition is used. FIGS. 14 and 15 shows examples of retransmissions of REIN hit by SHINE and retransmissions of SHINE hit by REIN, respectively.

PMT-TC Retransmission with Blanking for REIN

In this mode, some time slots, called retransmission containers (RC), containing a DTU are marked as likely to be wrong due to REIN. The position of those time slots can be estimated based on the information of corrupted DTUs received in the return channel. DTU sent in those time slots are autonomously and directly retransmitted until they reach a correct time slot.

To take into account the imprecision and the drift of the INP of the REIN, a conservative number of time slots must be marked as likely to be wrong. The number of time slots can be defined as $N_{wrong}$, with:

$$N_{wrong} = \left\lceil (INP_{rein} + 1) \cdot \frac{T_s}{T_{DTU}^\alpha} \right\rceil + 1.$$

Figure 16:
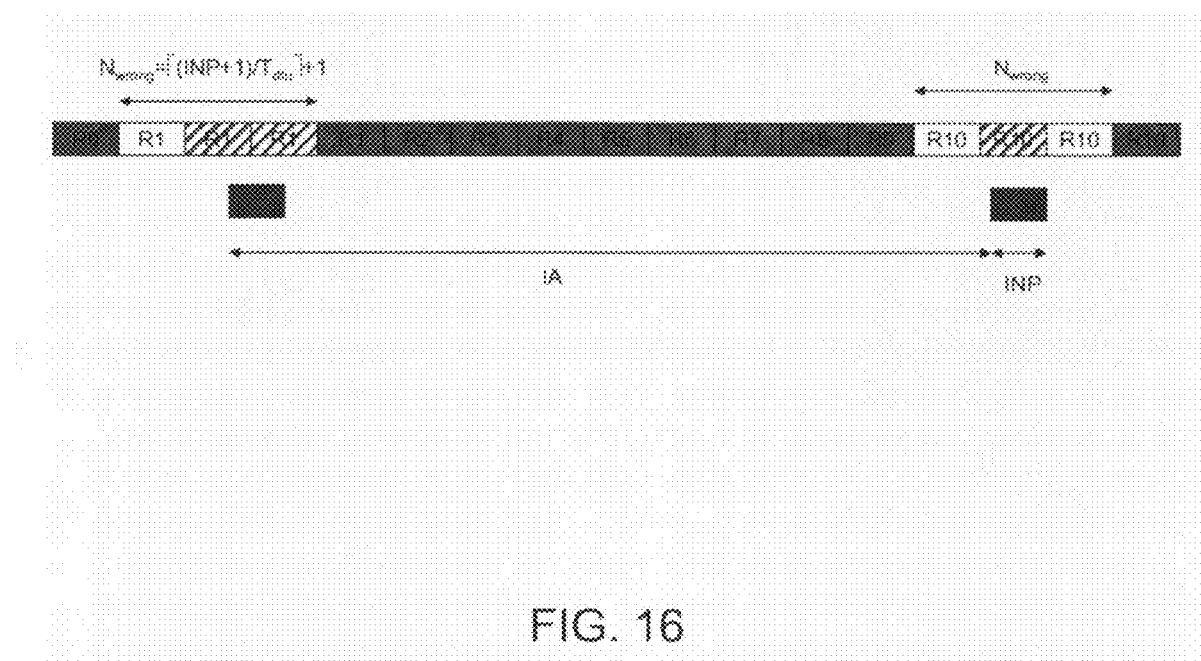

FIG. 16 shows a layer-α retransmission with blanking for REIN that depicts the principle of blanking for REIN. In this case the algorithm to derive the maximum data rate is identical to the case with SHINE only, where the IA and INP are the values for the SHINE. However, the queuing delay and the receiver memory are modified as followed in order to handle the variation of the roundtrip caused by the fast autonomous retransmissions:

$Mem_{PHY,Rx} = (K \cdot (Q_{Rx} + N_{wrong}) + N) \cdot D;$ $Delay_{resched} = (Q_{Rx} + N_{wrong}) \cdot T_{DTU}^\alpha.$ Also, the throughput rate $R_{in}$ is modified to take into account autonomous retransmissions. This is done by replacing $N_{rtx}^{rein}$ with $N_{wrong}$, thereby yielding:

$$R_{in} = \frac{K-1}{K} \cdot \left(1 - \left(\frac{N_{rtx,avg}^{shine} + N_{rtx,aut}^{shine}}{IA_{min}^{shine}} + \frac{N_{wrong}}{IA_{min}^{rein}}\right) \cdot T_{DTU}^\alpha\right) \cdot \min\left(\frac{K}{N} \cdot R_{line}, R_{d,max}\right).$$

Additional Exemplary Retransmission Embodiments

Retransmission can also be used to protect the data stream from burst of errors that are not corrected by the FEC. As described above, retransmission can be supported in the latency path #0.

In an embodiment, a Data Transmission Unit (DTU) can consist of (K−1)×D octets of data received from a scrambler and D octets of overhead spread every (K−1) octets of data. The value of K is equal to the number of payload octet of the selected Reed-Solomon codewords and D is equal to the depth of the block interleaver. The total size of a DTU is K×D bytes. Every overhead byte contains the 8 LSB of the Sequence IDentifier (SID) of the DTU. The SID is equal to 0 for the first DTU. For each new DTU, it is incremented by 1.

The length of a DTU in data symbols is equal to S×D. All length values between ½ and 4 data symbols can be supported.

The Retransmission Queue

The retransmission function can manage the retransmission queue. The retransmit queue includes multiple retransmission containers (RCs). Every DTU transmitted to the FEC function is stored in the retransmission queue in a new RC. A retransmission container fully identifies the data sent to the FEC function at any time.

Each RC can be uniquely identified through its retransmission container index (RCI). The RCI value of the RC in which the next DTU sent to the FEC is stored, curRCI, is initialized to 0 when entering showtime (i.e., after initialization is complete and transmission of data begins). It is incremented by 1 each time a DTU is sent to the FEC. This same index is locally maintained by the remote receiver function to identify every DTU coming out of the FEC function. Therefore, the RCI can be used by both transmitter and receiver to uniquely identify a same DTU.

The RC with the $k^{th}$ RCI, noted RC[k], contains:
  A single DTU (a new one coming from the framer, or a retransmitted one already present in another RC), noted RC[k].DTU.
  A second index, noted RC[k].firstRCI, being the RCI of the first RC that contained the DTU with the same SID as the one present in the DTU part of the current RC. If the RC contains a DTU that has never been sent before, then RC[k].firstRCI=k.
  A status, noted RC[k].status, that may take one of the following values:
    0 or UNKNOWN meaning that it is unknown if the DTU in the RC is received correctly by the far-end VTU. This is the state of every new RC entering the retransmission queue.
    1 or ACKNOWLEDGED meaning that the DTU in the RC is received correctly by the far-end VTU.
    2 or DISCARDED meaning that the DTU in the RC is too old to be retransmitted.
    3 or TO_BE_RETRANSMITTED means that the DTU in the RC should be retransmitted.
    4 or RETRANSMITTED means that the DTU in the RC is retransmitted.

The values of RC[k].status and RC[k].firstRCI can be used and updated by a state machine of the retransmission and the processing of the retransmission requests.

At any time during showtime, it is possible to extract a DTU from the $Q_{Tx}$ RCs held in the retransmission queue with RCI ranging from curRCI-QTx to curRCI-1. $Q_{Tx}$ is the length of the retransmission queue in DTU as communicated during initialization. The size of the retransmission queue is defined as $Q_{Tx}$×K×D octets. The valid values of $Q_{Tx}$ are any integers between 1 and 64. The VTU can support all valid values of $Q_{Tx}$.

Every time a DTU is requested by the FEC, the statuses of the RCs in the retransmission queue are updated and it is determined if a retransmission is needed by setting the flag, requestRetransmit, and the index of the RC containing the DTU to be retransmitted, requestedRCI. If a retransmission is needed (e.g., requestRetransmit==TRUE), the DTU is extracted from the RC stored at the index requestedRCI and sent to the FEC function. If no retransmission is needed (e.g., requestRetransmit==FALSE), a new DTU is generated from the scrambler data and sent to the FEC. As explained above, the DTU sent to the FEC is stored in a new RC in the retransmission queue in both cases.

Figure 17:
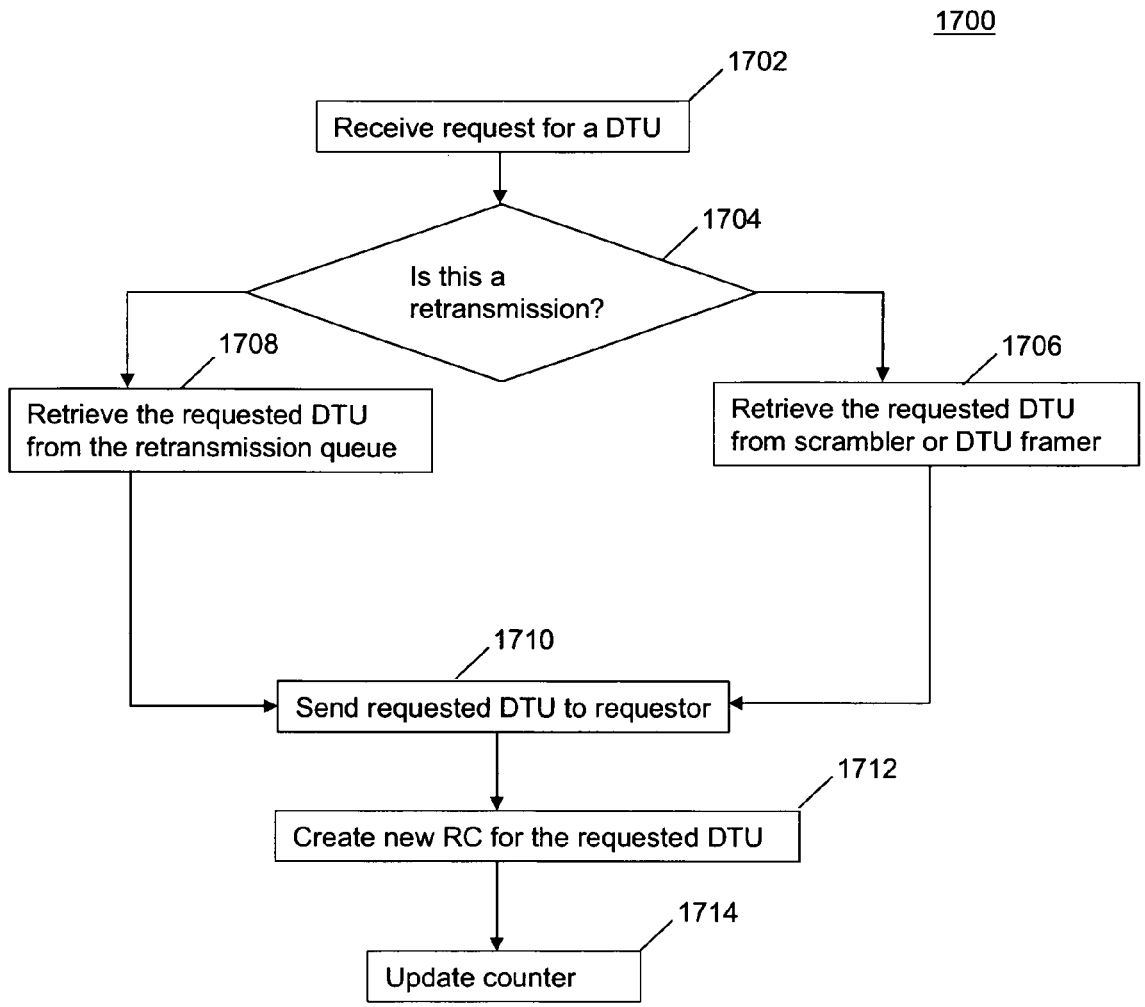
FIG. 17 is a flow chart illustrating an exemplary method for managing a retransmission queue.

A method for managing a retransmission queue is described in FIG. 17. The method 1700 illustrated in FIG. 17 can be performed from the standpoint of the transmitter, which could be located, for example, at a central office facility.

According to step 1702, a request for a DTU is received. For example, the request can come from a FEC module.

In step 1704, it is determined if the requested DTU is a retransmission. For example, the requestRetransmit flag may be polled to determine whether the DTU needs to be retransmitted.

If the requested DTU is not a retransmission, method 1700 proceeds to step 1706. In step 1706, the requested DTU is retrieved from a scrambler, DTU framer, or other device.

If the DTU is a retransmission, method 1700 proceeds to step 1708. In step 1708, the requested DTU is extracted from the retransmission queue. For example, the requested DTU may be extracted from the RC that has an index of requestedRCI.

In step 1710, the requested DTU is sent to the requestor. For example, the requested DTU can be sent to the FEC that requested the DTU.

In step 1712, a new RC is created for the requested DTU. For example, the new RC may have an index equal to curRCI.

In step 1714, the counter of the retransmission queue is updated. For example, curRCI can be incremented.

Figure 18:
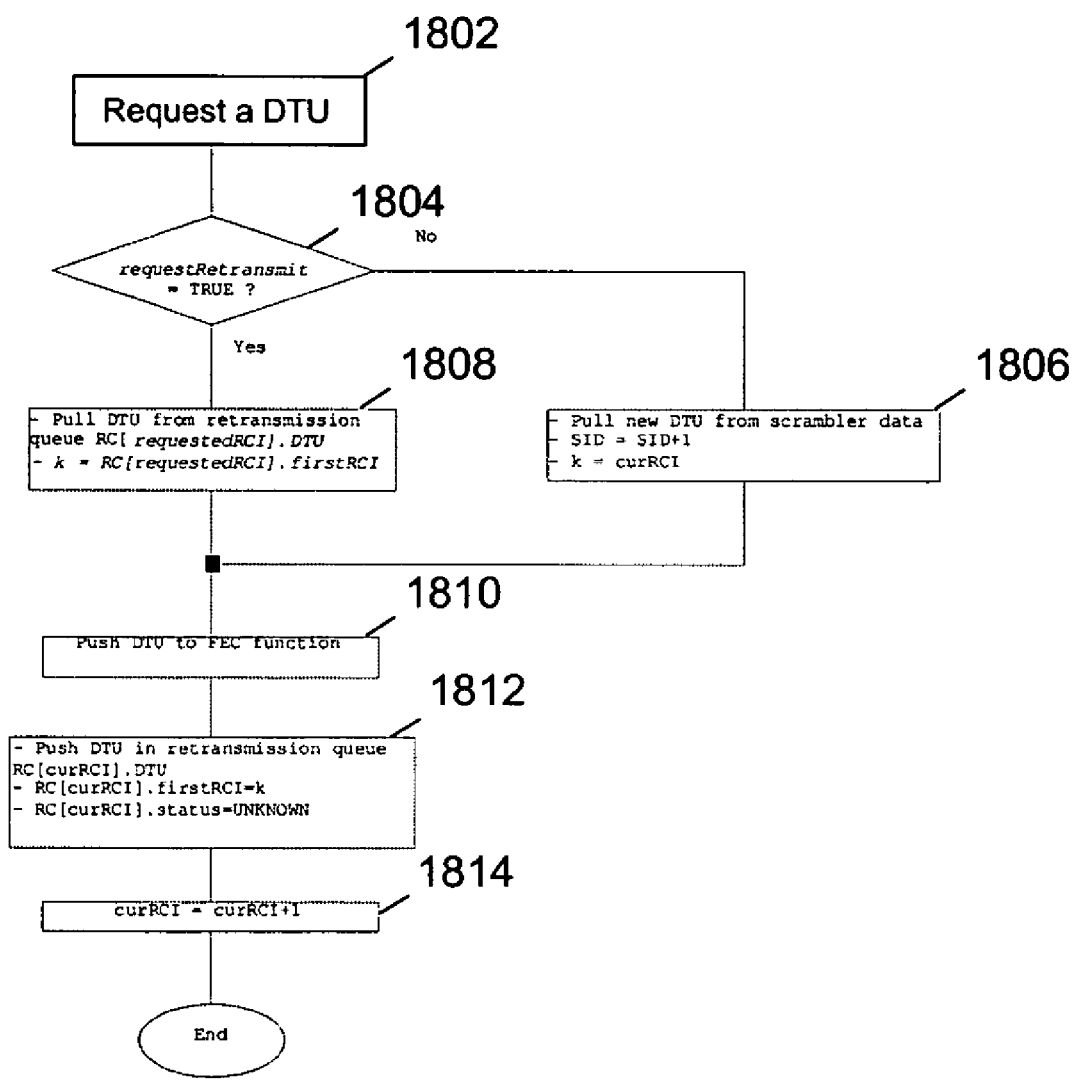
FIG. 18 is another flow chart illustrating an exemplary method for managing a retransmission queue.

FIG. 18 shows a method 1800 providing exemplary steps 1802-1814 that can implement that steps of method 1800, as would be appreciated by those skilled in the relevant art(s), based on the description herein.

The Retransmission Process

To allow synchronization of the transmit retransmission function, a synchronization state machine is used. Two states exist in the state machine: out-of-sync state (OOS) and in-sync state (IS). At startup, the transmit retransmission function is in the IS state and a syncCounter is initialized to 0. Each time a new DTU is generated from the scrambler data, i.e. the SID is incremented, the syncCounter is incremented by 1 and clamped to Qtx. When an incorrect retransmission request is received, the syncCounter is decremented by 1/(S× D) and clamped to −Qtx. The retransmission function is IS when syncCounter≧0. The retransmission function is OOS when the syncCounter<0. When the state machine is out-of-sync, autonomous retransmission is disabled.

The retransmission process is triggered each time a DTU is requested by the FEC function. This process implements three functions in a deterministic way:
  (1) The removal from the retransmission queue of DTUs with too old SID values in order to guarantee that the receiver can resequence them correctly and that the maximum delay is met;
  (2) The limitation of the retransmission bandwidth by limiting the number of retransmission by unit of time; and
  (3) The determination of the need for a retransmission and the DTU to be retransmitted.

The RCs included in the $Q_{Tx}$ containers with indices curRCI-$Q_{Tx}$ to curRCI-1 are scanned for function (1). For each of those RCs, it is checked whether its respective DTU has been sent for the first time in an RC with an index strictly lower than curRCI-$Q_{Rx}$. In this case, the RC containing such a DTU is not retransmitted and its status is changed to DISCARDED. This guarantees that the resequencing queue does not overflow and that the constraint on the maximum delay is met.

For function (2), the bandwidth allocated to retransmission is checked to make sure it remains limited and that the jitter requirement/maximum INP is met. The retransmission bandwidth is limited by a leaky bucket. At the beginning of showtime, the value of the leaky bucket, nbRtx, is initialized to 0. Every time a DTU is sent to the FEC function, the value nbRtx is updated. If retransmission occurs, nbRtx is increased by 1. Otherwise, nbRtx is decreased by RtxRatio$_p$/(1−RtxRatio$_p$). If the nbRtx is greater than MAXNRET−1, no retransmission occurs, i.e. the retransmissionFlag=FALSE. For example, this mechanism allows supporting MAXNRET consecutive retransmissions every $$\left\lceil \frac{MAXNRET}{RtxRatio_p} \right\rceil$$

DTUs transmitted to the FEC function. This is roughly equivalent to an INP equal to inp_max with an inter-arrival time of $$\frac{inp\_max}{RtxRatio_p \times 4} ms.$$

The maximal number of consecutive retransmission in DTU, MAXNRET, is defined as:

$$MAXNRET_p = \left\lfloor \frac{inp\_max_n}{S_p \times D_p} \right\rfloor.$$

where $S_p$ and $D_p$ refer to the number of DMT symbols in a codeword and the interleaving depth for latency path p.

With regard function (3), if the leaky bucket allows a retransmission, this last function determines if a retransmission is necessary and the RC that includes the DTU to be retransmitted.

Two exemplary types of retransmission include:

1. Autonomous retransmission defined as the retransmission of a DTU stored in an RC whose status is UNKNOWN before it leaves the $Q_{Tx}$ RCs available in the retransmission queue. This type of retransmission is only allowed when the state machine is in-sync. Thus, a DTU for which an acknowledgement is not received can be retransmitted. For example, if a retransmit request is not received by the VTU-O, autonomous retransmission can ensure that the DTU corresponding to the retransmit request is still retransmitted.

2. Normal retransmission defined as the retransmission of a DTU stored in an RC that is known to have been wrongly received (status of RC is TO_BE_RETRANSMITTED).

The TxProcess determines the retransmission in the following order of preference:

If the state machine is IS and the RC[curRCI-$Q_{Tx}$].status is UNKNOWN, the DTU included in this RC is retransmitted, i.e. requestedRCI=curRCI−Qtx, requestRetransmit=TRUE, and RC[requestedRCI].status=RETRANSMITTED. This is an autonomous retransmission;

If the RC[curRCI-QTx].status is TO_BE_RETRANSMITTED, the DTU in this RC is retransmitted, i.e. requestedRCI=curRCI−$Q_{Tx}$, requestRetransmit=TRUE, RC[requestedRCI].status=RETRANSMITTED. This is a normal retransmission.

If no RC meets any of the conditions above, there is no retransmission, i.e. requestRetransmit=FALSE.

The retransmission request process is triggered each time at a RRC request is received. First, the check bits of the Golay code are checked. If they are incorrect, the request is invalid and will be dropped. No correction is done. Then, the RCI of the RC containing the last received DTU, lastRxRCI, are determined based on the 5 LSBs of the RCI maintained by the remote end sent in the bits b0 to b4 of the request. Finally, from the bits b5 to b11 of the request, the VTU will identify the RCs that contain a DTU that is received with or without errors and will set their statuses accordingly to ACKNOWLEDGED or TO_BE_RETRANSMITTED.

If numConsecutive is noted the value of [b6 b7 . . . b11], the statuses of only those RC's in the queue with a status equal to UNKNOWN are modified as follows:

If bit b5 is 0, then RC[lastRxRCI-k].status= ACKNOWLEDGED for k ranging from 0 to numConsecutive and— if numConsecutive<63—RC[lastRxRCI-k].status= TO_BE_RETRANSMITTED for k ranging from numConsecutive+1 to 63; and If bit b5 is 1, then RC[lastRxRCI-k].status= TO_BE_RETRANSMITTED for k ranging from 0 to 63-numConsecutive and—if numConsecutive>0—RC[lastRxRCI-k].status=ACKNOWLEDGED for k ranging from (63-numConsecutive)+1 to 63.

Figure 19:
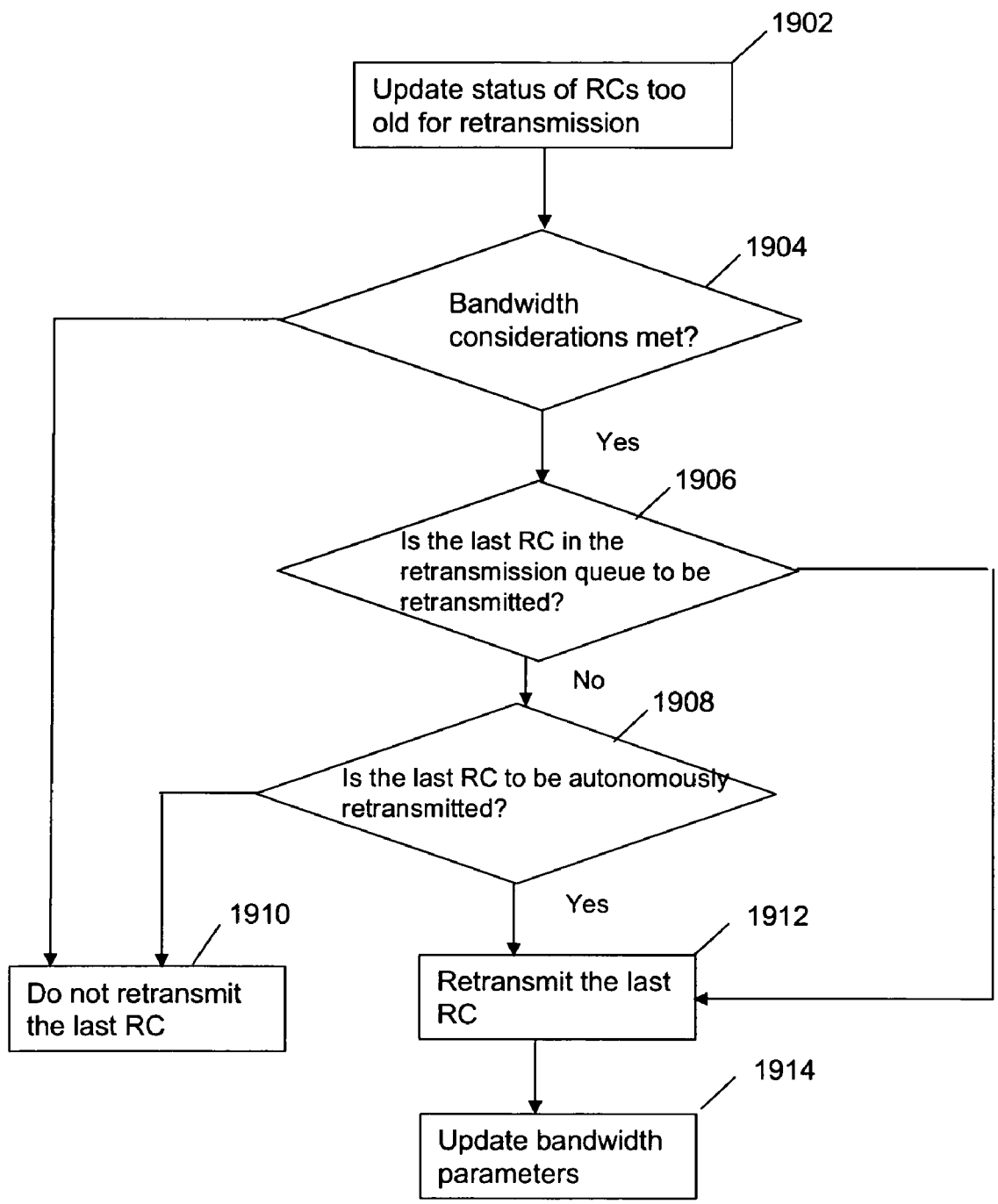
FIG. 19 is a flow chart illustrating an exemplary method for communicating data in an xDSL system.

A method for communicating data in an xDSL system is described in FIG. 19. The method 1900 illustrated in FIG. 19 is performed from the standpoint of the transmitter, e.g., a VTU-O, which could be located, for example, at a central office facility.

According to step 1902, the statuses of the RCs too old for retransmission are updated. For example, the retransmission queue can be scanned and any RC too old for retransmission can have its status changed accordingly.

In step 1904, it is determined if the bandwidth considerations are met. For example, step 1904 may limit the number of retransmissions in a given time and/or limit the number of consecutive retransmissions.

If the bandwidth considerations are not met, i.e., retransmissions are not allowed, method 1900 proceeds to step 1910, and the last RC in the retransmission queue is not retransmitted.

If the bandwidth considerations are met, method 1900 proceeds to step 1906. In step 1906 it is determined whether the last RC in the retransmission queue is to be retransmitted. For example, the status of the last RC in retransmission queue can be polled to determined if is to be retransmitted. In the blanking embodiment, a pattern, based on e.g., periodic known noise, a pattern gleaned from received retransmit requests, etc., the last RC is retransmitted if it is determined to be likely that it is corrupted. For example, it can be determined that DTUs transmitted every 16 ms (e.g., from noise events that occur with a frequency of 60 Hz) will be corrupted due to noise. If the last RC corresponds to a time slot in which such a corruption, it may be retransmitted.

If the last RC designated as to be retransmitted, method 1900 proceeds to step 1912. In step 1912, the last RC is retransmitted.

If the last RC is not designated as to be retransmitted, method 1900 proceeds to step 1908.

In step 1908, it is determined whether the last RC in the retransmission queue is to be retransmitted autonomously. For example, the last RC may be determined to be retransmitted autonomously based on the state of the state machine and the status of the last RC. In the embodiment of autonomous retransmission, a retransmission occurs for the last RC in the retransmission queue if an acknowledgement for that RC has not yet been received.

If the last RC is not to be retransmitted autonomously, method 1900 proceeds to step 1910 and the last RC is not retransmitted. If the last RC is to be retransmitted, method 1900 proceeds to step 1912 and the last RC is retransmitted.

In step 1914, bandwidth considerations are updated. For example, a counter counting the number of transmission and/or a counter counting the number of consecutive retransmissions can be updated (e.g., incremented).

As described in the method 1900, once the status of the RCs in the retransmission queue have been updated and the bandwidth considerations are met, it is determined whether the last RC (e.g., the oldest and the next one to be overwritten when a new RC is generated) in the retransmission queue is to be retransmitted. Thus, in method 1900, only the last RC in the retransmission queue is a candidate for retransmission. Thus, a retransmission may not occur as soon as a request is received, but only when the requested RC reaches the end of the retransmission queue. By restricting retransmissions to the last RC of the retransmission queue, calculations regarding delay, buffer size, etc. can be done more effectively and performance of the xDSL system can be improved. For example, an increased number of retransmissions may occur while staying within the bounds of the bandwidth considerations. However, as would be apparent to those skilled in the relevant art(s), retransmissions of RCs that are not at the end of the retransmission queue can also be included in the methods described above without departing from the scope and spirit of the present invention.

Figure 20:
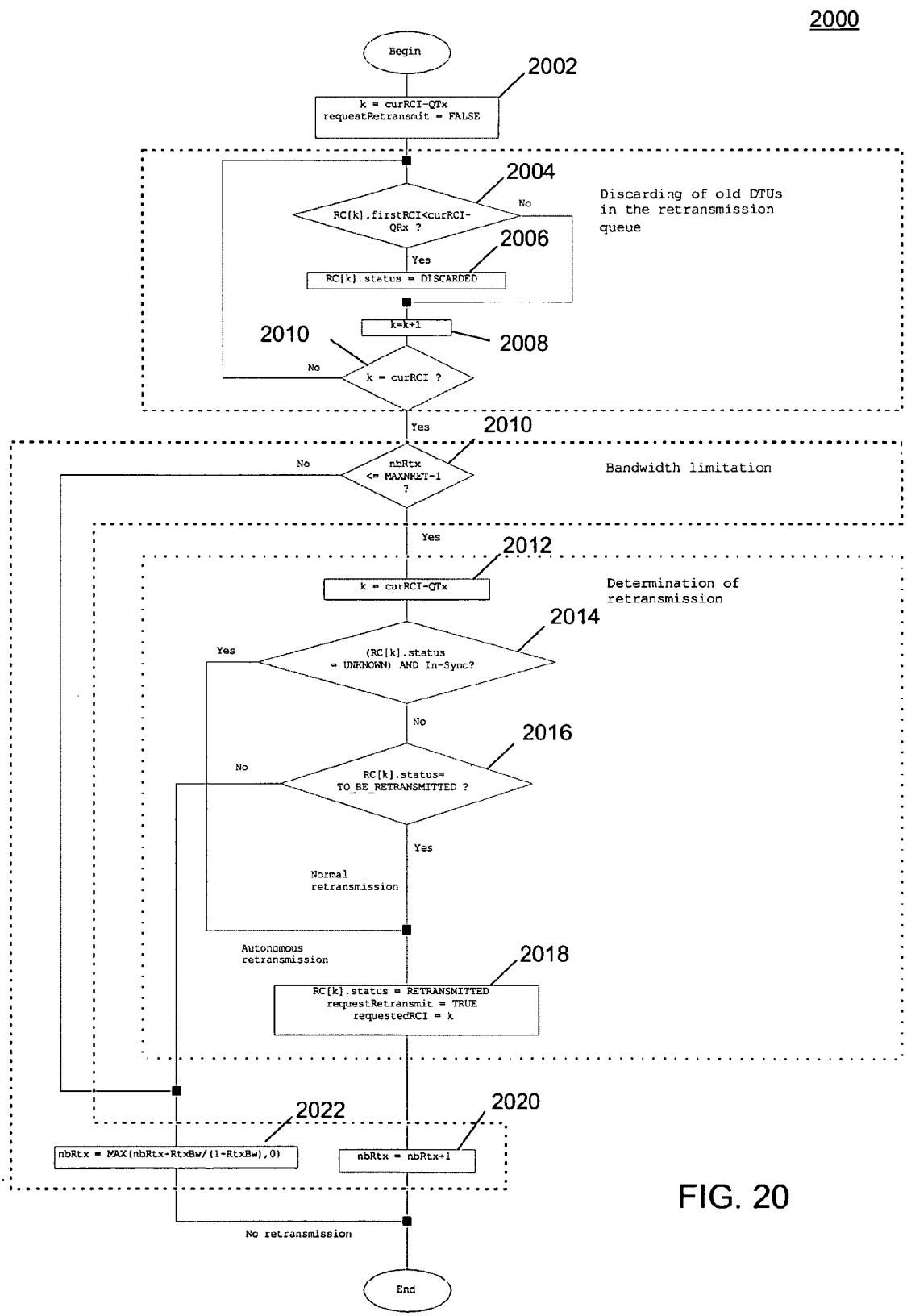
FIG. 20 is another flow chart illustrating an exemplary method for communicating data in an xDSL system.

FIG. 20 shows a flowchart 2000 providing exemplary steps 2002-2022 that implement that steps of method 2000, as would be appreciated by those skilled in the relevant art(s), based on the description herein.

Additional Exemplary Embodiments

Figure 21:
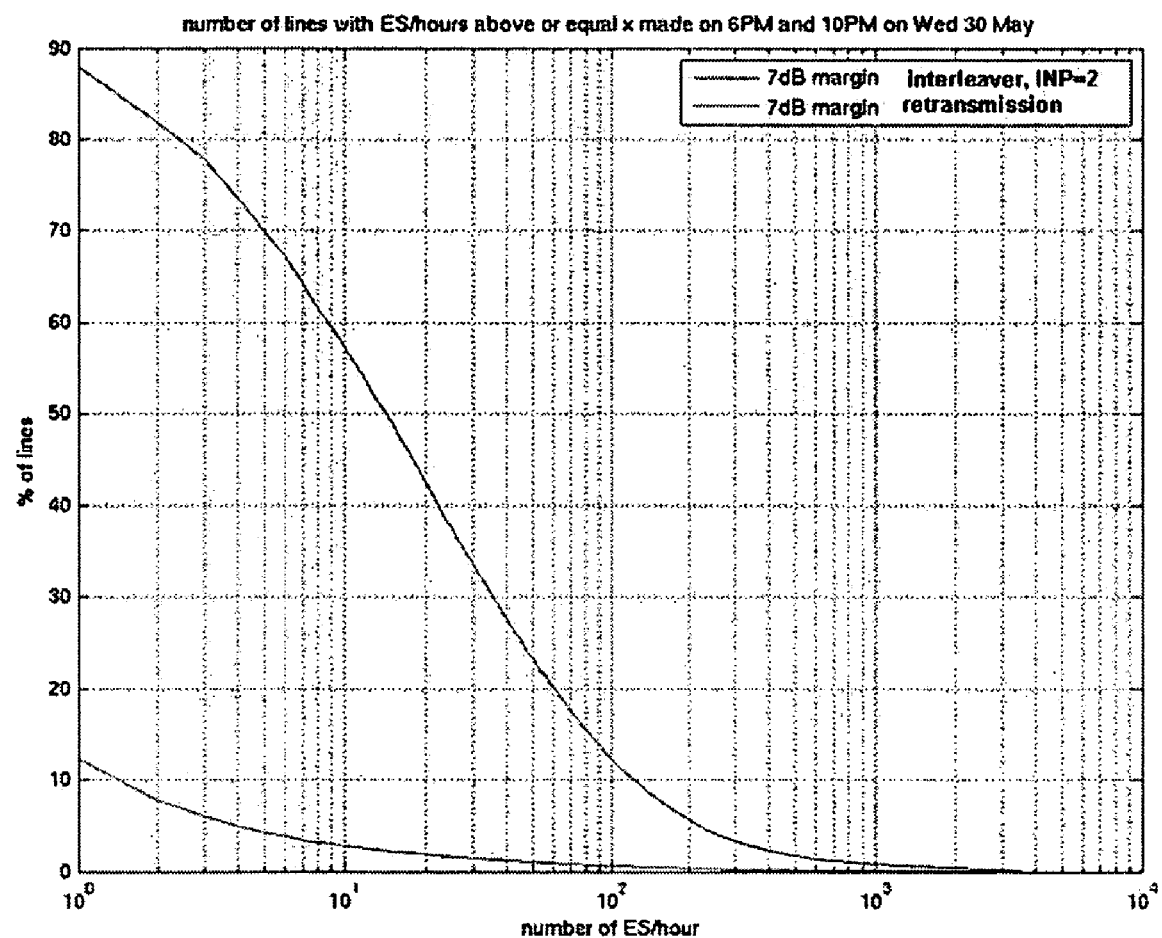
FIG. 21 is a plot illustrating the number of ES per hour for xDSL systems.

In an embodiment, the retransmission methods and systems described herein can significantly improve the performance of an xDSL system. For example, FIG. 21 shows a plot 2100 of the number of ES (error seconds) per hour for an xDSL system that uses retransmission and an xDSL system that does not use retransmissions. As shown in plot 1100, the number of ES per hour for an xDSL system that uses retransmissions is substantially lower than for an xDSL system that does not use retransmissions.

Aggregate Interleaver and De-Interleaver Delay

In an embodiment, the total memory needed to implement the interleaver, the deinterleaver, the retransmission queue, and the resequencing queue in one VTU with the minimal amount of memory can be smaller than half the aggregate interleaver and de-interleaver delay in octet available in the selected profile, e.g., MAXDELAYOCTET/2.

The minimal amount of memory that may be needed to implement an interleaver or a deinterleaver in the direction of transmission x, where x can be "D" or "U", and the latency p can be determined based on the interleaver block length, $I_{xS,p}$, and the interleaver depth $D_{xS,p}$. In a further embodiment, the minimal amount of memory is given by:

$$\frac{(I_{xS,p} - 1) \cdot (D_{xS,p} - 1)}{2}.$$

The minimal amount of memory needed to implement a retransmission queue in the direction of transmission x and latency path #0 can be determined based on the retransmission queue length, $Q_{Rx,xS}$, and the DTU size, $K_{xS,0} \times D_{xS,0}$ where $K_{xS,0}$ is the number of symbols in a codeword and $D_{xS,0}$ is the number of codewords in a DTU. In a further embodiment, the minimal amount of memory to implement the retransmission queue is given by: $Q_{Tx,xS} \times K_{xS,0} \times D_{xS,0}$.

The minimal amount of memory needed to implement a rescheduling queue in the direction of transmission x and latency path #0 can be determined based the rescheduling queue length, $Q_{Rx,xS}$, and the DTU size, $K_{xS,0} \times D_{xS,0}$. In a further embodiment, the minimal amount of memory needed to implement a rescheduling queue is given by: $Q_{Rx,xS} \times K_{xS,0} \times D_{xS,0}$.

In a further embodiment, the VTU can comply with the following constraints:

if the retransmission is not enabled in any direction, the following constraint is met:

$$\sum_p (I_{US,p} - 1) \cdot (D_{US,p} - 1) + (I_{DS,p} - 1) \cdot (D_{DS,p} - 1) \le MAXDELAYOCTET$$

if the retransmission is enabled in one direction of transmission x, both following constraints are met:

$$Q_{Tx,xS} \cdot K_{xS,0} \cdot D_{xS,0} + \frac{(I_{xS,1} - 1) \cdot (D_{xS,1} - 1)}{2} + \sum_p \frac{(I_{yS,p} - 1) \cdot (D_{yS,p} - 1)}{2} \le \frac{MAXDELAYOCTET}{2}$$

$$Q_{Rx,xS} \cdot K_{xS,0} \cdot D_{xS,0} + \frac{(I_{yS,1} - 1) \cdot (D_{yS,1} - 1)}{2} + \sum_p \frac{(I_{xS,p} - 1) \cdot (D_{xS,p} - 1)}{2} \le \frac{MAXDELAYOCTET}{2}$$

where y is the direction of transmission opposite to x.

If the retransmission is enabled in both directions, the following constraint shall be met for x equal to "U" and "D":

$$Q_{Tx,xS} \cdot K_{xS,0} \cdot D_{xS,0} + \frac{(I_{xS,1} - 1) \cdot (D_{xS,1} - 1)}{2} + Q_{Rx,yS} \cdot K_{yS,0} \cdot D_{yS,0} + \frac{(I_{yS,1} - 1) \cdot (D_{yS,1} - 1)}{2} \le \frac{MAXDELAYOCTET}{2}$$

where y is the direction of transmission opposite to x.

PMS-TC Layer for Retransmission

As described above, to increase the robustness to long burst of errors and to increase the mean-time between error, retransmission may be used. In an embodiment, retransmission is supported only in the latency path #0. Furthermore, retransmission can be configured independently of the direction, i.e. upstream or downstream.

PMS-TC Functional Model

Figure 22:
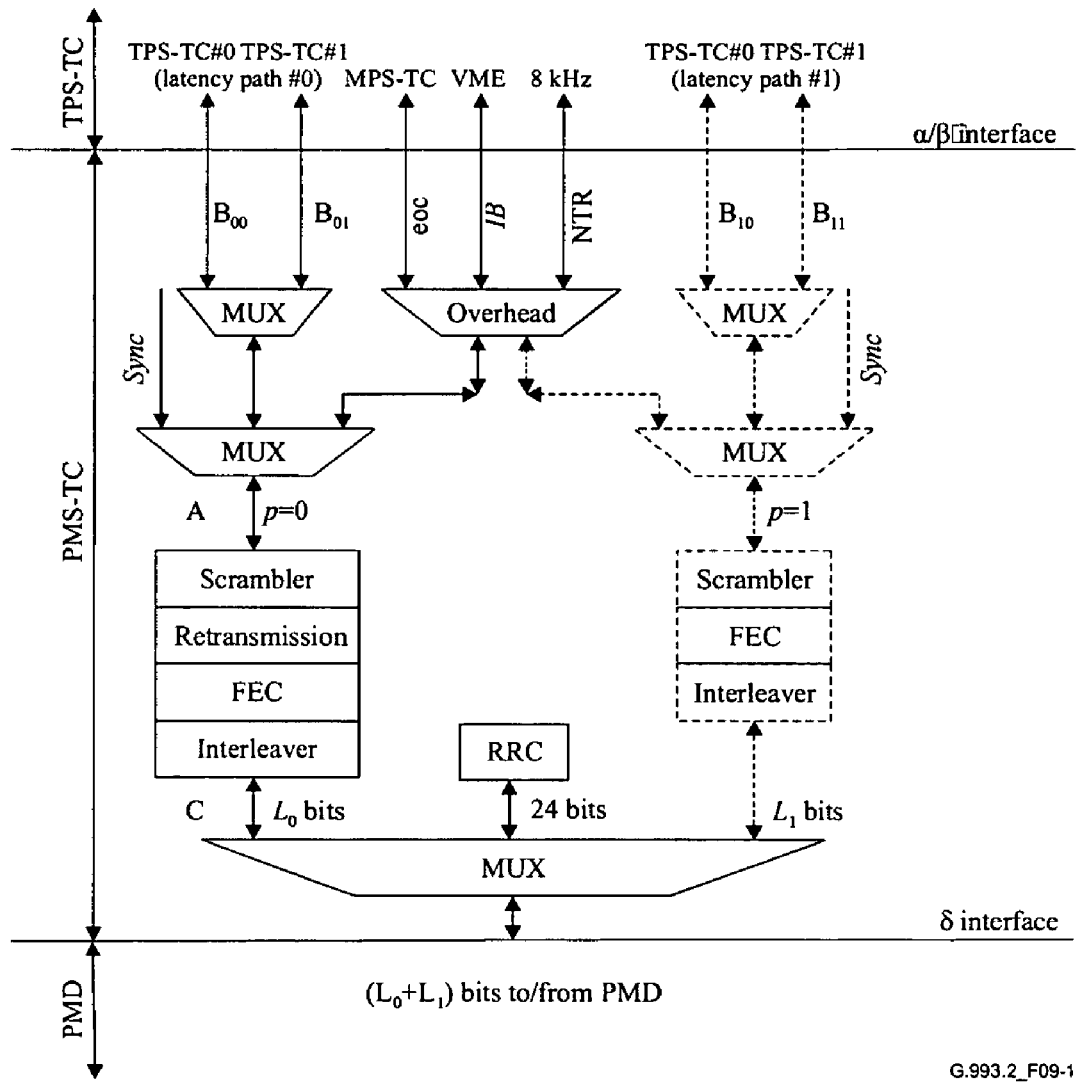
FIG. 22 is a block diagram of an exemplary transmitter.

FIG. 22 shows a block diagram 2200 of a portion of an exemplary transmitter 1200. As shown in FIG. 12, up to two bearer channels of transmit user data originated by various TPS-TCs, management data originated by the MPS-TC, and NTR data are incoming via the α/β interface in a uniform format. The incoming user data and the overhead data are multiplexed into one or two latency paths. Each bearer channel is carried over a single latency path (i.e., not be split across two latency paths). A Syncbyte is added to each latency path for OH frame alignment.

In an embodiment, the VTU can support at least one latency path. For example, the VTU can support of two latency paths. In a further embodiment, if only one latency path is enabled, it is latency path #0.

When transporting two or more applications with different latency and INP requirements and limited higher layer error resilience, the VTU can implement dual latency. Under these conditions, dual latency can provide improved performance and/or quality of service.

The multiplexed data in each latency path is scrambled, encoded using Reed-Solomon forward error correction coding, and interleaved. The interleaved buffers of data of both latency paths are multiplexed into a bit stream to be submitted to the PMD sub-layer via the δ interface.

All user data bytes incoming via the α/β interface are transmitted MSB first. All serial processing in the PMS-TC (e.g., scrambling, CRC calculation) can be performed LSB first, with the MSB incoming from the α/β interface considered the LSB in the PMS-TC. As a result, the first bit of user data incoming from the α/β interface will be the first bit processed by the PMS-TC layer and the first bit sent towards the PMD sub-layer.

The management data bytes incoming via the α/β interface can be transmitted MSB first. The LSB of the management data incoming from the α/β interface shall be considered as the LSB in the PMS-TC, and shall be the first bit processed by the PMS-TC and the first bit sent towards the PMD sub-layer.

In an embodiment, the overhead information transmitted on the different latency paths (p0, p1) may be different depending on the type of OH frame used and the values of framing parameters.

Reference points are defined within the block diagram for purposes of clarity only. The reference points are depicted in FIG. 22 and listed in Table 5.

TABLE 5

PMS-TC Internal Reference Points

| Reference point | Definition |
| --- | --- |
| A: Mux data frame | This reference point is the input of the scrambler of a single latency path. The signal at this reference point is the mux data frame, and is defined as the grouping of octets from different bearer channels within the same latency path, after the sync overhead data octets have been added. |
| C | This reference point is the output of a single latency path |

The δ Interface

The $δ_O$ and $δ_R$ reference points at the VTU-O and VTU-R, respectively, reside between the PMS-TC and the PMD sub-layers, as illustrated in FIG. 5-2. Both interfaces are functional, are application independent, and are defined by the following signal flows:

Data flow; and

Synchronization flow.

The δ interface signals are summarized in Table 6.

TABLE 6

δ interface signal summary

| Signal | Description | Direction |
| --- | --- | --- |
| Data signals | | |
| Tx | Transmit data stream | PMS-TC → PMD |
| Rx | Receive data stream | PMS-TC ← PMD |
| Synchronization signals | | |
| Clkp_t | Transmit bit timing | PMS-TC ← PMD |
| Clkp_r | Receive bit timing | PMS-TC ← PMD |
| Control signals | | |
| Syncflag | Reconfiguration flag | PMS-TC ← PMD |

Data Flow

The data flow can include two contra-directional streams of data frames:

Transmit data frames (Tx); and

Receive data frames (Rx).

The number of bits in each data frame and the number of incoming data frames per second are dependent on the transmission parameters of the PMD sub-layer selected during initialization. The bits of the PMS-TC data frame can be transmitted towards the PMD in sequential order, starting from the first bit of the data frame.

Synchronization Flow

The synchronization flow can include transmit and receive bit-synchronization signals (Clkp_t, Clkp_r), both originating from the PMD.

Control Flow

This flow provides a time marker (Syncflag, as specified in Table 6) for changes of the PMS TC parameters during OLR. The Syncflag is asserted by the PMD and indicates a specific time when the PMS-TC shall start operating with modified parameters. The list of the relevant PMS-TC parameters is for further study.

Retransmission Control Channel (RCC)

In an embodiment, the transmitter needs feedback from the receiver on the status of the received DTUs to decide if a retransmission is necessary. This information can be sent in a retransmission control channel (RCC) multiplexed with the corresponding latency path in the opposite direction of the retransmission. In order to detect erroneous retransmission request, an extended Golay code with 24 bits codeword size and 12 check bits protects the retransmission control channel. In an embodiment, the Golay code is used only for error detection. The extended Golay code may detect at least 7 erroneous bits per codeword.

This channel can be encoded on 24 bits every DMT symbol, noted [b0, b1, ..., b23]. Those 24 bits can be the first ones mapped by the tone encoder function, LSB first, prior to the data from the latency path #0.

The bits [b0 b1 b2 b3 b4] can contain the 5 LSBs of the RCI associated with the last DTU that came out of the FEC decoder function. This value shall be computed by counting the number of received DTUs from the beginning of showtime.

The bit b5 contains the status of the last received DTU. It can be set to 0 if no error is detected in the last received DTU and can be set to 1 otherwise.

If the bit b5 is set to 0, the bits [b6 b7 b8 b9 b10 b11] can contain the number of consecutive DTUs received without detected errors directly preceding and not including the last received DTU.

If the bit b5 is set to 1, the bits [b6 b7 b8 b9 b10 b11] can contain the number of consecutive DTUs received without detected errors directly following and including the 63rd DTU preceding the last received DTU.

The values of the bit b5 to b11 can control the statuses of the RC in the retransmission queue of the remote transmitter.

The bits [b12 b13 ... b23] can contain the check bits of the extended Golay code. The bit $b_{12+k}$, with k=0, ..., 10 shall be the coefficient of the power $x^k$ of the following polynomial in GF(2):

$$\sum_{k=0}^{10} b_{12+k} \cdot x^k = \left( \sum_{k=0}^{11} b_k \cdot x^{22-k} \right) \bmod (x^{11} + x^9 + x^7 + x^6 + x^5 + x + 1).$$

The bit b23 is the overall parity bit computed in GF(2) as:

$$b_{23} = \sum_{k=0}^{22} b_k.$$

Half Round Trips and Roundtrips

The half round trip of the transmitter, halfRoundtrip$_{Tx}$, is defined as the longest interval expressed in DMT symbols between the transmission of a new DTU to the FEC and retransmission Tx process that processes the acknowledge of that DTU for the first time, under the assumptions that:
 the DTU is completely mapped in the L bits of 1 DMT symbol;
 the processing time in the far-end VTU is 0 ms;
 the RRC is error-free; and
 no synchronization symbol is present in neither direction.

In an embodiment, the halfRoundtrip$_{Tx}$ is smaller than or equal to 8 DMT symbols.

The half round trip of the receiver, halfRoundtrip$_{Rx}$, is defined as the longest interval expressed in DMT symbols between the reception of a DTU over the U interface and the transmission of the RRC bits containing acknowledgement of this DTU over the U interface under the assumption that:
 the DTU is completely mapped in the L bits of 1 DMT symbol.
 no synchronization symbol is present in neither direction.

In an embodiment, the halfRoundtrip$_{Rx}$ is smaller than or equal to 8 DMT symbols.

The total round trip in one direction, roundtrip, is defined as halfRoundtrip$_{Tx}$+halfRoundtrip$_{Rx}$ in this direction, increased by 1 symbol to take into account the presence of the synchronization symbol.

The increase of the roundtrip caused by the presence of the synchronization symbol can be avoided if care is taken to approximately align the synchronization symbols in both directions.

Resequencing Queue

The receiver can implement a resequencing queue to resequence at least $Q_{Rx}$ DTUs with different SIDs. $Q_{Rx}$ is the length of the resequencing queue in DTU as communicated during initialization. The size of the resequencing queue is defined as $Q_{Rx} \times K \times D$ octets. The valid values of $Q_{Rx}$ are any integers between 1 and 64. The VTU can support all valid values of $Q_{Rx}$.

The resequencing queue may be used to remove the jitter due to the retransmissions. If the parameter RXSHAPING associated to this bearer in the CO-MIB is set to 1, all new DTUs are delayed by $Q_{Rx}$ DTUs in the resequencing queue.

This process equalizes the transmission delay of DTU in case of retransmission. If the parameter RXSHAPING is set to 0, the resequencing queue introduces no additional delay if the last $100 \cdot Q_{Rx}$ DTUs were correctly received.

Forward Error Correction

The Reed-Solomon correction capability (RSCOR) is defined as the ratio between twice the maximum supported number of corrections per codeword, in the absence of erasure detection in any bytes of the codeword, and the codeword length. If the whole overhead is used to correct errors, the RSCOR is equal to R/N if R is even. It shall be the case in the interleaved path but in the retransmission path, the RSCOR may be lower than R/N.

Interleaving

In an embodiment, latency path #0 supports a block interleaver and latency path #1 supports a convolutional interleaver. To correct burst of errors at the output of the trellis decoder, a block interleaver is used to spread the errors on different Reed-Solomon codewords in one DTU. The block size of the interleaver can be exactly one DTU encoded by the FEC, $N_{FEC} \times D$ bytes.

If the octets at the input of the block interleaver are noted as $B_0, B_1, B_2, \ldots, B_{N.D-1}$ with $B_0$ the first octet of a DTU and the sequence of octets after interleaving are noted $C_0, C_1, C_2, \ldots, C_{N.D-1}$, the $k^{th}$ octet output by the interleaver, $C_k$, is equal to $B_j$ where $$j = N_{FEC} \cdot (k \bmod D) + \left\lceil \frac{k}{D} \right\rceil.$$

Due to the framer structure, $B_0$ is also the first byte of an RS codeword. The VTU can support the following values for D: 1, 2, 4, 8 and 16; and all valid values of $N_{FEC}$.

Framing

Figure 23:
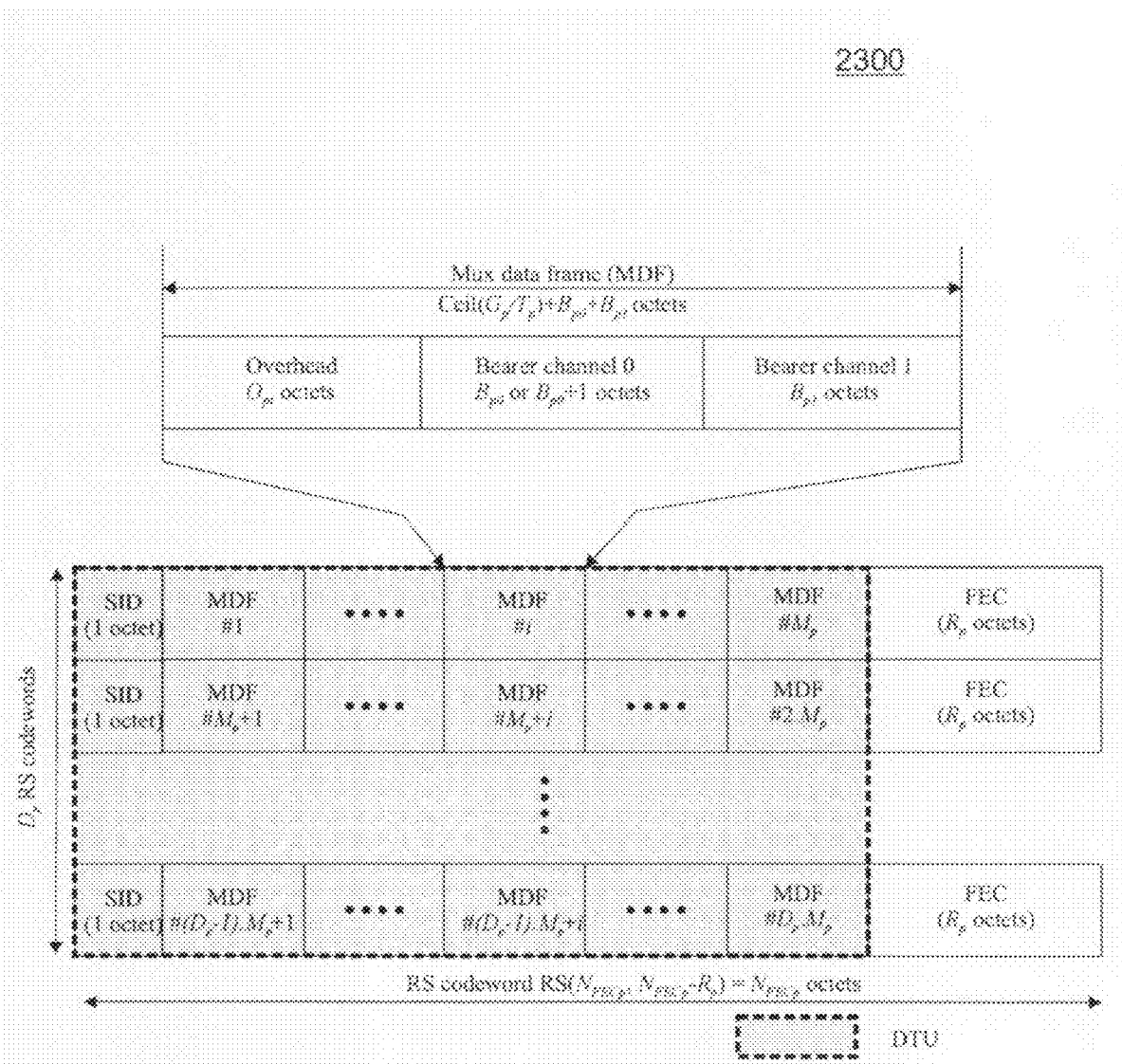
FIG. 23 illustrates a format of an exemplary mux data frame.

Index p indicates the latency path and may take the value 0 or 1. The overhead channel and the first and second bearer channels are multiplexed into the mux data frames (MDF). FIG. 23 shows a format 2300 of an exemplary MDF, according to an embodiment of the present invention. To form the MDF, the PMS-TC pulls out sequentially $O_{pi}$ octets from the overhead (OH) buffer and then $B_{p0}$ and $B_{p1}$ octets from the first and the second bearer channel buffers, respectively.

MDFs are mapped to a DTU as shown in FIG. 23. Each DTU includes the same integer number, $D_p.M_p$, of MDFs and the same number of SID octets $D_p$. The structure of the DTU consists of the concatenation of $D_p$ structures made of one SID octet followed by $M_p$ MDFs. Each structure is mapped in exactly one RS codeword. So, one RS codeword includes exactly one SID octet, $M_p$ MDFs and $R_p$ check bytes. The total size of the RS codeword is $N_{FECp}$ bytes. All octets in the bearer channel fields of the MDF can be mapped to transmit LSB first.

Figure 24:
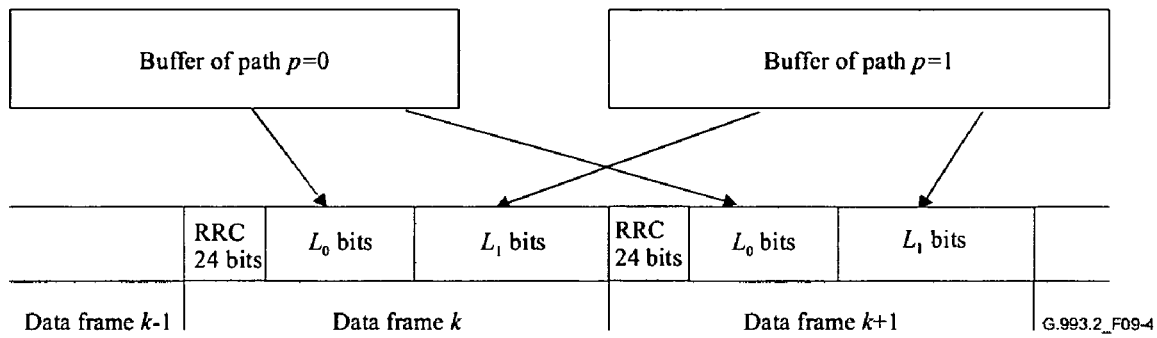
FIG. 24 illustrates the multiplexing of two latency paths and a retransmission control channel.

The assigned number of bits, $L_0$ and $L_1$, from the RS codewords of latency paths #0 and #1, respectively, and the 24 bits of the RCC can be mapped to the data frame as shown in FIG. 24. The bits shall be extracted from the octets of the RS codewords in sequential order, LSB first. The first bit of each extracted group of $L_0$ bits can be the first bit of the data frame. The bits of the RCC shall be extracted in sequential order beginning with the bit $b_0$.

Framing parameters for latency path #0 and #1 are specified respectively in Table 7. Two groups of parameters are specified:
 Primary framing parameters; and
 Derived framing parameters.

Primary framing parameters are those communicated to the other VTU during initialization for frame setup. Derived framing parameters are computed by the VTU using the primary framing parameters to establish the complete frame setting and parameters intended for verification of the data channel and overhead channel bit rates and provide other important characteristics of the PMS-TC when specific framing parameters are set.

TABLE 7

Framing Parameters for Latency Path p

| Parameter | Definition |
|---|---|
| | Primary framing parameters |
| $B_{pn}$ | The number of octets from bearer channel #n per MDF. The range of values is from 0 to 254. When $G_p/T_p$ is not an integer, the number of octets from the bearer channel #0 varies between $B_{p0}$ and $B_{p0} + 1$. |
| $R_p$ | The number of redundancy octets in the RS codeword. |
| $M_p$ | The number of MDFs in an RS codeword. Only values of 1, 2, 4, 8 and 16 shall be supported. |
| $T_p$ | The number of MDFs in an OH sub-frame; $T_p = k \times M_p$, where k is an integer. The value of $T_p$ shall not exceed 64. |
| $G_p$ | The total number of overhead octets in an OH sub-frame; $1 \leq G_p \leq 32$. |
| $F_p$ | Number of OH frames in the OH superframe. $1 \leq F_p \leq 255$. |
| $L_p$ | The number of bits from latency path p transmitted in each data symbol. |
| | Derived framing parameters |
| $N_{FECp}$ | The RS codeword size:<br>in latency path #0:<br>$$N_{FEC0} = M_0 \times \left[\text{ceiling}\left(\frac{G_0}{T_0}\right) + B_{00} + B_{01}\right] + 1 + R_0 \text{ bytes}$$<br>in latency path #1:<br>$$N_{FEC1} = M_1 \times \left[\text{ceiling}\left(\frac{G_1}{T_1}\right) + B_{10} + B_{11}\right] + R_1 \text{ bytes}$$ |
| $O_{pi}$ | The number of overhead octets in the $i^{th}$ MDF of the OH sub-frame:<br>$$O_{pi} = \begin{cases} \left\lceil \frac{G_p}{T_p} \right\rceil & \text{for } i \leq G_p - T_p \times \left\lfloor \frac{G_p}{T_p} \right\rfloor \\ \left\lfloor \frac{G_p}{T_p} \right\rfloor & \text{otherwise} \end{cases}, i = 1, 2, \ldots, T_p; 0 \leq O_{pi} \leq 8.$$ |
| $PERB_p$ | The number of bytes in the overhead frame:<br>$$PERB_p = \frac{T_p \times N_{FECp}}{M_p} \times \left\lfloor \frac{\hat{Q} \times M_p}{T_p \times N_{FECp}} \right\rfloor \text{ bytes}$$<br>where:<br>$$\hat{Q} = \begin{cases} Q & \text{if } TDR_p \geq TDR_0 \\ Q \cdot \frac{TDR_p}{TDR_0} & \text{if } TDR_p < TDR_0 \end{cases}$$<br>and where:<br>$TDR_p$ is the total data rate of latency path p in kbit/s,<br>Q = 17000 bytes,<br>$TDR_0$ = 7880 kbit/s. |
| $TDR_p$ | The total data rate of latency path p (at reference point C):<br>$TDR_p = L_p \times f_s$ kbit/s,<br>where $f_s$ is the data symbol rate in ksymbols/s (see 10.4.4/G.993.2). |
| $S_p$ | The number of data symbols over which the RS codeword spans,<br>$$S_p = \frac{8 \times N_{FECp}}{L_p}$$<br>The value of $S_p$ may be a non-integer, and shall not exceed 64. |
| $NDR_{pn}$ | The net data rate bearer channel #0:<br>$$NDR_{p0} = \left[B_{p0} + \text{ceiling}\left(\frac{G_p}{T_p}\right) - \frac{G_p}{T_p}\right] \times \frac{8 \times M_p \times f_s}{S_p} \text{ kbit/s.}$$ |

TABLE 7-continued

Framing Parameters for Latency Path p

| Parameter | Definition |
|---|---|
| | The net data rate for bearer channel #1: $$NDR_{p1} = B_{p1} \times \frac{8 \times M_p \times f_s}{S_p} \text{ kbit/s.}$$ The settings of framing parameters shall provide $net\_min_n < NDR_{pn} < net\_max_n$ for all defined bearer channels over relevant latency paths. |
| $NDR_p$ | The net data rate for latency path p: $$NDR_p = L_p \times f_s \times \frac{K_p}{N_{FECp}} - OR_p = \left(K_p - \frac{G_p \times M_p}{T_p}\right) \times \frac{8 \times f_s}{S_p} \text{ kbit/s.}$$ where $K_0 = N_{FEC0} - R_0 - 1$ and $K_1 = N_{FEC1} - R_1$. |
| $U_p$ | The number of OH sub-frames in the OH frame: $$U_p = \frac{PERB_p}{N_{FECp}} \times \frac{M_p}{T_p}$$ |
| $SEQ_p$ | The number of overhead bytes in the OH frame: $SEQ_p = U_p \times G_p$ bytes. |
| $OR_p$ | The overhead data rate for latency path p: $$OR_p = \frac{G_p \times M_p}{S_p \times T_p} \times 8 \times f_s \text{ kbit/s.}$$ |
| $msg_p$ | The message overhead data rate (for OH frame Type 1 only): $$msg_p = OR_p \times \frac{SEQ_p - 6}{SEQ_p} \text{ kbit/s.}$$ The settings of framing parameters shall provide $msg_{min} < msg_p < msg_{max}$. The settings for $msg_{min}$ and $msg_{max}$ shall comply with the following conditions: 16 kbit/s $\leq msg_{min} < 248$ kbit/s; $msg_{max} = 256$ kbit/s. |
| $PER_p$ | The duration of the overhead frame in ms (see Note): $$PER_p = \frac{T_p \times S_p \times U_p}{f_s \times M_p} = \frac{8 \times PERB_p}{L_p \times f_s} \text{ ms.}$$ |

Impulse Noise Protection

The $INP_0$ in latency path #0 depends upon the following parameters:

$Q_{Rx}$ is the length of the resequencing queue in DTU as communicated by the receiver during initialization;

$Q_{Tx}$ is the length of the retransmission queue in DTU as communicated by the receiver during initialization;

Roundtrip$_{DTU}$ is the roundtrip delay expressed in DTU, computed as $$roundtrip_{DTU} = \left\lceil \frac{roundtrip}{S_0 \cdot D_0} \right\rceil + 1.$$

The $INP_0$ in latency path #0 is then defined as:

$$INP_0 = \begin{cases} \left\lfloor \left(\left\lfloor \frac{Q_{rx}}{Q_{tx}} \right\rfloor \cdot Q_{tx} - 1 \right) \cdot S_0 \cdot D_0 \right\rfloor & \text{if } Q_{tx} \leq Q_{rx} \text{ and } Q_{tx} \geq roundtrip_{DTU} \\ 0 & \text{otherwise} \end{cases}$$

This INP is the maximal number of contiguous DMT symbols that can be fully corrected every $$\left[\left(Q_{rx} + \min\left(\left\lceil \frac{INP}{S \cdot D} \right\rceil + 1, Q_{tx}\right)\right) \cdot S \cdot D \right] DMT$$

symbols if there is no limitation on the available bandwidth for retransmissions.

Delay

In the latency path #0, the delay is defined as the maximal delay between the generation of a DTU with a new SID and its correct reception after various retransmissions. Therefore, the actual delay in milliseconds introduced by the retransmission can be computed as $$delay_0 = \frac{S_0 \cdot D_0 Q_{rx}}{fs}.$$

Available Retransmission Bandwidth Ratio

The available retransmission bandwidth ratio expressed in fraction of the NDR, RtxRatio is defined as:

$$RtxRatio_p = \min\left(\max\_RtxRatio_p, \frac{NDR_p - \min\_rate_p}{NDR_p}\right)$$

where $NDR_p$ is the net data rate defined in Table 9-6, $\min\_rate_p$ is the sum of the minimum rate over all active bearers in latency path p as defined in the MIB and $\max\_RtxRatio_p$ is the minimum of all the maximum retransmission ratio over all active bearers in latency path p. The available retransmission bandwidth ratio is used for data transfer when no retransmission occurs on the line.

Requirement on Misdetection of DTU

The far-end VTU detects that a DTU contains errors with a probability higher than $1-10^{-6}$. It means that the receiver will detect, on the average, errors in at least 999999 DTUs on 1000000 erroneous DTUs. As a DTU is mapped into an integer number of Reed-Solomon codewords, the receiver may detect erroneous bytes in a DTU by checking if one of the codewords is uncorrectable. The probability of uncorrectable codewords may be increased by correcting fewer bytes than the maximum allowed by the Reed-Solomon overhead.

VTU Management Counters

TABLE 8

VTU Management Counters

PMS-TC counters

Counter of the FEC-0 anomalies
Counter of the FEC-1 anomalies
Counter of the CRC-0 anomalies
Counter of the CRC-1 anomalies
Counter of the RTX-0 anomalies
Counter of the RTXC-0 anomalies
Counter of the RTXUC-0 anomalies
FEC errored seconds counter
Errored seconds counter
Severely errored seconds counter
los errored seconds counter
Unavailable errored seconds counter TPS-TC counters Counters for TPS-TC #0
Counters for TPS-TC #1

Table 8 shows a list of VTU management counters. The counters record statistics regarding a data transmission session. For example, counters of the FEC-0 and FEC-1 anomalies record the number of DTUs that are corrected through the use of FEC (e.g., RS coding) for the 0 and 1 latency paths respectively. Counters of the CRC-0 and CRC-1 anomalies record the number of DTUs that are found to have errors by the CRC (cyclical redundancy check) function for the 0 and 1 latency paths. The RTX-0, RTXC-0, and RTXUC-0 counters specify the number of total errors, the number of errors corrected by retransmission, and the number of errors not corrected by retransmission, respectively, in latency path 0.

Primitives and Anomalies

Line-related primitives represent anomalies and defects related to PMD and PMS-TC sub-layers. In addition to line-related primitives, near-end anomalies also exist. The near-end anomalies include:

Forward error correction (fec-p): This anomaly occurs when a received FEC codeword in the latency path #p indicates that errors have been corrected. This anomaly is not asserted if errors are detected and are not correctable. If retransmission is enabled in this latency path, the anomaly occurs only if the payload data of the received FEC codeword is included in a DTU leaving the rescheduling queue for the descrambler;

Cyclic redundancy check (crc-p): This anomaly occurs when a received CRC byte for the latency path #p is not identical to the corresponding locally generated CRC byte; and Rate adaptation upshift (rau) and Rate adaptation downshift (rad).

If retransmission is enabled in the latency path #0, three additional anomalies are defined, they include:

Retransmitted DTU (rtx-0): This anomaly occurs when a received DTU is detected to be a retransmission of a previous sent DTU;

Corrected DTU (rtxc-0): This anomaly occurs when a received DTU with detected errors is corrected by the reception of a DTU with the same SID, i.e. a retransmission corrects the DTU with detected errors; and Uncorrected DTU (rtxuc-0): This anomaly occurs when a received DTU with detected errors is leaving the rescheduling queue for the descrambler, i.e. no retransmission corrects the DTU.

Furthermore, far-end anomalies also exist, they may include:

Far-end forward error correction (ffec-p): This anomaly occurs when an fec-p anomaly detected at the far end is reported. This anomaly terminates when the received report on the fec-p anomaly is terminated; and Far-end block error (febe-p): This anomaly occurs when a crc-p anomaly detected at the far end is reported. This anomaly terminates when the received report on the crc-p anomaly is terminated.

If retransmission is enabled in the latency path #0, three additional far end anomalies are defined:

Far-end retransmitted DTU (frtx-0): This anomaly occurs when an rtx-0 anomaly detected at the far end is reported. This anomaly terminates when the received report on the rtx-0 anomaly is terminated;

Far-end corrected DTU (frtxc-0): This anomaly occurs when an rtxc-0 anomaly detected at the far end is reported. This anomaly terminates when the received report on the rtxc-0 anomaly is terminated; and Far-end uncorrected DTU (frtxuc-0): This anomaly occurs when an rtxuc-0 anomaly detected at the far end is reported. This anomaly terminates when the received report on the rtxuc-0 anomaly is terminated.

Table 9 shows fields of an extended message descriptor that describes the PMS-TC capabilities of a VTU-O.

TABLE 9

PMS-TC Capabilities

| Field name | Format | Description |
| --- | --- | --- |
| [...] | [...] | [...] |
| US $(1/S)_{max}$ | 1 byte | Parameter block of 1 octet that describes the maximum value of 1/S supported by the VTU-O in the upstream direction as defined in 9.5.5. The unsigned 8-bit value is coded as 1 to 64 in steps of 1. |

TABLE 9-continued

PMS-TC Capabilities

| Field name | Format | Description |
| --- | --- | --- |
| Downstream RTXENABLE | 1 byte | Support of retransmission in downstream direction. A value of $00_{16}$ indicates not supported and a value of $01_{16}$ indicates supported. All other values are for further study. |
| Upstream RTXENABLE | 1 byte | Support of retransmission in upstream direction. A value of $00_{16}$ indicates not supported and a value of $01_{16}$ indicates supported. All other values are for further study. |
| VTU-C Half Roundtrip Tx | 1 byte | VTU-C transmitter half-roundtrip delay expressed in DMT symbols (see 9.3.5.1). Unsigned integer in the range 1 to 8. |
| VTU-C Half Roundtrip Rx | 1 byte | VTU-C receiver half-roundtrip delay expressed in DMT symbols (see 9.3.5.2). Unsigned integer in the range 1 to 8. |

NOTE
If only one latency path is supported, the values for latency path 1 shall be set to ZERO.

Table 10 shows fields of an extended message descriptor that describes the TPS-TC configuration for a VTU-O.

TABLE 10

TPS-TC Configuration

| Field name | Format | Description |
| --- | --- | --- |
| [...] | [...] | [...] |
| Downstream rate adaptation ratio | 1 byte | This field contains the rate adaptation ratio of downstream bearer channel 0 as specified in ITU-T Rec. G.997.1 [4]. This field shall be coded as an unsigned integer in the range from 0 to 100. A value of 100 means that the whole excess capacity is allocated to bearer channel 0. |
| Downstream bearer channel 0 configuration | 0, or 1 bearer channel descriptor | Contains the required configuration of the downstream bearer 0 |
| Downstream bearer channel 1 configuration | 0, or 1 bearer channel descriptor | Contains the required configuration of the downstream bearer 1 |
| Upstream bearer channel 0 configuration | 0, or 1 bearer channel descriptor | Contains the required configuration of the upstream bearer 0 |
| Upstream bearer channel 1 configuration | 0 or 1 bearer channel descriptor | Contains the required configuration of the upstream bearer 1 |

NOTE 1
Some simultaneous mappings of TPS-TCs are invalid (see 8.1.3.1).
NOTE 2
The number of bearer channel descriptors for the bearer channel configurations depends on the number of active bearer channels in each direction.

For each active bearer channel in each direction, a bearer channel descriptor is appended to the message. In the case in which both the CO and CPE advise support for the retransmission protocol (i.e. one of the downstream or upstream RTXENABLE byte is set in both O-MSG1 and R-MSG2), the bearer channel descriptor is replaced by an extended channel descriptor. Table 11 shows fields of the extended channel descriptor.

TABLE 11

Extended Channel Descriptor

| Octet | Content of field |
| --- | --- |
| 1-2 | Minimum net data rate (net_min$_n$) |
| 3-4 | Maximum net data rate (net_max$_n$) |
| 5-6 | Reserved net data rate (net_reserve$_n$) (Note) |
| 7 | Maximum interleaving delay |
| 8 | Impulse noise protection |
| 9 | TPS-TC options |
| 10 | Retransmission enabled (RTXACTIVE) |
| 11 | Maximum impulse noise protection (INPMAX) |
| 12 | Minimum retransmission bandwidth ratio (MINRTXRATIO) |
| 13 | Maximum retransmission bandwidth ratio (MAXRTXRATIO) |
| 14 | Minimum Reed-Solomon correction capability (MINRSCOR) |
| 15 | Receiver Shaping behavior (RXSHAPING) |

NOTE
This parameter is not used in this version of this Recommendation and shall be set to the value of the minimum net data rate in octets 1 and 2. The OLR procedures that utilize this parameter will be defined in a future revision of this Recommendation.

The format of the extended channel descriptor is identical to the format of the channel descriptor, with the exception and extensions described below.

The field "Impulse noise protection" is coded as follows:

Bits 0-6 contain the required INP_min$_n$ value expressed in DMT symbols;

The valid values are $0 \leq \text{INP\_min}_n \leq 63$;

The value INP_min$_n$=0 is a special value indicating that no minimum level of impulse noise protection is required;

Bit 7: INP_no_erasure_required:
When set to ONE, it indicates that the VTU-R receiver shall set INP$_p$=INP_no_erasure$_p$. It shall be set to ONE if retransmission is enabled on this bearer (see "Retransmission enabled" field below),
When set to ZERO, it indicates that the VTU-R receiver is not required to set INP$_p$=INP_no_erasure$_p$.

The field "Retransmission enabled" is set to ONE to enable retransmission on this bearer.

The field "Maximum impulse noise protection" is coded as follows:
Bits 0-5 contain the required INP_max$_n$ value expressed in DMT symbols;
The valid values are 0≦INP_max$_n$≦63; and
The value INP_max$_n$=0 is a special value indicating that no maximum level of impulse noise protection is required.

In the field "Minimum retransmission bandwidth ratio", the parameter min_RtxRatio$_p$ shall be coded as follows:
Bits 0-7 contain the required min_RtxRatio$_p$ expressed in 1/256$^{th}$;
The valid values are 0≦max_RtxRatio$_p$≦128; and
The value max_RtxRatio$_p$=0 is a special value indicating that no minimum retransmission bandwidth is required on this bearer.

In the field "Minimum Reed-Solomon correction capability", the parameter MINRSCOR is coded as follows:
Bits 0-6 shall contain the required MINRSCOR expressed in 1/256$^{th}$;
The valid values are 0≦MINRSCOR≦64;
The value MINRSCOR=0 is a special value indicating that no minimum Reed-Solomon correction capability is required on this bearer; and
Bit 7 is reserved and shall be set to ZERO.

The field "Receiver Shaping behavior" is set to ONE to enable resequencing queue jitter removal. It is set to ZERO otherwise.

Table 12 shows fields of a latency path descriptor.

TABLE 12

Latency Path Descriptor

| Octet | Field | Format | Description |
|---|---|---|---|
| 1 | T | 1 byte | The number of MDFs in an OH sub-frame for the latency path; T = k × M, where k is an integer. The value of T shall not exceed 64. |
| 2 | G | 1 byte | The total number of overhead octets in an OH sub-frame for the latency path; 1 ≦ G ≦ 32. |
| 3 | F | 1 byte | Number of OH frames in the OH superframe for the latency path. 1 ≦ F ≦ 255. |
| 4 | M | 1 byte | The number of MDFs in an RS codeword for the latency path. Only the values 1, 2, 4, 8, 16 are allowable. |
| 5 & 6 | L | 2 bytes | Contains the value of L for the latency path. |
| 7 | R | 1 byte | Contains the value of R for the latency path. |
| 8 | I | 1 byte | Contains the value of I for the latency path. |
| 9 & 10 | D | 2 bytes | Interleaver depth D for the latency path. |

The latency path descriptor shall use an extended format, including retransmission parameter, if the TPS-TC message enabled retransmission on any of the US bearers (i.e. by setting the field "Retransmission enabled" to ONE). This extended format includes the two parameters $Q_{Rx}$ and $Q_{Tx}$.

Table 13 shows the latency path extension.

TABLE 13

Latency Path Descriptor Extension

| Octet | Field | Format | Description |
|---|---|---|---|
| 11 | $Q_{Rx}$ | 1 byte | The number of DTUs in the receiver resequencing queue on this latency path. The value of $Q_{Rx}$ shall not exceed 64. |
| 12 | $Q_{Tx}$ | 1 byte | The number of DTUs in the transmitter resequencing queue on this latency path. The value of $Q_{Tx}$ shall not exceed 64. |

Table 14 shows the fields that specify the PMS-TC capabilities of a VTU-R.

TABLE 13

PMS-TC Capabilities of the VTU-R

| Field name | Format | Description |
|---|---|---|
| [...] | [...] | [...] |
| US (1/S)$_{max}$ | 1 byte | Parameter block of 1 octet that describes the maximum value of 1/S supported by the VTU-R in the upstream direction as defined in 9.5.5. The unsigned 8-bit value is coded as 1 to 64 in steps of 1. |
| Downstream RTXENABLE | 1 byte | Support of retransmission in downstream direction. A value of 00$_{16}$ indicates not supported and a value of 01$_{16}$ indicates supported. All other values are for further study. |
| Upstream RTXENABLE | 1 byte | Support of retransmission in upstream direction. A value of 00$_{16}$ indicates not supported and a value of 01$_{16}$ indicates supported. All other values are for further study. |
| VTU-R Half Roundtrip Tx | 1 byte | VTU-R transmitter half-roundtrip delay expressed in DMT symbols (see 9.3.5.1). Unsigned integer in the range 1 to 8. |
| VTU-R Half Roundtrip Rx | 1 byte | VTU-R receiver half-roundtrip delay expressed in DMT symbols (see 9.3.5.2). Unsigned integer in the range 1 to 8. |

NOTE

If only one latency path is supported, the values for latency path 1 shall be set to ZERO.

The latency path descriptor uses an extended format, including retransmission parameter, if the TPS-TC message enabled retransmission on any of the DS bearers (i.e. by setting the field "Retransmission enabled" to ONE). This extended format includes the three parameters $Q_{Rx}$ and $Q_{Tx}$.

Additional Parameters

Additional parameters can be used as parameters in an xDSL system. For example, these parameters can include:

Minimum impulse noise protection (INPMIN) that specifies the minimum impulse noise protection for the bearer channel if it is transported over DMT symbols with a subcarrier spacing of 4.3125 kHz. The impulse noise protection is expressed in DMT symbols with a subcarrier spacing of 4.3125 kHz and can take the values ½ and any integer from 0 to 60, inclusive. Values above 16 are valid only if retransmission is enabled. If the xTU does not support the configured INPMIN value, it uses the nearest supported impulse noise protection greater than INPMIN;

Minimum impulse noise protection for system using 8.625 kHz subcarrier spacing (INPMIN8) that specifies the minimum impulse noise protection for the bearer channel if it is transported over DMT symbols with a subcarrier spacing of 8.625 kHz. The impulse noise protection is expressed in DMT symbols with a subcarrier spacing of 8.625 kHz and can take any integer value from 0 to 60, inclusive. Values above 16 are valid only if retransmission is enabled;

Retransmission Enabling (RTXENABLE) that indicates if retransmission is disabled on this bearer. If set to 0, retransmission is disabled on this bearer. If set to 1, retransmission may be enabled in this bearer;

Maximum Impulse Noise Protection (INPMAX) that configures the maximum impulse length in DMT symbols that can be corrected by the retransmission scheme. The value can be higher than INPMIN. The value can range from 1 to 255. A special value can indicate no limitation on the maximum correctable impulse length;

Minimum retransmission bandwidth ratio (MINRTXRATIO) that configures the minimum retransmission bandwidth that shall be allocated to the bearer. The value is expressed in fraction of the actual net data rate;

Maximum retransmission bandwidth ratio (MAXRTXRATIO) that configures the maximum retransmission bandwidth that shall be allocated to the bearer. The value is expressed in fraction of the actual net data rate;

Minimum Reed-Solomon correction capability (MINRSCOR) that configures the minimum Reed-Solomon correction capability that shall protect the bearer. This value is used only if retransmission is enabled. The value is expressed in 256th. The value range from 0 to 64 by step of 1; and Receiver shaping flag (RXSHAPING) that configures the rescheduling queue to remove the jitter due to the retransmitted data. The flag is set to 1 to force the rescheduling queue to remove the jitter. Otherwise, the flag is set to 0.

RXSHAPING may not control the jitter due to the insertion of retransmitted data on the link. This is controlled through the INPMAX parameter

SUMMARY

The above described embodiments may be realized in hardware, software, or most commonly a combination thereof. Additionally, embodiments may be realized in a centralized fashion in at least one communication system, or in a distributed fashion where different elements may be spread across several interconnected communication systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

Alternatively, the above described embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating data, comprising:
defining a data transmission unit (DTU) to be sent in an xDSL data stream;
defining a retransmit container as a time slot that corresponds to a sent DTU;
maintaining a copy of the sent DTUs and an index of corresponding retransmit containers in retransmission buffer;
transmitting the DTUs in the xDSL data stream;
determining whether a transmitted DTU should be retransmitted;
identifying each corrupted DTU by its corresponding retransmit container; and
retransmitting an uncorrupted copy of the DTU as identified by the corresponding retransmit container, wherein the retransmission is deferred until the DTU is at a predefined position in the retransmission buffer.

2. The method of claim 1, further comprising identifying the defined DTUs by a sequence identification (SID), wherein the corrupted DTU is identified in the retransmission signal by its SID.

3. The method of claim 2, further comprising defining the DTU as including an overhead byte that supports the SID, the overhead byte being an 8-bit wrap-around counter that increments each time a new DTU is defined.

4. The method of claim 1, further comprising maintaining the copy of the sent DTUs for a period of time sufficient to determine whether any of the sent DTUs were corrupted during transmission.

5. The method of claim 1, further comprising defining the DTU as a group of n consecutive code words wherein n=1/S code words and S is an integer.

6. The method of claim 1, further comprising defining the DTU as one of a group of D Reed Solomon code words, a block of asynchronous transfer mode (ATM) cells, or packet transfer mode (PTM) cells.

7. The method of claim 1, further comprising defining the DTU as the set of L bits mapped on a discrete multi-tone (DMT) symbol.

8. The method of claim 1, wherein the determining step further comprises:
   receiving a retransmission request indicating that a transmitted DTU was corrupted and requesting retransmission of an uncorrupted copy of the corrupted DTU, wherein the uncorrupted copy of the DTU is identified in the retransmission request by its corresponding retransmit container.

9. The method of claim 8 further comprising:
   receiving the retransmission request in a first direction over a retransmit control channel.

10. The method of claim 1, wherein the determining step further comprises:
   determining whether an acknowledgement was received for a transmitted DTU; and
   for each unacknowledged DTU, generating a retransmission request identifying the unacknowledged DTU by its corresponding retransmit container.

11. The method of claim 1, further comprising determining that sufficient bandwidth is available for retransmission.

12. The method of claim 11, wherein the determining that sufficient bandwidth is available step further comprises determining a number of consecutive retransmissions.

13. The method of claim 11, wherein the determining that sufficient bandwidth is available step further comprises determining a number of retransmissions in a time period.

14. The method of claim 1, wherein the determining step further comprises extracting a pattern from a plurality of received retransmit requests.

15. The method of claim 1, wherein the determining step further comprises determining that an acknowledgement has not been received for the DTU.

16. The method of claim 1, wherein the determining step further comprises determining a pattern associated with noise that can corrupt the DTU during transmission.

* * * * *

UNITED STATES PATENT AND TRADEMARK OFFICE
CERTIFICATE OF CORRECTION

PATENT NO. : 7,970,733 B2  Page 1 of 1
APPLICATION NO. : 12/081706
DATED : June 28, 2011
INVENTOR(S) : Benoit Christiaens It is certified that error appears in the above-identified patent and that said Letters Patent is hereby corrected as shown below:

At Title Page, item (56), column 1, under "U.S. PATENT DOCUMENTS", please insert:

| | | |
|---|---|---|
| --5,970,253 | 10-19-1999 | Purdham-- |
| --6,373,842 B1 | 04-16-2002 | Coverdale et al.-- |
| --7,234,086 B1 | 06-19-2007 | de Koos et al.-- |
| --7,330,432 B1 | 02-12-2008 | Revsin et al.-- |
| --2003/0076826 A1 | 04-24-2003 | Blasiak et al.-- |
| --2003/0208772 A1 | 11-06-2003 | Milbrandt-- |
| --2005/0286566 A1 | 12-29-2005 | Tong et al.-- |
| --2006/0215689 A1 | 09-28-2006 | Liu et al.-- |
| --2007/0217491 A1 | 09-20-2007 | Tzannes-- |

At Title Page, item (56), column 2, under "OTHER PUBLICATIONS", please insert:

--Office Action mailed on July 9, 2009, in United States Patent Application No. 11/853,532, filed September 11, 2007--
--Office Action mailed on January 6, 2010, in United States Patent Application No. 11/853,532, filed September 11, 2007--
--Office Action mailed on July 6, 2010, in United States Patent Application No. 11/853,532, filed September 11, 2007--

Signed and Sealed this
Eleventh Day of October, 2011

David J. Kappos
*Director of the United States Patent and Trademark Office*